United States Patent [19]

Yamamoto et al.

[11] Patent Number: 5,799,749
[45] Date of Patent: Sep. 1, 1998

[54] ROTATION TRANSMISSION DEVICE FOR CONNECTING AND DISCONNECTING THE TRANSMISSION OF DRIVING FORCE

[75] Inventors: Ken Yamamoto, Iwata; Kenichiro Itoh, Shizuoka; Isao Hori; Kohji Akiyoshi, both of Iwata, all of Japan

[73] Assignee: NTN Corporation, Osaka, Japan

[21] Appl. No.: 497,402

[22] Filed: Jun. 30, 1995

[30] Foreign Application Priority Data

| Jun. 30, 1994 | [JP] | Japan | 6-149431 |
| Jul. 27, 1994 | [JP] | Japan | 6-175499 |
| Nov. 29, 1994 | [JP] | Japan | 6-294530 |
| Dec. 19, 1994 | [JP] | Japan | 6-314584 |
| Dec. 29, 1994 | [JP] | Japan | 6-340200 |

[51] Int. Cl.$^6$ ............................ F16D 15/00; F16D 41/08
[52] U.S. Cl. ........................ 180/247; 192/45.1; 192/47
[58] Field of Search .................... 180/247, 252, 180/245, 246, 233; 192/43.2, 35, 37, 49, 50, 45.1, 47

[56] References Cited

U.S. PATENT DOCUMENTS

| 4,354,585 | 10/1982 | Ritter | 192/47 |
| 4,597,467 | 7/1986 | Stockton | 192/47 |
| 4,625,584 | 12/1986 | Onodera | 180/247 |
| 4,694,943 | 9/1987 | Petrak | 192/35 |
| 4,901,831 | 2/1990 | Ito et al. | 192/38 |
| 5,005,683 | 4/1991 | Ritter et al. | 192/47 |
| 5,016,740 | 5/1991 | Ito et al. | 192/38 |
| 5,025,902 | 6/1991 | Imai et al. | 192/43 |
| 5,103,690 | 4/1992 | Macpherson et al. | 180/247 |
| 5,123,513 | 6/1992 | Petrak | 180/247 |
| 5,131,285 | 7/1992 | Weismann et al. | 192/38 |
| 5,203,232 | 4/1993 | Ito et al. | 192/50 |
| 5,269,399 | 12/1993 | Ito et al. | 180/248 |
| 5,286,239 | 2/1994 | Ito et al. | 192/50 |
| 5,343,992 | 9/1994 | Stark et al. | 192/45.1 |
| 5,429,218 | 7/1995 | Itoh et al. | 192/45.1 |
| 5,443,147 | 8/1995 | Gratzer | 192/45.1 |
| 5,529,158 | 6/1996 | Itoh et al. | 192/50 |
| 5,542,514 | 8/1996 | Itoh et al. | 192/45.1 |

*Primary Examiner*—Brian L. Johnson
*Assistant Examiner*—Gary Savitt
*Attorney, Agent, or Firm*—Wenderoth, Lind & Ponack

[57] ABSTRACT

A rotation transmission device has a driving member and a driven member rotatably mounted one inside the other. A plurality of engaging elements are mounted between the driving member and the driven member so as to engage with the driving member and the driven member when the driving member and the driven member rotate relative to each other in either direction. A cage is mounted between the driving member and the driven member for keeping the engaging elements apart from one another by a predetermined distance. A turning force imparting mechanism is coupled to the cage for moving the engaging elements to an engageable position by turning the cage in one direction relative to the driving member, and a locking mechanism is provided between the cage and the driven member for detachably coupling the cage to the driven member and remote-controlled through a cable connected to the locking mechanism and extending out of the rotation transmission device.

17 Claims, 48 Drawing Sheets

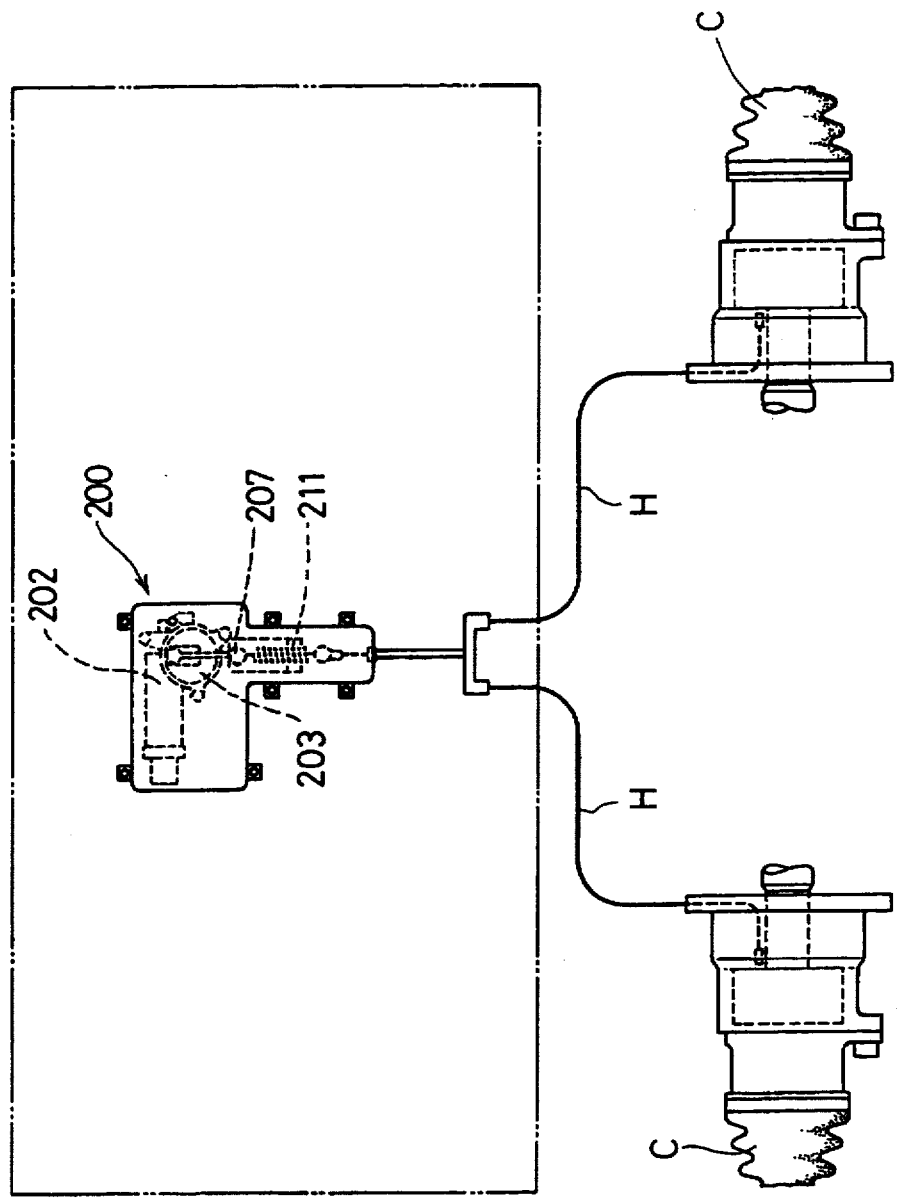

ROTATION TRANSMISSION DEVICE FOR CONNECTING AND DISCONNECTING THE TRANSMISSION OF DRIVING FORCE

BACKGROUND OF THE INVENTION

This invention relates to a rotation transmission device mounted in the drive train of a four-wheel drive vehicle for connecting and disconnecting the transmission of driving force, and a driving force transmission device equipped with the rotation transmission device.

Typical conventional part-time four-wheel drive vehicles have a free-wheel hub mounted between each wheel hub and wheel axle for connecting and disconnecting the transmission of driving force between the axle and the wheel.

When this vehicle is traveling in the two-wheel drive mode, the driving force from the engine is transmitted only to the rear wheels, whereas its front wheel drive train from the transfer to the front wheel axles is separated from the front wheels by disengaging the free-wheel hubs. During the four-wheel drive mode, the front wheels are directly coupled to the rear wheels by engaging the free-wheel hubs. The reason why the front wheel drive train is separated from the front wheels during the two-wheel drive mode is that it is not necessary to rotate this part during the two-wheel drive mode. Since this part is not rotated by the front wheels during the two-wheel drive mode, fuel efficiency improves. Also, the noise level of the vehicle decreases.

Such free-wheel hubs come in the manual type and automatic type. A manual free-wheel hub requires the driver to get out of the car in order to change over its mode. It is a lot of trouble for the driver to stop and get out of the car, and walk to the hubs, especially in wintertime or on rainy days. Thus, an increasingly greater number of recent free-wheel hubs are automatic, because automatic hubs can be controlled from the driver's seat.

Conventional automatic free-wheel hubs are not without problems, either. Namely, in order to change the driving mode from four-wheel drive to two-wheel drive, after setting the mode of the transfer in the two-wheel drive, the car has to be backed up several meters until the hubs disengage. To put it differently, these hubs disengage every time the car is backed up several meters. This means that the hubs can disengage, setting the driving mode to two-wheel drive, when the driver least wants this to happen, e.g. when he is backing up the car in an attempt to get out of a slippery spot on the road.

On the other hand, in order to engage these hubs and thus to change the driving mode from two-wheel drive to four-wheel drive, the car has to be moved ahead several meters. But if the car gets stuck while climbing a slope with a low-friction surface such as a snow-covered surface in the two-wheel drive mode, it is usually impossible to move the car ahead even an inch, to say nothing of several meters, because in such a situation, the driving force is usually transmitted only to one of the rear wheels which is spinning in vain without gripping the ground. Since it is impossible to move the car ahead, it is impossible to change the driving mode from two-wheel drive to four-wheel drive.

When this car is turning a tight corner with the front and rear wheels directly coupled together, the front wheels, which are rotating faster then the rear wheels due to a difference in turning radius between the front and rear wheels, will slip, so that a kind of braking force acts on the vehicle.

One way to prevent such braking phenomena is to provide, in place of the free-wheel hubs, a center differential in the drive train of the vehicle between the front and rear wheel differentials to absorb any difference in rotating speed between the front and rear wheels.

Of these center differentials, recently developed ones have both the function of a differential for absorbing any difference in rotating speed between the front and rear wheels and the differential limiting function. Such center differentials include a viscous coupling which utilizes the shearing force of a highly viscous material, and a coupling that utilizes the frictional force produced by a multiple disk clutch and a resilient member.

But these couplings are made up of so many parts that drive trains including such couplings tend to be complicated in structure and costly.

Also, since these couplings transmit driving force utilizing a difference in revolving speed between the input and output members, it is impossible to transmit a large driving force while the vehicle speed is low. In order to transmit a sufficiently large driving force, a sufficiently large difference in revolving speed has to exist between the input and output members. Thus, these couplings have much to be desired as to responsiveness and efficiency of transmission of the driving force.

An object of this invention is to provide a rotation transmission device which has a simple mechanical structure, which can transmit driving force efficiently, and which, when mounted in the drive train of an automobile, is adapted to decouple the front or rear wheels from the drive train during the two-wheel drive mode, and allows a full-time four-wheel drive during the four-wheel drive mode, or alternatively, couples all the four wheels directly.

SUMMARY OF THE INVENTION

According to this invention, there is provided a rotation transmission device comprising a driving member and a driven member rotatably mounted one inside the other, a plurality of engaging elements mounted between the driving member and the driven member so as to engage with the driving member and the driven member when the driving member and the driven member rotate relative to each other in either direction, a cage mounted between the driving member and the driven member for keeping the engaging elements apart from one another by a predetermined distance, a turning force imparting means coupled to the cage for moving the engaging elements to an engageable position by turning the cage in one direction relative to the driving member, and a locking means provided between the cage and the driven member for detachably coupling the cage to the driven member and remote-controlled through a cable connected to the locking means and extending out of the rotation transmission device.

In the second arrangement, the locking means includes a coupling member unrotatably coupled to one of the cage and the driven member and movable into and out of engagement with an engaging potion provided on the other of the cage and the driven member by operating the cable, the unrotatably coupled portion having a guide surface along which the coupling member is guided to be movable, the guide surface having a length greater than the radial distance from the center of the coupling member to the point at which the cable is connected to the locking means, or the radial distance from the point to the guide surface.

In the third arrangement, the cable is coupled to transfer of a four-wheel drive vehicle so that the locking means can be remote-controlled through the transfer.

The rotation transmission device may further comprise a spindle coupled to a fixed member and mounted on a shaft coupled to the driving member, the spindle being formed with a moderately curving passage through which the cable extend out of the device.

The rotation transmission device may comprise a driving member and a driven member rotatably mounted one inside the other, a plurality of engaging elements mounted between the driving member and the driven member so as to engage with the driving member and the driven member when the driving member and driven member rotate relative to each other in either direction, a cage mounted between the driving member and the driven member for moving the engaging elements to an engageable position by turning relative to the driving member, a switch spring coupled to one end of the cage for biasing the cage to rotate the cage in one direction relative to the driving member, a coil spring having both ends thereof fixed to a stationary member and wound around the other end of the cage so as to bias the cage in the direction opposite to the one direction, and a remote-controlled coupling means provided between the cage and the driven member for detachably coupling the cage to the driven member.

From another aspect of the invention, there is provided a driving force transmission device comprising a wheel axle, a wheel hub, and the rotation transmission device claimed in any of claims 1–5 mounted between the axle and the wheel hub with the driving member connected to the wheel axle and the driven member to the wheel hub.

There is also provided a driving force transmission device comprising a vehicle wheel differential, a homokinetic joint connected to a wheel axle, and the rotation transmission device claimed in any of claims 1–5 mounted between the differential and the homokinetic joint with the driving member connected to the differential and the driven member to the homokinetic joint.

Now suppose the rotation transmission device in the first arrangement is mounted in the wheel drive train of a vehicle. During the two-wheel drive mode, the driven member is separated from the cage, so that the driving member and the driven member rotate relative to each other. Thus, the engaging elements are moved to the forward-travel engageable position by means of the turning force imparting means.

As long as the driven member is rotating at a speed equal to or greater than the driving member, the driven member free-runs relative to the engaging elements, so that torque is not transmitted from the driven member. The drive train including the driven member thus stops.

During the four-wheel drive mode, torque is transmitted from the driving member to the driven member. Similar to the case during the two-wheel drive mode, as long as the driven member is rotating at a speed equal to or higher than the driving member, the driven member will free-run relative to the engaging elements.

If, in this state, the driven member is coupled to the cage by means of the locking means, the cage is forced to rotate by the driven member, which is rotating faster than the driving member, in the direction opposite to the direction in which the cage is biased by the turning force imparting means. This causes the engaging elements to be inclined in such a direction that torque is transmitted from the driven member to the driving member through the engaging elements. Thus, the driven member and the driving member rotate as if it is a one-piece member. Namely, the input and output members are directly coupled together.

On the other hand, in the arrangement in which the locking means has a coupling member adapted to be moved between the driven member and the cage by controlling the cable, the shaft coupled to the driving member is usually a solid, rotatable shaft such as the shaft of a homokinetic joint. Thus, it is impossible to move the cable along the center axis of this shaft.

Since the cable has to be moved along a line offset from the center axis of the shaft, angular moment tends to act on the coupling member, thus making smooth sliding movement of the coupling member difficult.

In order to solve this problem, in the second arrangement, the coupling member has a long guide surface. The long guide surface makes it possible to more stably guide the coupling member even if it is subjected to angular moment. Namely, it prevents the coupling member from being inclined while sliding.

In the third arrangement, the cable passage is formed in the spindle mounted on the axle. By inserting the cable through this passage, it is possible to control the cable smoothly while reducing the possibility of the breakage of the cable.

In the sixth arrangement, when the driving member turns biased by the switch spring with the driven member separated from the cage, the coil spring loosens, so that no frictional force acts on the cage. The engaging elements are thus kept urged by the switch spring.

If the driving member turns in the opposite direction, the coil spring is tightened against the cage, so that frictional force is produced therebetween. Due to the resistance resulting from this frictional force, the cage rotates relative to the driving member, moving the engaging elements in the direction opposite to the above.

In a normal travel condition, the driven member rotates, together with the wheel hub, at a speed equal to or greater than the driving member. Namely, it free-runs relative to the engaging elements. Since no torque is transmitted in this state, the driving unit from the transfer to the front wheel axles stops.

By coupling the driven member to the cage through the coupling means, the engaging elements are forced to move to the engageable position by the cage, so that the driven member and the driving member will rotate as a one-piece member. Namely, the front and rear wheels are directly coupled together. The vehicle is thus driven by all the four wheels.

The driving force transmission device according to the invention includes the rotation transmission device of the invention. In the first arrangement, the rotation transmission device is used as a free wheel hub. In a normal travel condition, in which the wheel hub is rotating faster than the axle, the engaging elements are allowed to free-run, so that the driving unit from the transfer to the wheel axle stops rotating.

If, in this state, the engaging elements are engaged by means of the locking means, the front and rear wheels are coupled directly together, so that the driving mode changes to the four-wheel drive.

In the second arrangement of the driving force transmission device, the rotation transmission device is mounted between the axle and the differential. By engaging the engaging elements by means of the locking means, the differential is directly coupled to the axle, so that it is possible to apply engine brakes to the wheels.

By separating the driven member from the cage, the engaging elements will engage and disengage depending upon the relative speed between differential and the axle. Namely, in this state, the two-wheel drive and four-wheel drive modes change over automatically.

Other features and objects of the present invention will become apparent from the following description made with reference to the accompanying drawings, in which:

BRIEF DESCRIPTION OF THE DRAWINGS

FIG. 39 is a view of a remote control structure using the driving unit;

DETAILED DESCRIPTION OF THE PREFERRED EMBODIMENT

Figure 1:
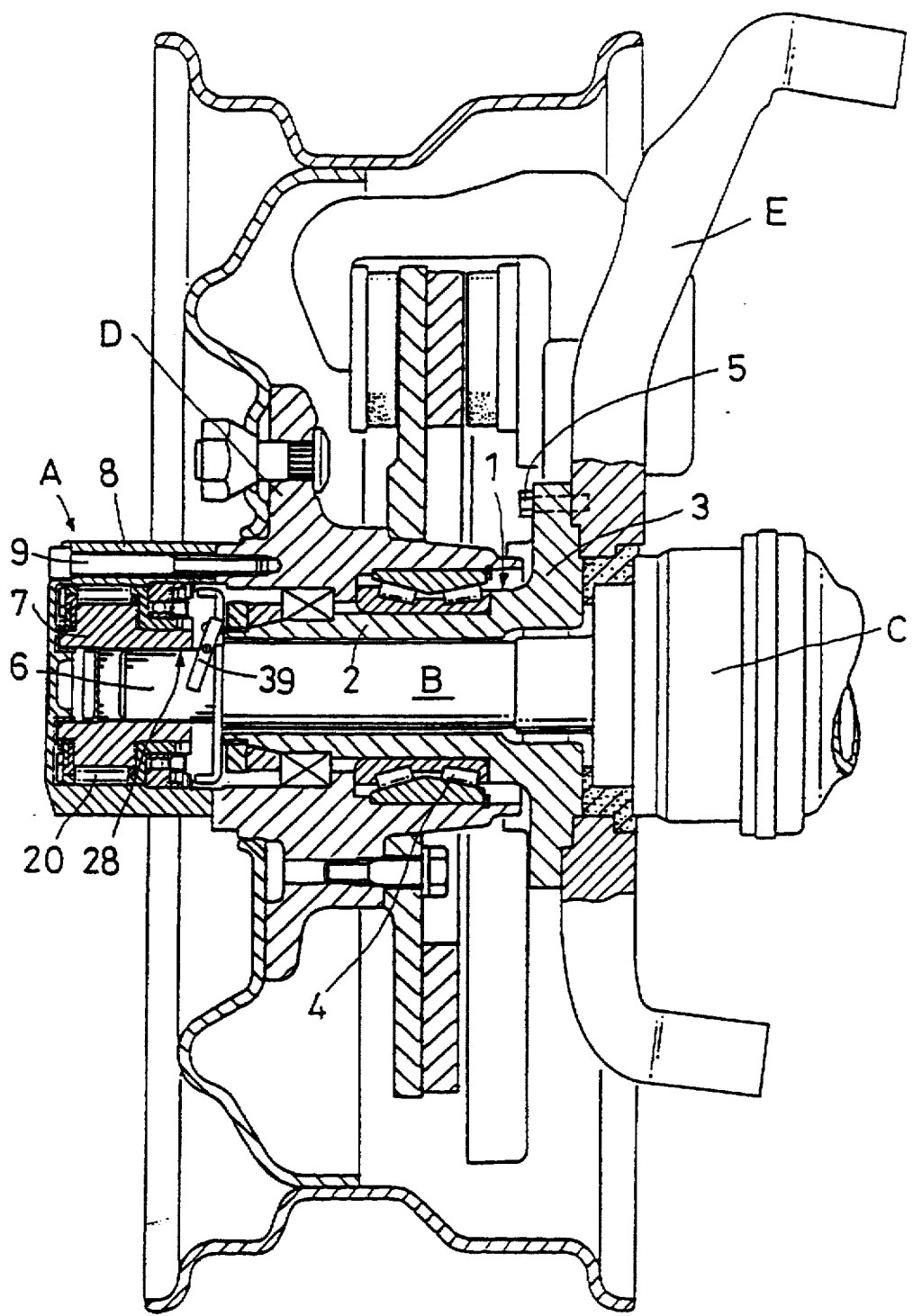
FIG. 1 is a partial vertical sectional view of the rotation transmission device as mounted on a four-wheel drive vehicle.

Now referring to the drawings, the embodiments of this invention are described.

(First Embodiment)

FIGS. 1–11 show the first embodiment. The rotation transmission device A according to the present invention is mounted on a front wheel axle B of a four-wheel drive vehicle. The axle B is actually a shaft of a homokinetic joint C coupled to the drive train of the vehicle.

Fitted on the axle B is a spindle 1 on which is rotatably mounted a wheel hub D through bearings 4.

The spindle 1 comprises a shaft portion 2 having a bore through which the axle B extends, and a flange portion 3 having its end secured to a knuckle E by means of bolts 5 and adapted to bear the thrust load applied through bearings 4.

The rotation transmission device A has an inner ring 7, as a driving member, mounted on the outer end of the axle B through serrations 6. An outer ring 8, as a driven member, is rotatably mounted around the inner ring 7. The outer ring 8 has one end thereof fixed to one end of the wheel hub D by means of a plurality of bolts 9 and is provided, at the other end, with a closure wall covering the outer ends of the inner ring 8 and the axle B to keep off out rainwater and dust.

Figure 7:
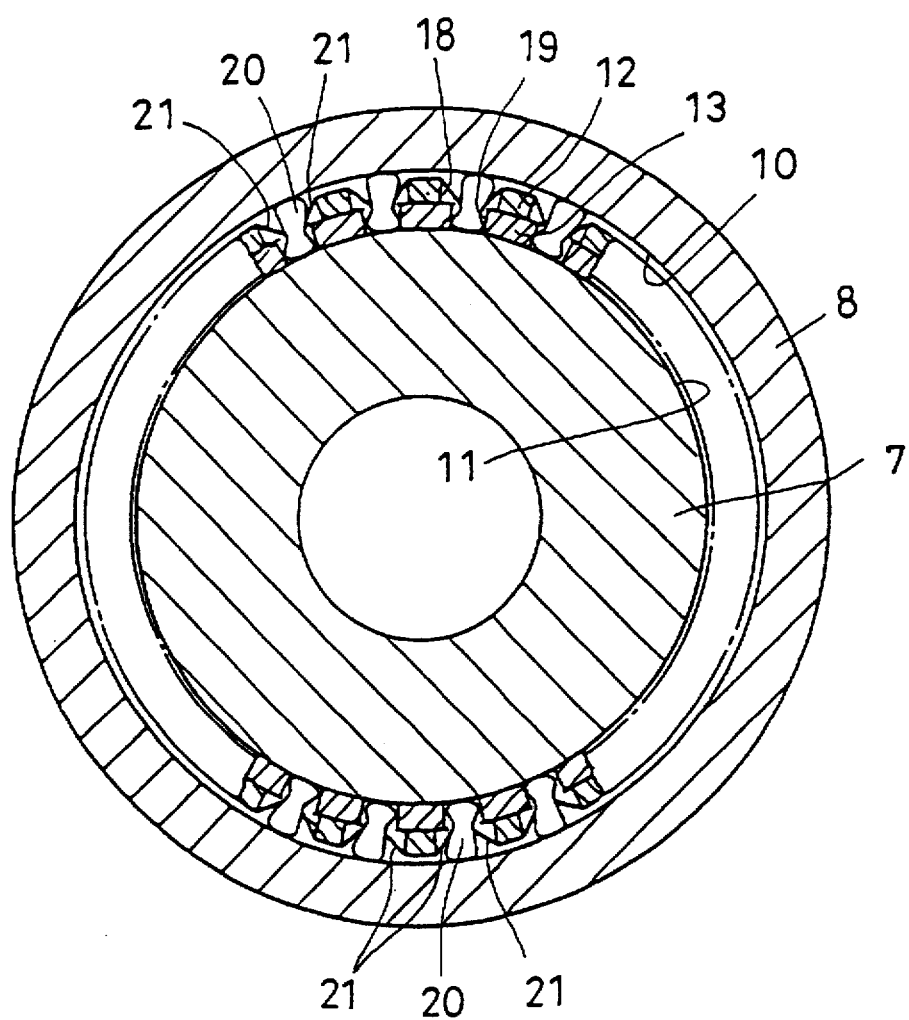
FIG. 7 is a sectional view taken along line VII—VII of FIG. 2.
Figure 9:
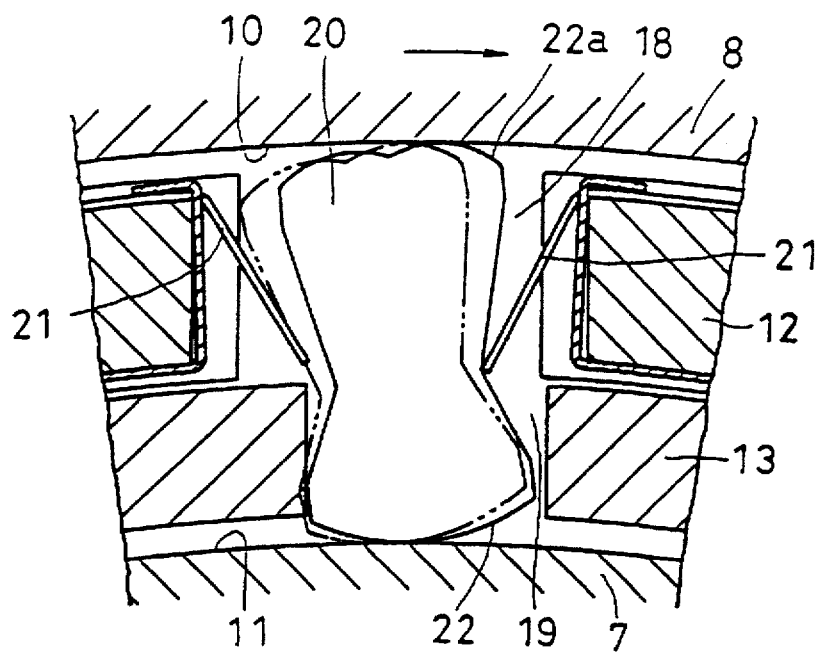
FIG. 9 is a sectional view of a sprag showing its forward-travel engageable position and free-running position.

As shown in FIGS. 7 and 9, the outer ring 8 and the inner ring 7 are formed, on their respective inner and outer peripheral surfaces, with cylindrical surfaces 10 and 11, between which are provided a large-diameter cage 12 and a small-diameter cage 13.

Figure 2:
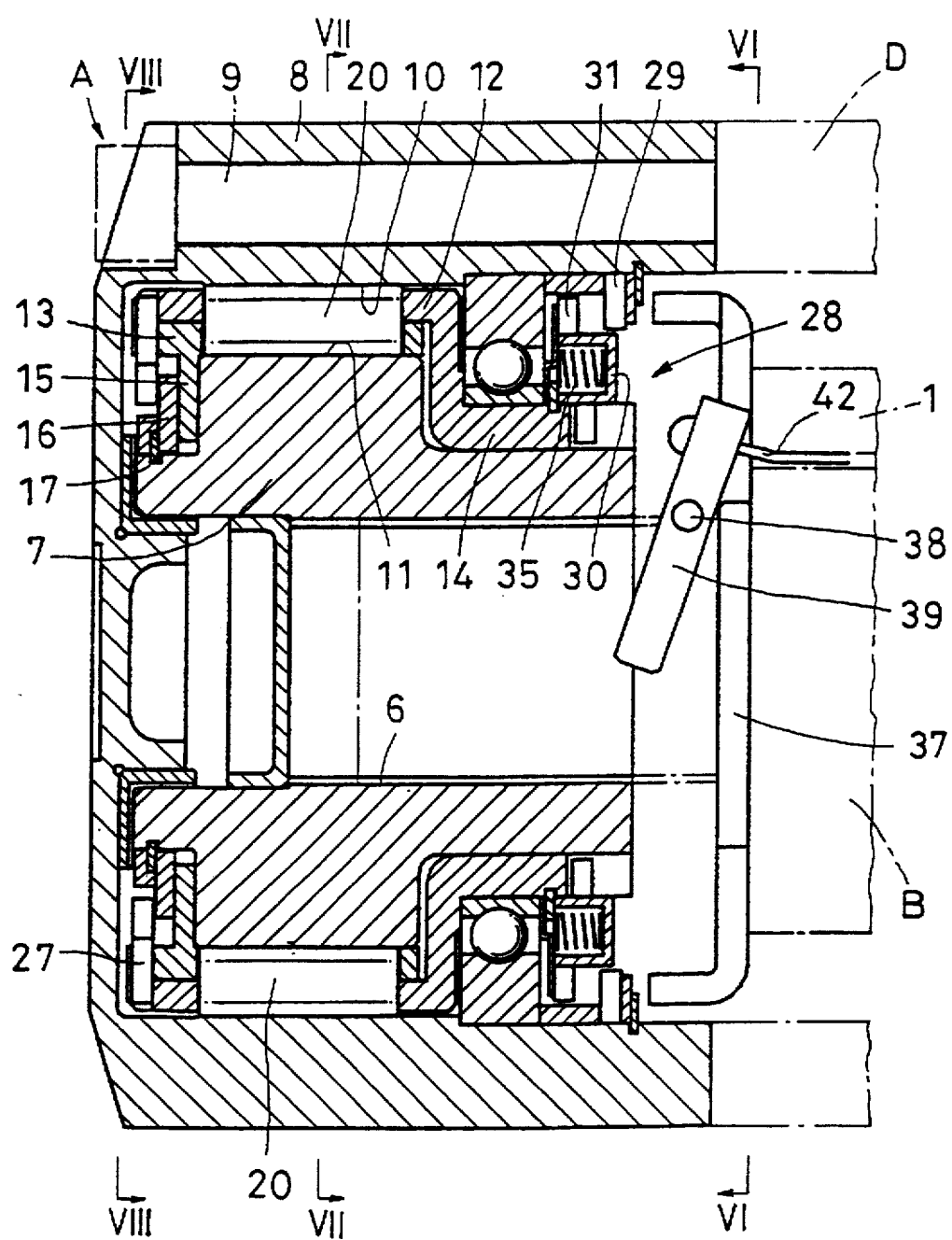
FIG. 2 is a vertical sectional view of the rotation transmission device of one embodiment.

As shown in FIG. 2, the large-diameter cage 12 has an integral rear arm 14 rotatably supported by the outer ring 8 and the inner ring 7 while being guided by a bearing.

On the other hand, the small-diameter cage 13 has a bent portion 15 extending radially inward from its front end and kept in sliding contact with the end face of the inner ring 7. A disc spring 16 is disposed between the bent portion 15 and a retaining ring 17. It presses the bent portion 15 against the end face of the inner ring 7, so that the small-diameter cage 13 is kept in frictional contact with the inner ring 7.

As shown in FIGS. 7 and 9, the large-diameter cage 12 and the small-diameter cage 13 have a plurality of pockets 18 and 19, respectively, that are radially aligned with each other. Disposed in each pair of pockets 18, 19 are engaging elements or sprags 20 and springs 21 for retaining the sprags 20.

The sprags 20 have symmetrical arcuate surfaces 22 and 22a (FIG. 9) having different centers of curvature from each other so that they interlock the outer ring 8 and inner ring 7 together by engaging cylindrical surfaces 10 and 11 when they incline by a predetermined angle in either direction. The springs 21, having one end thereof secured to the large-diameter cage 12, urge each sprag 20 from both sides, keeping it in engagement with the cylindrical surfaces 10 and 11.

Figure 8:
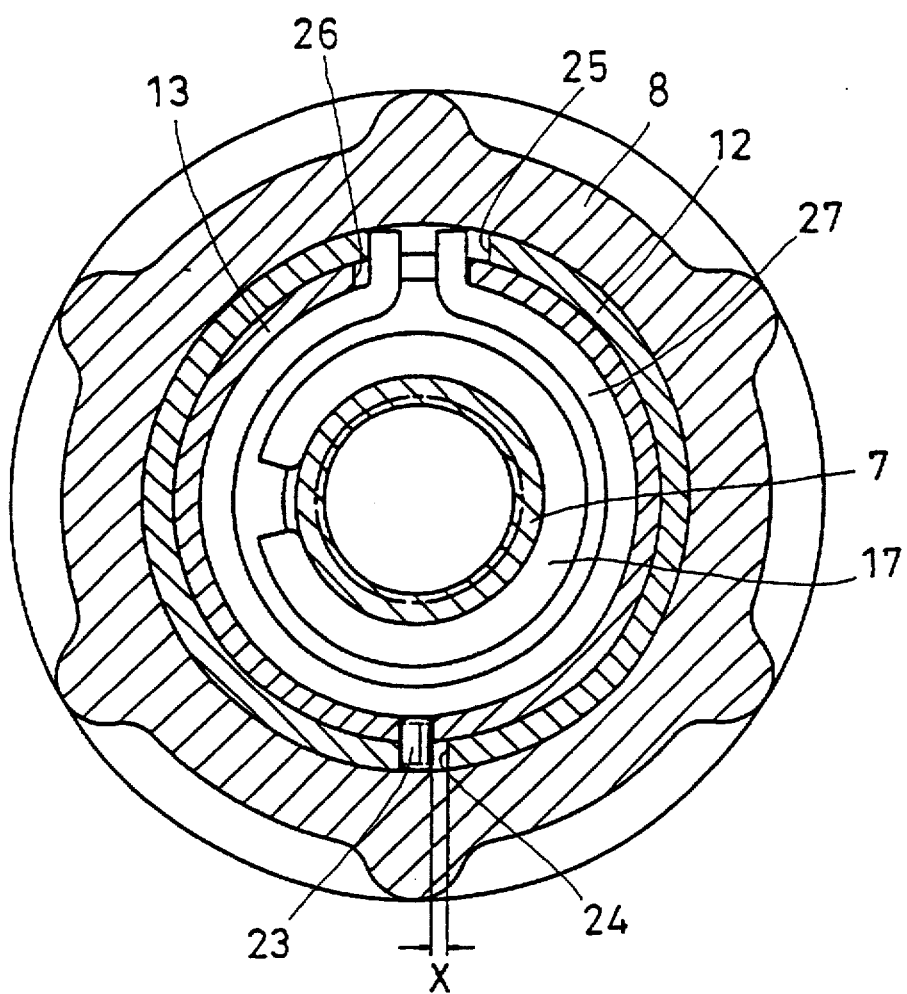
FIG. 8 is a sectional view taken along line VIII—VIII of FIG. 2.

As shown in FIG. 8, a stopper pin 23 protruding from the circumferential portion of the small-diameter cage 13 engages in a square hole 24 formed in the large-diameter cage 12 with a gap X being left in the direction of rotation between the hole 24 and the pin 23.

Diametrical slits 25 and 26 are formed (FIG. 8) through the large-diameter cage 12 and the small-diameter cage 13. A C-shaped switch spring 27 is mounted inside the cages 12, 13 in a compressed state with both ends thereof engaged in the slits 25, 26. The cages 12 and 13 are thus biased in the opposite circumferential directions by the respective ends of the spring 27, so that the large-diameter cage 12 turns until it engages the stopper pin 23 press-fitted in the small-diameter cage 13.

Figure 10:
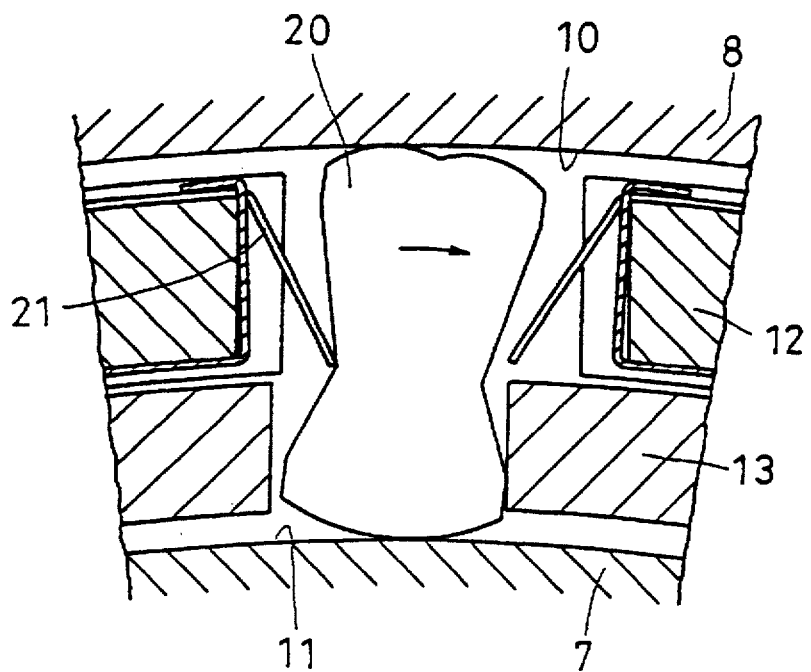
FIG. 10 is a sectional view of a sprag showing its backward-travel engageable position and non-free-running position.

The size of the gap X provided between the stopper pin 23 and the side wall of the square hole 24 in the rotational direction is such that the sprags 20 can incline in either direction until they nearly engage the cylindrical surfaces 10, 11 as shown in FIG. 9 and 10. Namely, in the state of FIGS. 9 and 10, the cages 12, 13 and the sprags 20 are kept in the stand-by position by the switch spring 27. In this embodiment, the large-diameter cage 12 is biased in one direction by the switch spring 27.

Coupled to the rear end of the arm 14 of the large-diameter cage 12 is a locking means (or locking mechanism) 28 through which the large-diameter cage 12 is separably connected to the outer ring 8. (FIG. 2)

Figure 3:
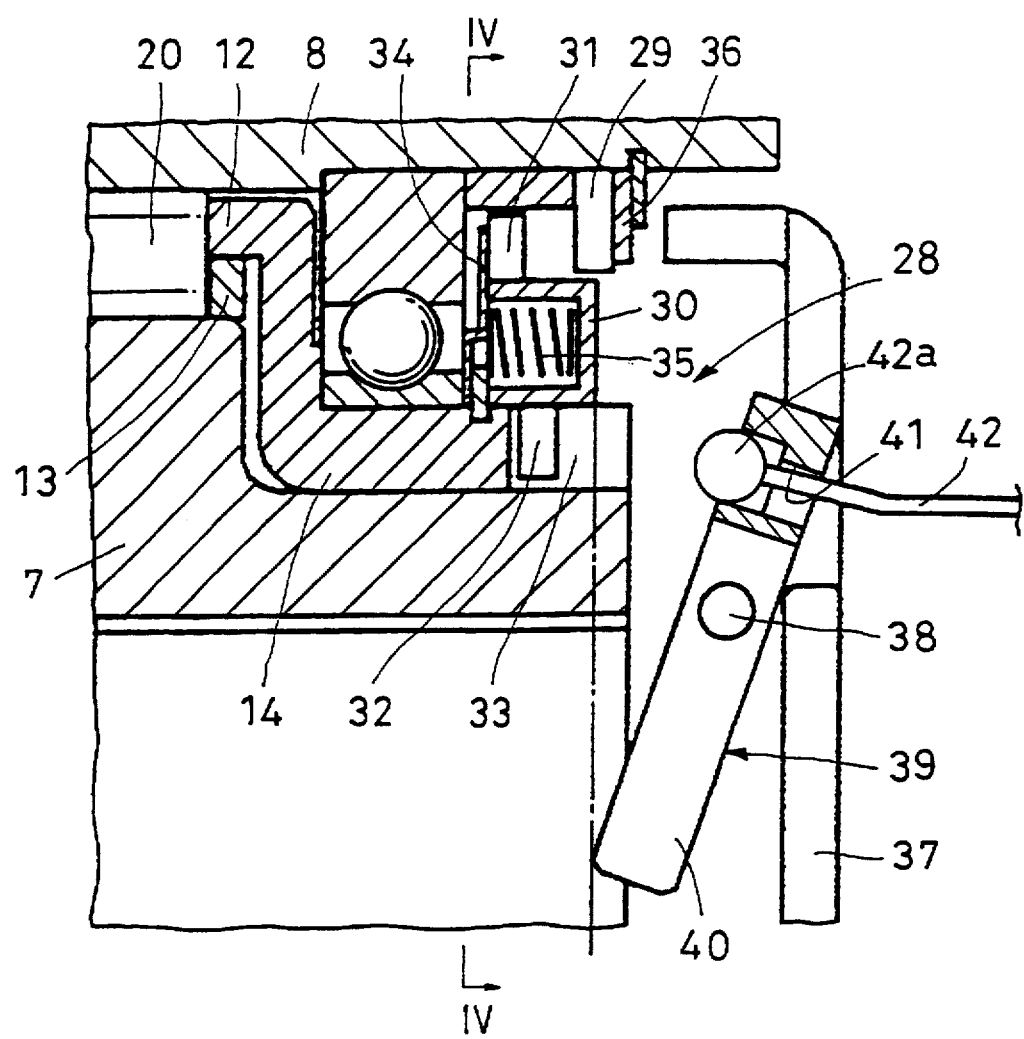
FIG. 3 is an enlarged sectional view of the locking means of the same.
Figure 4:
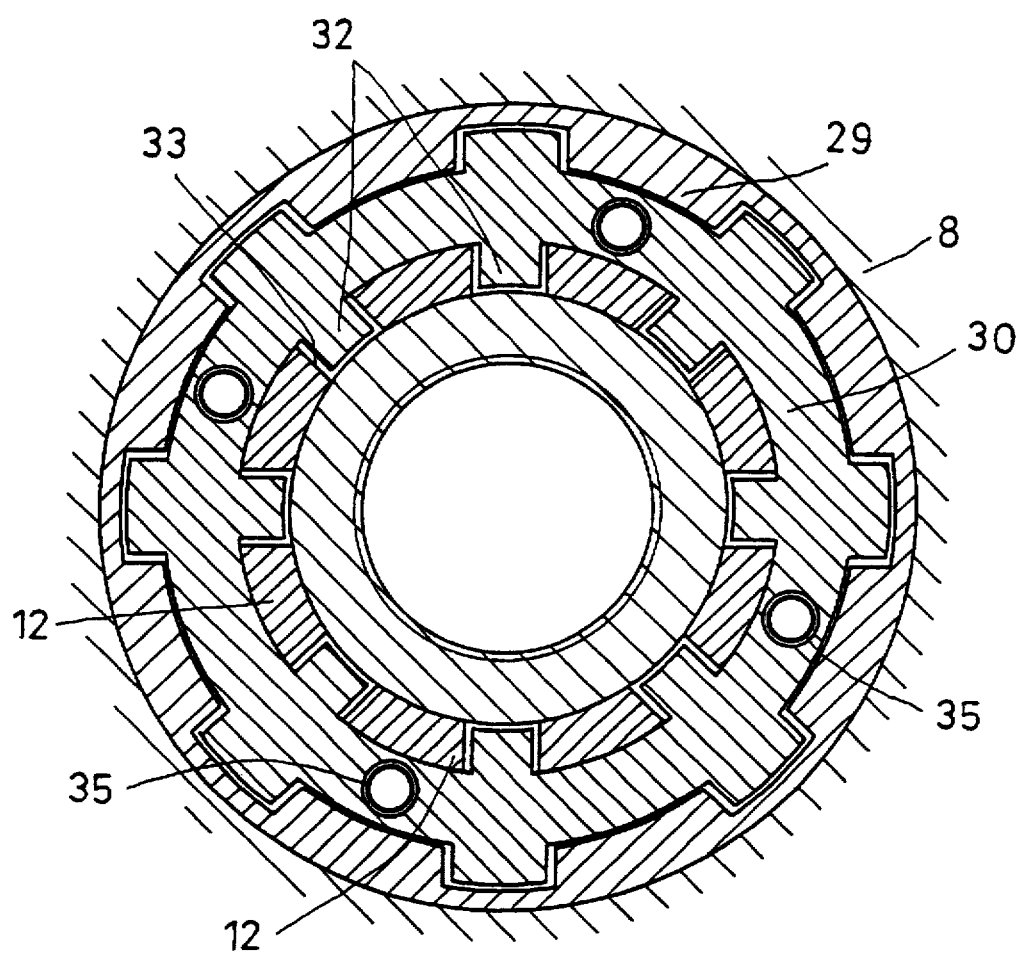
FIG. 4 is a sectional view taken along line IV—IV of FIG. 3.

The locking means 28 comprises, as shown in FIG. 3 and 4, an engaging member 28 having teeth and press-fitted in the outer ring 8 by frictional force, and a ring-shaped coupling member 30 slidably mounted on the arm 14 of the large-diameter cage 12 near its end and having teeth 31 formed on the outer periphery thereof near its one end and adapted to move axially and mesh with the teeth of the engaging member 29.

The coupling member 30 has ribs 32 formed on the inner periphery thereof and engaging in axial grooves 33 formed in the rear end of the large-diameter cage 12, so that the coupling member 30 can only axially slidable relative to the cage 12. Namely, it cannot rotate relative to the cage 12.

Figure 5:
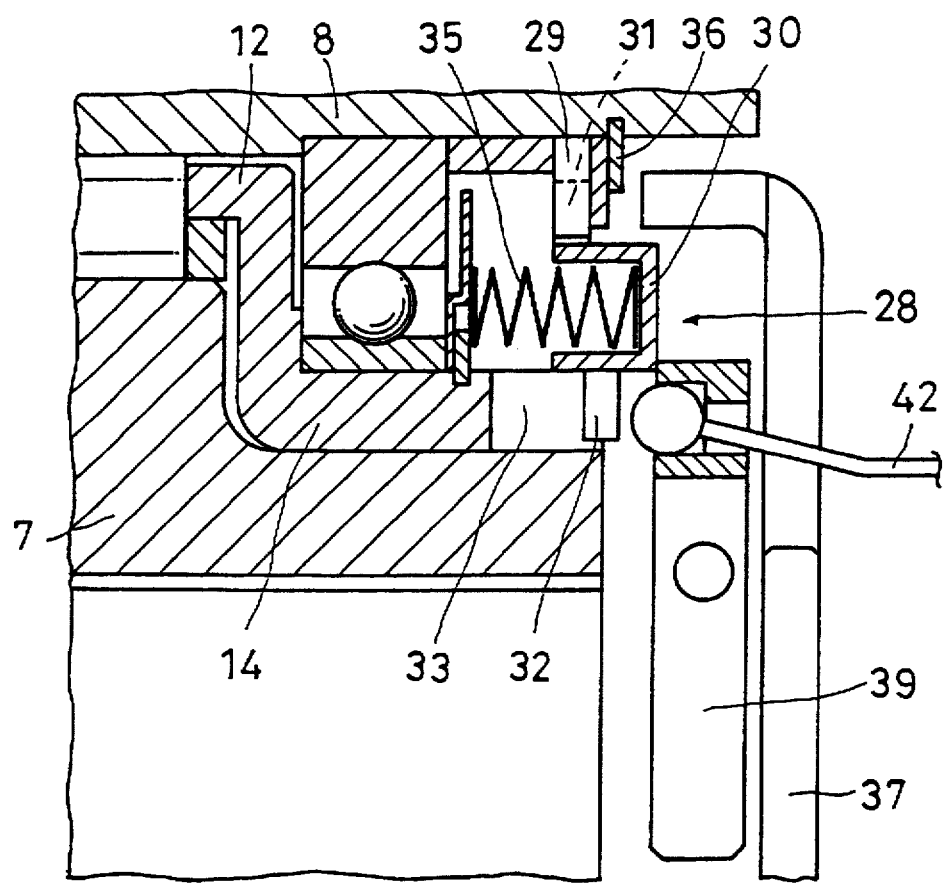
FIG. 5 is a sectional view of the locking means in its locked position.

A coil spring 35 is mounted between the coupling member 30 and a spring seat 34 mounted on the large-diameter cage 12. The outer ring 8 carries a belleville spring 36 on its inner periphery to prevent the dropout of the coupling member 30. As shown in FIG. 5, when the coupling member 30 is pushed by the coil spring 35 against the belleville spring 36, its teeth 31 mesh with the engaging member 29.

In the rear of the large-diameter cage 12 is a case 37 fixed to the spindle 1. A control lever 39, provided inside of the case 37, is mounted on a pin 38 (FIG. 3) so as to be pivotable back and forth.

Figure 6:
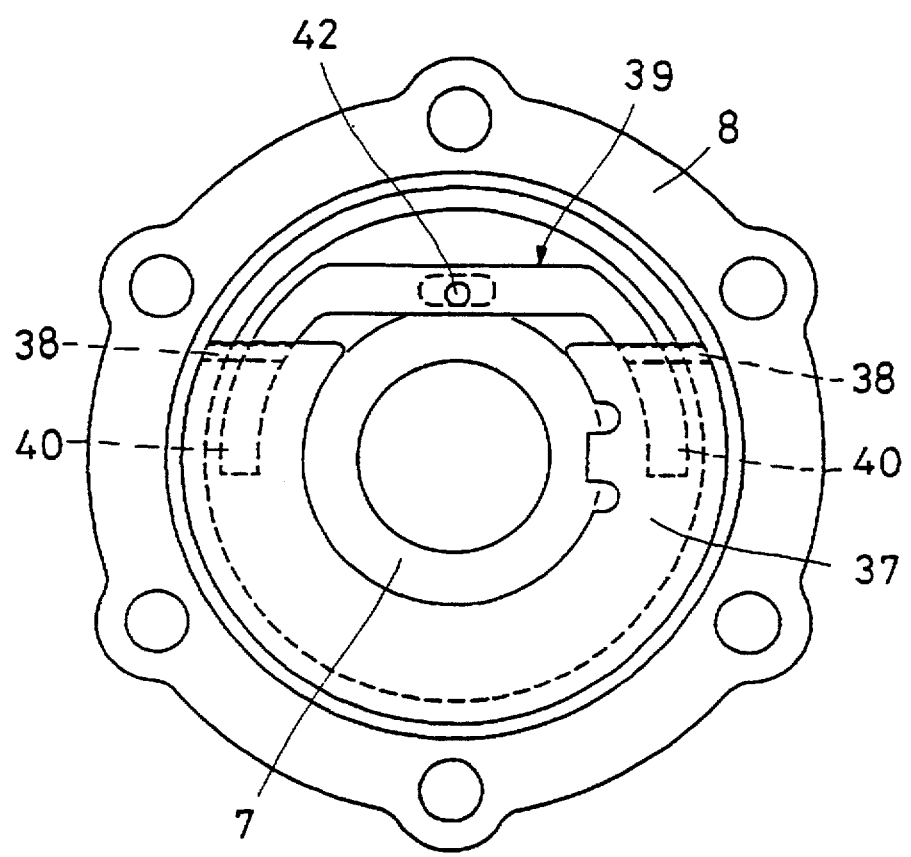
FIG. 6 is a side view taken along line VI—VI of FIG. 2.

As shown in FIG. 6, the control lever 39 has a pair of arms 40 protruding outwardly from the outer periphery of the large-diameter cage 12. When lever 39 pivots in the direction shown in FIG. 3, the free ends of the arms 40 move into the space between the large-diameter cage 12 and the outer ring 8, thereby pushing the coupling member 30 forward.

The control lever 39 is formed, in its top and portion, with a through hole 41 in which one end 42a of a wire cable 42 engages. (FIG. 3)

Figure 11A:
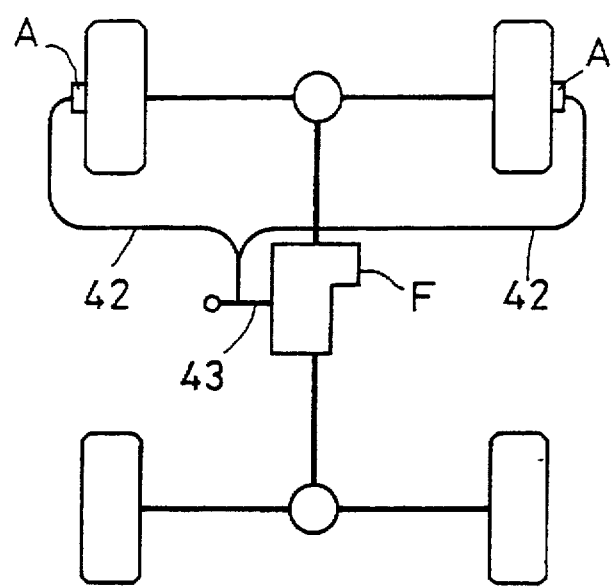
FIGS. 11A and 11B are schematic views showing how remote-controlled through wire cable.

As shown in FIG. 11a, the wire cable 42 runs along the drive train of the four-wheel drive vehicle and has the other end coupled to a driving mode changeover lever 43 in the transfer F. Thus, the wire cable 42 is remote-controllable through the changeover lever 43 in the transfer F.

Figure 11B:
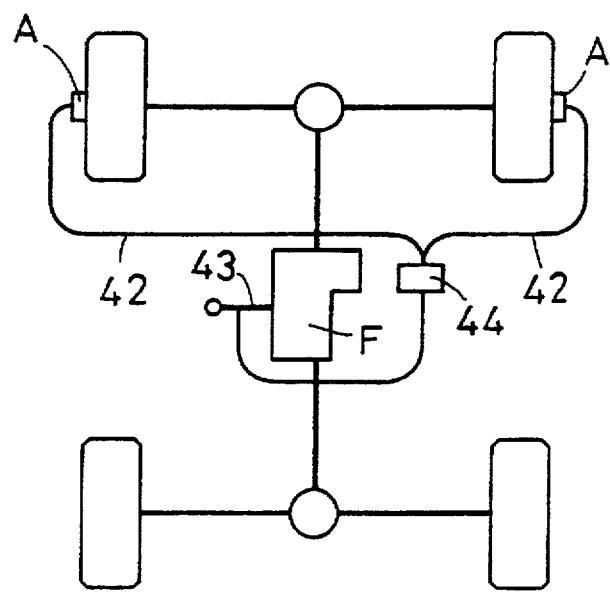
Figure 12:
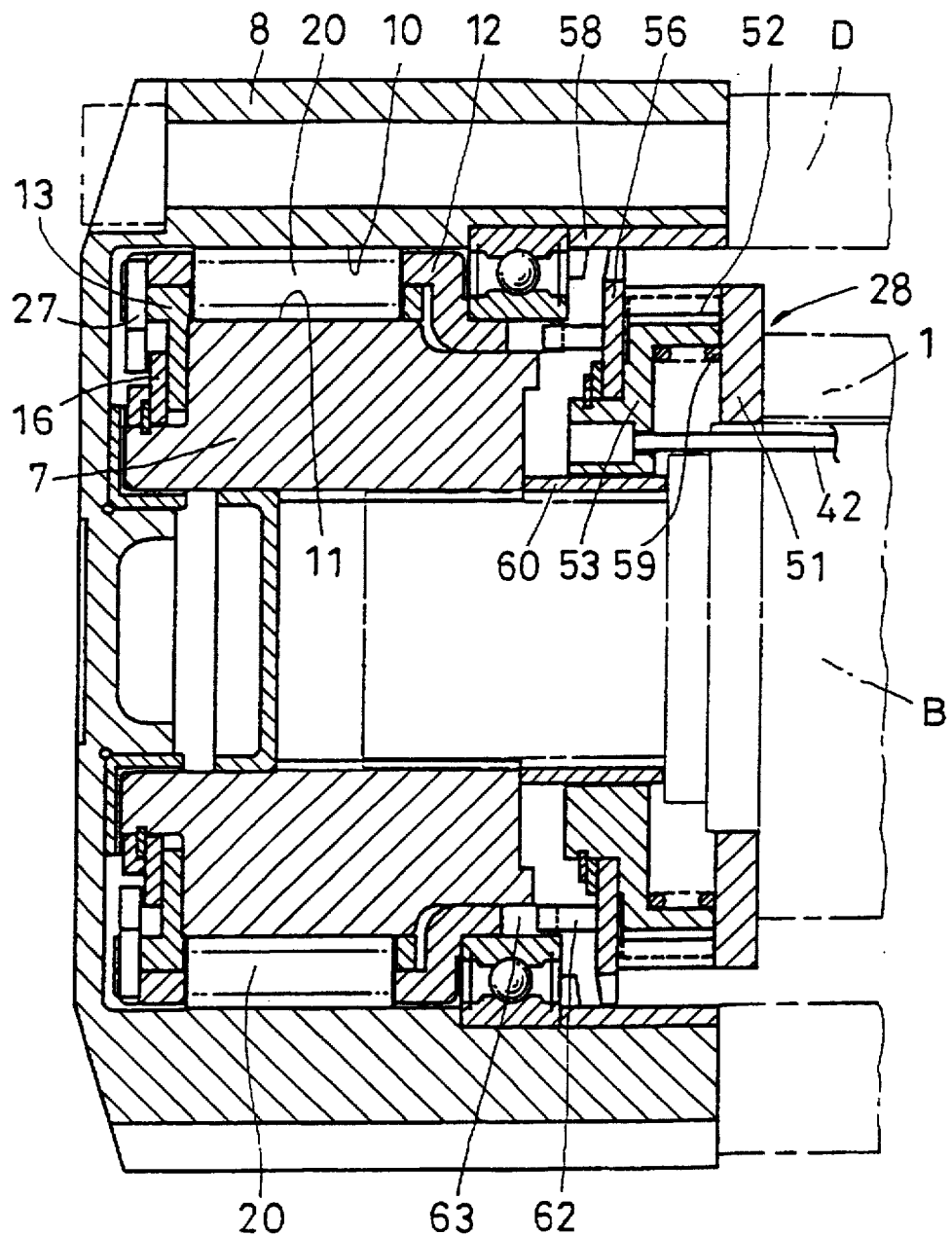
FIG. 12 is a vertical sectional view of a second embodiment.

As shown in FIG. 11b, a driving means 44 such as a motor or an actuator may be provided along the wire cable 42 to mechanically or electrically actuate the changeover lever 43. Otherwise, the changeover lever 43 and the driving means 44 may be actuated separately from each other.

In operation of the locking means 28, by pulling the wire cable 42 rearward, the control lever 39 pivots as shown in FIG. 3, so that the coupling member 30 will be pushed forward by the arms 40 of the control lever, separating from the engaging member 29. (FIG. 5) The large-diameter cage 12 is thus disconnected from the outer ring 8. When the wire cable 42 is loosened in this state, the coupling member 30 is pushed rearward by the coil spring 35 until it meshes with the engaging member 29. The large-diameter cage 12 is thus locked to the outer ring 8.

We will now explain how the rotation transmission device A of the embodiment operates while the vehicle is traveling.

During the two-wheel drive mode, the coupling member 30 is uncoupled from the engaging member 29 and thus the outer ring 8 is uncoupled from the large-diameter cage 12 by pivoting the control lever 39 to the position shown in FIG. 3 by pulling the wire cable 42.

When the vehicle begins to move forward in this state, the large-diameter cage 12, biased by the switch spring 27, will rotate relative to the inner ring 7, inclining the sprags 20 in the direction shown in FIG. 9 until they nearly engage the cylindrical surfaces 10, 11.

In this state, as long as the outer ring 8 is rotating faster than the front wheel axle, the outer ring 8 is allowed to free-run. Thus, the driving force from the vehicle wheel is not transmitted to the front wheel axle B, either. In this state, the driving force from the engine is not being supplied to the axle B, either. Thus, during the two-wheel drive mode, only the rear wheels are driven by the engine, while the drive train from the transfer to the front wheel axle is kept stopped even though the front wheels are rotating.

Thus, during the two-wheel drive mode, the vehicle equipped with the rotation transmission device of this invention can travel as quietly as and with as high fuel economy as part-time four-wheel drive vehicles with conventional manual or automatic free-wheel hubs.

When traveling on a road surface whose friction coefficient is low, such as a snow-covered road surface, the wire cable 42 is loosened to move the coupling member 30 into engagement with the engaging member 29 as shown in FIG. 5. The driving mode is now set in four-wheel drive.

In this state, torque is transmitted from the front wheel axle B to the wheel hub D through the outer ring 8. While braking forces are being applied from the engine, the front wheel axle B is rotating faster than the outer ring 8 or the driven member, so that the large-diameter cage 12 is turned by the outer ring 8 until the sprags 20 incline to the position shown in FIG. 10, engaging the cylindrical surfaces 10 and 11 of the inner and outer rings 7, 8. The outer ring 8 cannot free-wheel any more. Namely, the inner ring 8 and the front wheel axle B are locked to each other, so that the front and rear wheels are also locked together.

In this arrangement, it is not necessary to back the car in order to change over the driving mode from four-wheel drive to two-wheel drive. In other words, even if the car is backed during the four-wheel drive mode in an attempt to get out of trouble, the driving mode will remain unchanged, so that the car can get through a slippery road more easily.

If the car gets stuck while climbing a long slope with a slipper surface, the driver will have to change over the drive mode from two-wheel drive to four-wheel drive. According to the present invention, this changeover takes place instantly with no time lag. Thus, the moment the vehicle is started again, all the four vehicle wheels will begin to turn at the same time, propelling the car strongly and smoothly.

When the car is traveling on a high-friction road surface such as a paved road surface while in the four-wheel drive mode, the control lever 39 is turned to the position shown in FIG. 3 by pulling the wire cable 42 to disengage the outer ring 8 from the large-diameter cage 12.

In this state, while moving forward, the car is basically driven by all the four wheels, though the front wheels are decoupled into a free-run state if there appears any difference in rotating speed between the front and rear wheels.

Namely, while the car is turning a corner, the outer ring 8 coupled to the front wheels rotates faster than the inner ring 7 due to the difference in travel distance between the front and rear wheels. Namely, the outer ring 8 free-runs relative to the sprags 20. Since the front wheels are decoupled from the rear wheels in this state, no unintended braking force will act on the vehicle wheels even while turning a tight corner.

On the other hand, when the car is backed in the two-wheel drive mode, the sprags 20 are tipped to the forward-travel engaging position by the action of the switch spring 27. Thus, torque is transmitted from the wheel hub D or driven member to the drive train of the vehicle through the front wheel axle B. During the four-wheel drive mode, the outer ring 8 and the large-diameter cage 12 are interlocked by means of the locking means 28, so that when the outer ring 8 rotates faster than the front wheel axle B or driving member, the sprags 20 are tipped to the opposite side, i.e. to the backward-travel engaging position, so that torque is transmitted through the sprags. Namely, the outer ring 8 will engage instead of overrunning, so that the engine brake is applied to the front wheels.

(Second Embodiment)

FIGS. 12 through 15 show the second embodiment.

This embodiment is basically the same both structurally and functionally as the first embodiment, but differs in that the locking means is actuated not through the pivoting control lever 39 but directly by the wire cable 42.

Namely, in this embodiment, a control member 53 is axially slidably mounted through an axial spline 52 to a case 51 fixed to the spindle 1. One end of the wire cable 42 is directly coupled to the control member 53.

A coupling member 56 is mounted on the outer periphery of the control member 53 by means of a retaining ring 54 and a spacer 55. An engaging member 58 is press-fitted into the outer ring 8. It is adapted to mesh with teeth 57 formed on the outer periphery of the coupling member 56. The coupling member 56 has its ribs 62 engaged in axial grooves 63 formed in the large-diameter cage 12, so that it cannot rotate relative to the cage 12.

A coil spring 59 is mounted between the control member 53 and the case 51. It biases the coupling member 56 to the position where it meshes with the engaging member 58.

Mounted between the front wheel axle B and the control member 53 is a guide ring 60 for guiding the sliding movement of the control member 53 and the coupling member 56.

Figure 13:
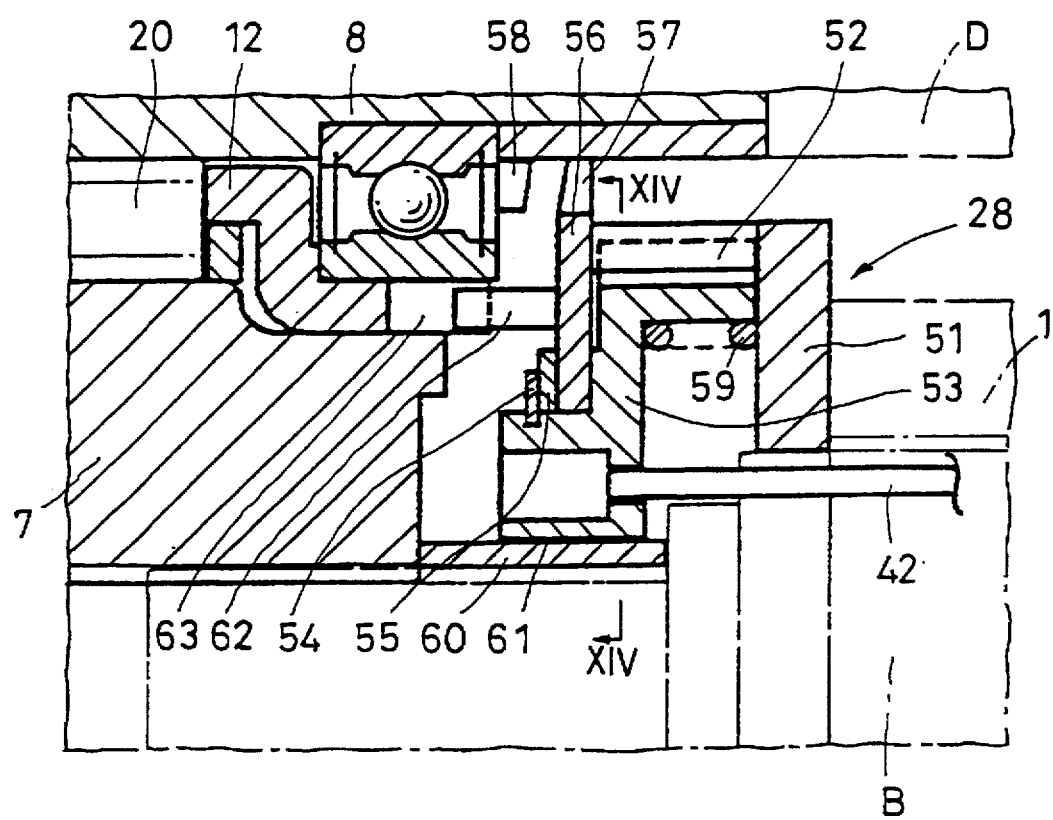
FIG. 13 is an enlarged sectional view of the locking means of the same.
Figure 14:
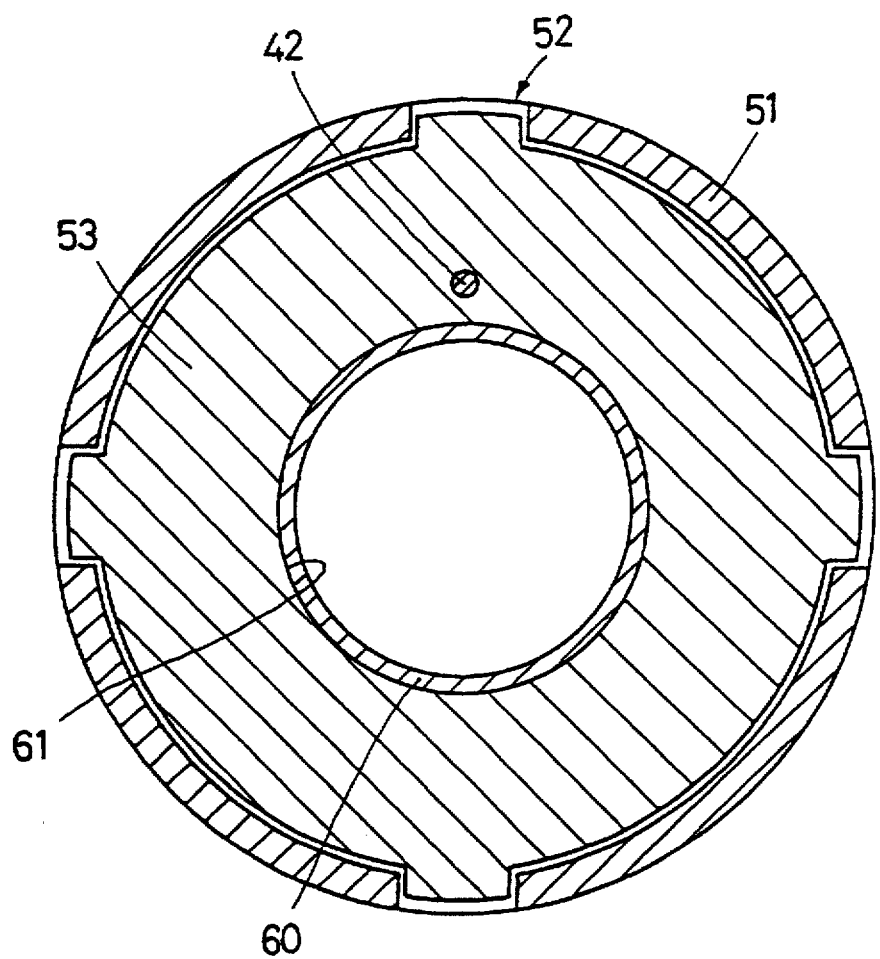
FIG. 14 is a sectional view taken along the line XIV—XIV of FIG. 13.

In this arrangement, by pulling the control member 53 toward the case 51 through the wire cable 42, the coupling member 56 separates from the engaging member 58 as shown in FIG. 13, so that the large-diameter cage 12 is decoupled from the outer ring 8.

Figure 15:
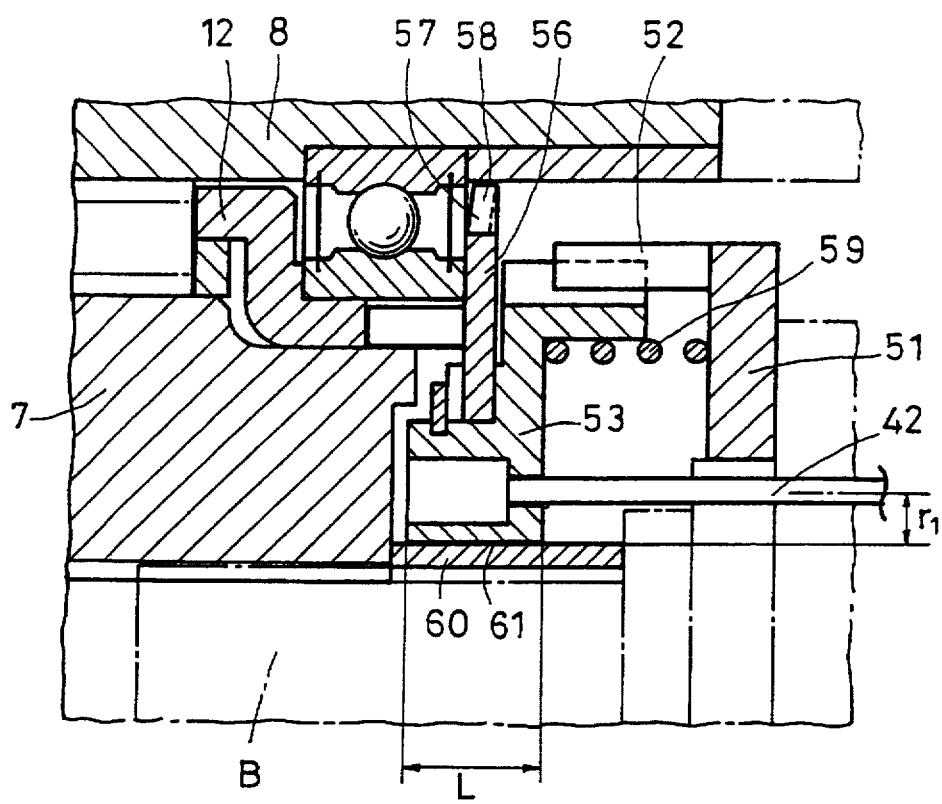
FIG. 15 is a sectional view of the locking means in its locked state.

On the other hand, as shown in FIG. 15, by loosening the wire cable 42, the coupling member 56 is pushed by the coil spring 59 to the position where it meshes with the engaging member 58. The large-diameter cage 12 is now locked to the outer ring 8.

In the state of FIG. 15, the coupling member 56 and the outer ring 8 rotate as a one-piece member, while the control member 53, bound by the spline 52, is kept stationary. Thus, slip occurs between the coupling member 56 and the control member 53.

In the first embodiment, by pulling the wire cable 42, the control lever 39 pivots so that its arms 40 are pressed against the center of the coupling member 30. Thus, the coupling member 30 is pushed accurately in the axial direction, so that it can be slid smoothly. In the second embodiment, by pulling the wire cable 42, which is connected to the control member 53 at its off-center point, angular moment acts on the control member 53. Thus, the control member 53 cannot be slid smoothly. Rather, it tends to get hitched and stuck while sliding due to the angular moment.

In order to solve this problem, in the second embodiment, the control member 53 has a wider inner portion. Namely, the guide surface 61 of the control member 53, i.e. the surface in sliding contact with the guide ring 60, has a length L larger then the radial distance 51 between the wire cable 42 and the guide surface 61 (L≧r1).

With this arrangement, even if turning moment acts on the control member 53 by pulling the wire cable 42, the control member 53 is less likely to be inclined because it is supported on the guide ring 60 along the long guide surface 61, so that it can be slid smoothly.

Figure 16:
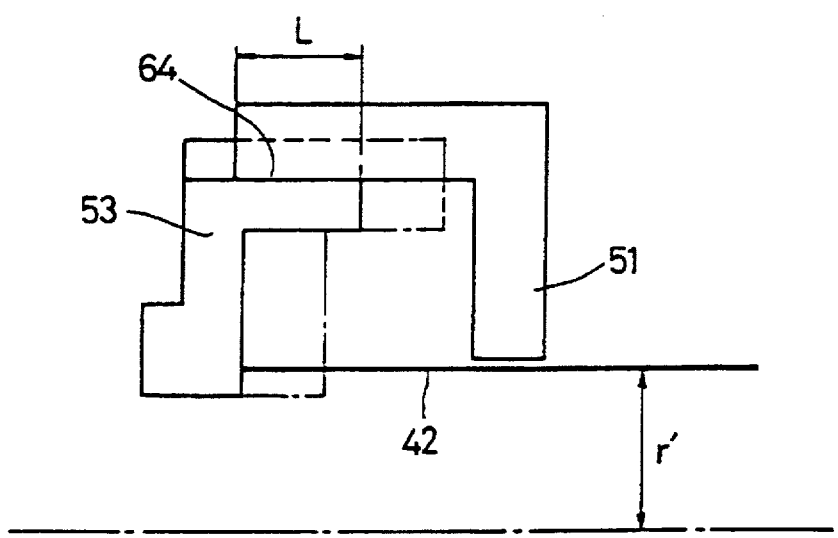
FIG. 16 is a view showing another example of the guiding structure for the control member.

In this embodiment, the guide surface 61 is provided inwardly from the point at which the wire cable 42 is connected to the control member 53. But as shown in FIG. 16, the control member may have a guide portion 64 provided outwardly from the connecting point of the wire cable 42. In this case, the guide portion should have a width L larger than the radial distance r' between the center of the control member and the wire cable 42 (L≧r'). Thus, the control member 53 can be moved smoothly even if subjected to angular moment, because it is guided by the fairly long guide surface 61.

In the first and second embodiments, the locking means 28 are released by pulling the wire cable 42 and engaged by loosening it. But if the coupling member 30, 56 and the engaging member 29, 58 are mounted in the opposite way, the locking means can be released and engaged by controlling the wire cable in the opposite way to the above.

(Third Embodiment)

Figure 17:
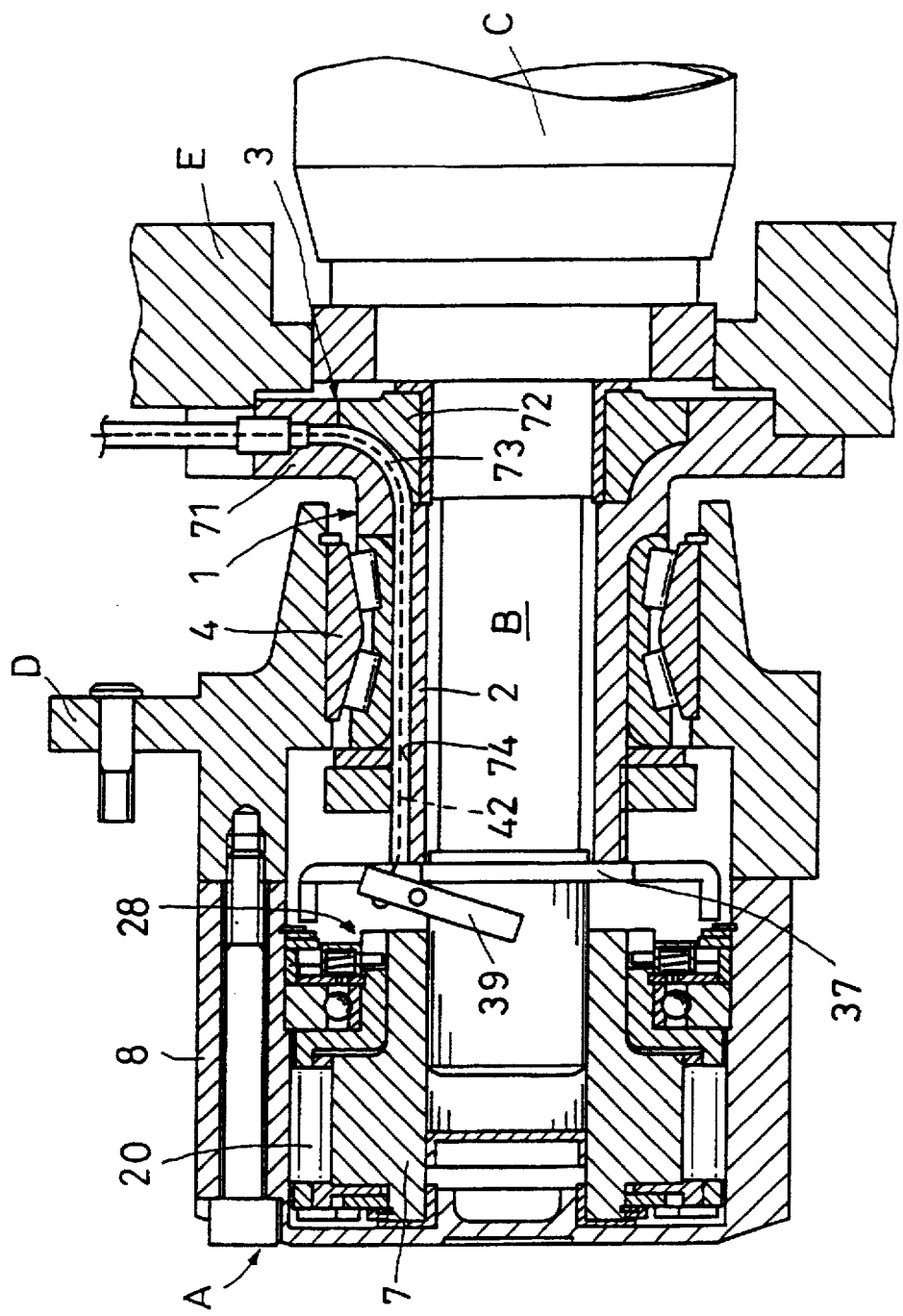
FIG. 17 is a vertical sectional view of a third embodiment.
Figure 18:
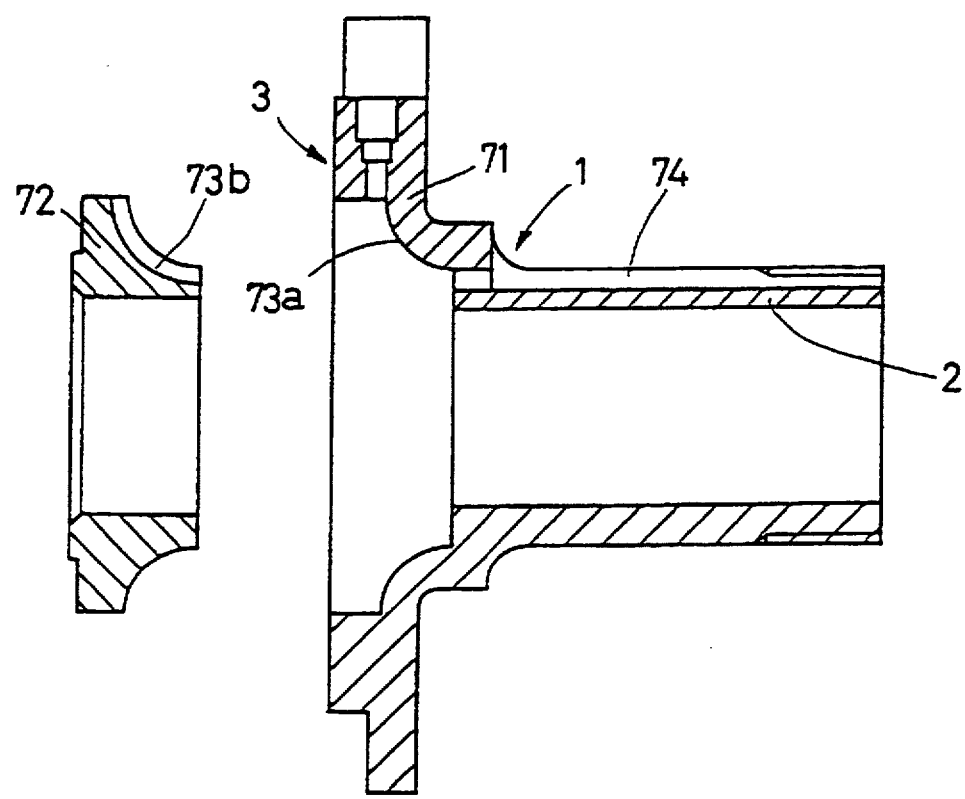
FIG. 18 is a vertical sectional view of the spindle of the third embodiment showing its unassembled state.
Figure 19A:
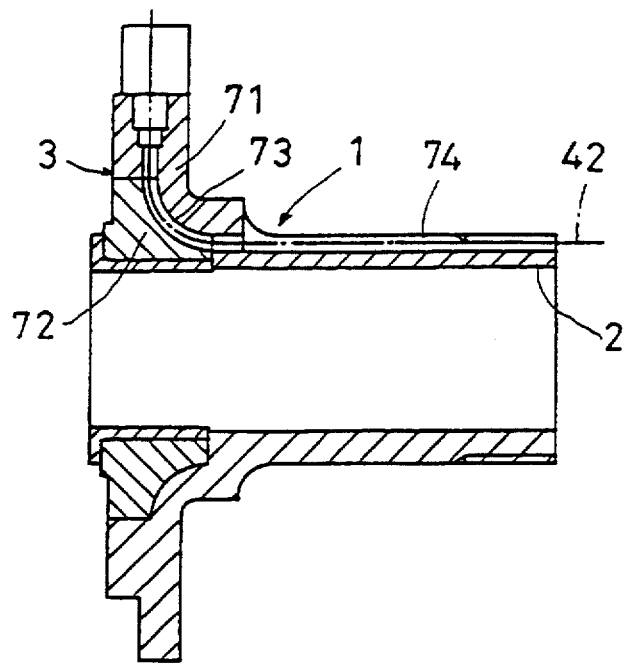
FIG. 19A is a vertical sectional view of the spindle showing its assembled state.
Figure 19B:
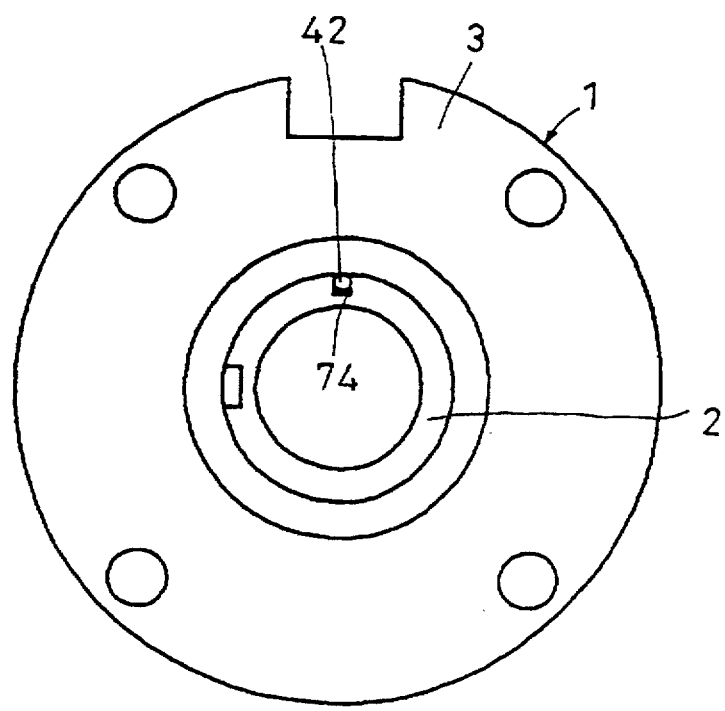
FIG. 19B is a side view of the spindles of FIG. 19A.

FIGS. 17–19 show the third embodiment, which provides an arrangement for preventing the wire cable extending from each front wheel to the transfer from being subjected to any undue force.

As shown in FIG. 17, each front wheel portion of an ordinary four-wheel drive vehicle includes a homokinetic joint C and a front wheel axle B which is actually the shaft of the joint C. The axle B supports a spindle 1 which in turn supports a hub D through a bearing 4. Since the homokinetic joint C itself rotates, it is impossible to pull the wire cable 42 extending from the rotation transmission device A straight in the axial direction.

Figure 23:
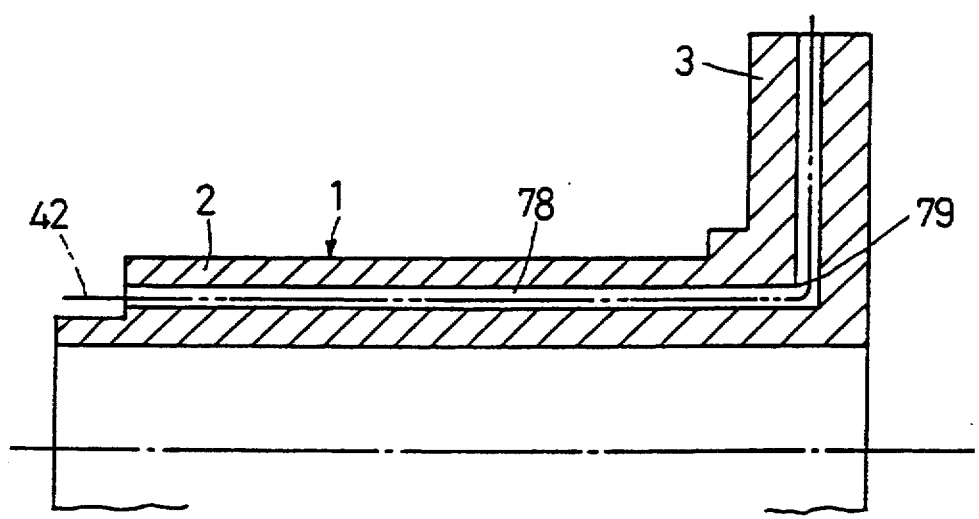
FIG. 23 is a sectional view showing how a conventional spindle is formed.

One possible solution to this problem is shown in FIG. 23. In this arrangement, the wire cable 42 is passed through a passage 78 formed in the spindle 1 and pulled out from the outer peripheral surface of its flange portion 3. This arrangement has a problem in that if the spindle 1 is a one-piece member, the passage 78 formed in the spindle has to be bent at a rather sharp angle. Namely, such a passage 78 has an edge portion 79. When the wire cable 42 is moved in the passage, the edge portion 79 inevitably interferes with the wire. This often leads to premature breakage of the wire.

In the third embodiment, as shown in FIGS. 18 and 19, the flange portion 3 of the spindle 1 comprises two separate members, i.e. a flange body 71 and a ring 72 adapted to be press-fitted into the body 71. A cable passage 73 is formed at the interface between the flange body 71 and the ring 72.

Since the contact surfaces of the flange body 71 and the ring 72 have a large curvature, it is possible to form grooves 73a and 73b having a correspondingly large curvature. By press-fitting the ring 72 into the flange body 71 after forming the grooves 73a and 73b, the cable passage 73 leading to the outer periphery with a large curvature is formed in the flange portion 3.

Further, an axial groove 74 is formed in the outer periphery of the shaft portion 2 of the spindle 1 with one end thereof connecting with the passage 73 formed in the flange portion 3.

The wire cable 42 is inserted into the space formed by the groove 74 in the shaft portion 2 and the bearing 4, and then into the passage 73 formed in the flange portion 3. The wire is then pulled out of the passage 73 and connected to the transfer. Since nowhere in the passage is there a sharp edge or corner, the wire cable 42 can be moved smoothly along the smooth inner surface of the bearing 4 and the surface of the passage 73.

Since the passage 73 in the flange portion 3 has a large curvature, it is possible to insert the wire cable 42 into the passage 73 after sheathing it with an outer tube having a low friction coefficient, thereby further reducing the frictional resistance and thus the wear of the wire cable 42.

Figure 20:
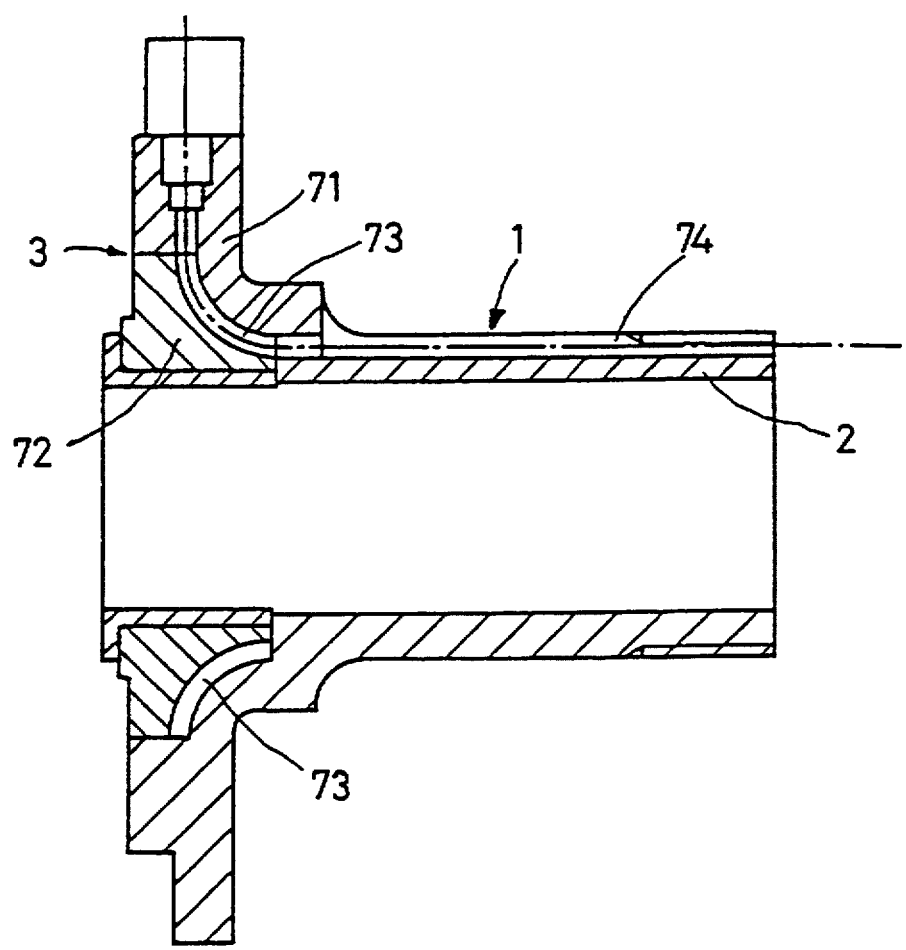
FIG. 20 is a vertical sectional view of another example of a spindle.

As shown in FIG. 20, the passage 73 may be formed in the ring 72 over the entire circumference thereof.

(Fourth Embodiment)

Figure 21A:
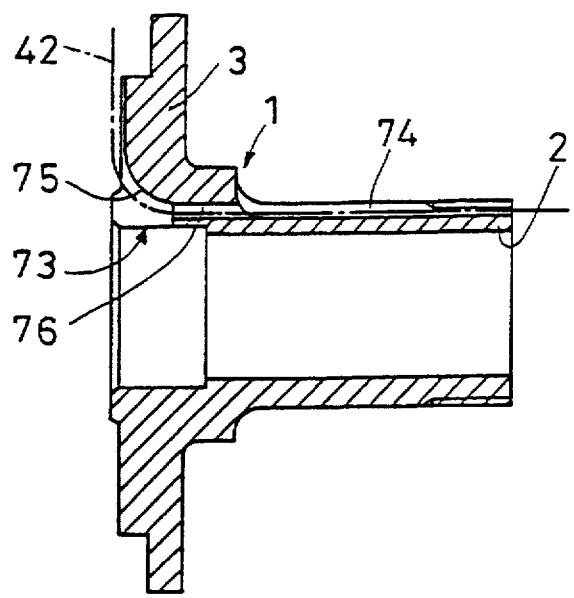
FIG. 21A is a vertical sectional view of a fourth embodiment.
Figure 21B:
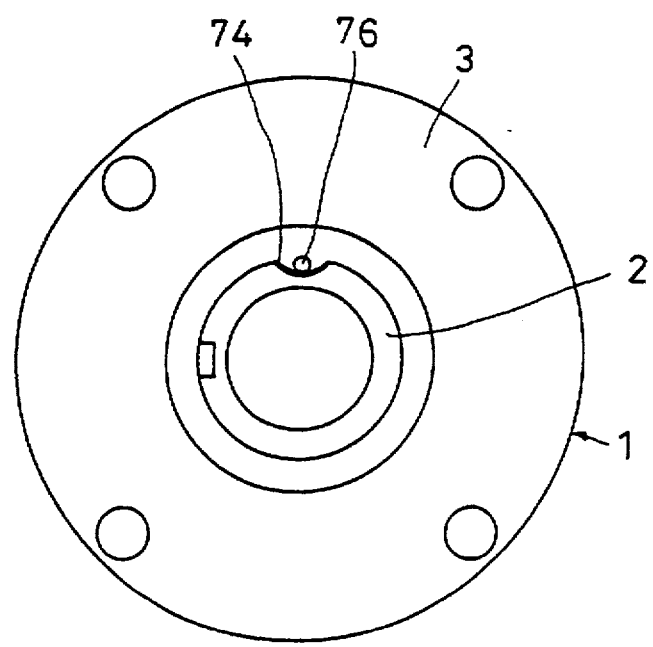
FIG. 21B is a side view of the fourth embodiment.

FIGS. 21A and 21B show the fourth embodiment.

In this embodiment, the spindle 1 has an integral flange portion 3. A moderately curving groove 75 is formed in the inner periphery of the flange portion 3 so as to extend to the outer periphery. Also, a hole 76 is formed in the flange portion 3 through which the groove 75 communicates with the groove 74 formed in the outer periphery of the shaft portion 2. Namely, the cable passage 73 of this embodiment comprises the hole 76 and the groove 75.

(Fifth Embodiment)

Figure 22A:
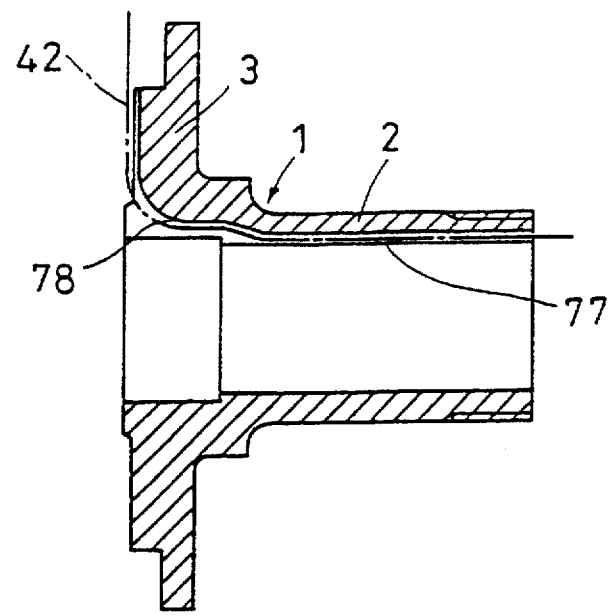
FIG. 22A is a vertical sectional view of a fifth embodiment.
Figure 22B:
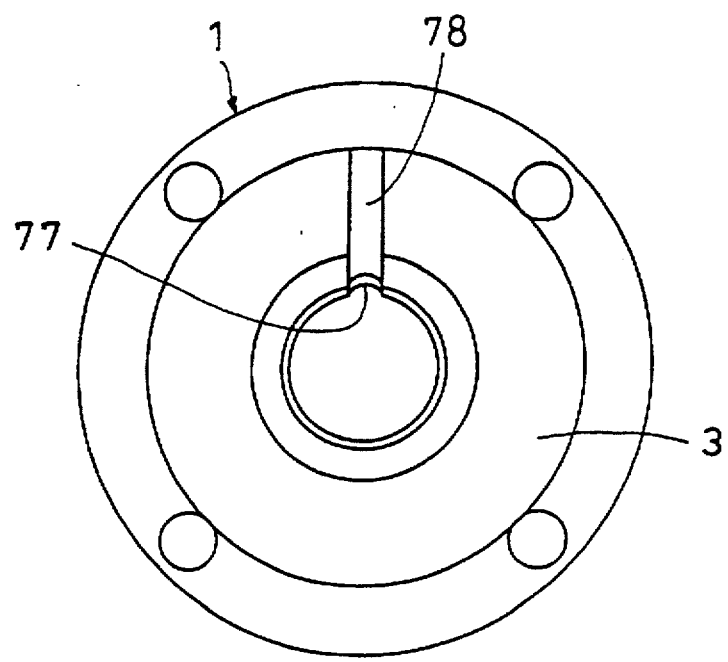
FIG. 22B is a side view of the fifth embodiment.

In the fifth embodiment shown in FIG. 22, the passage for the wire cable 42 comprises a groove 77 formed in the inner peripheral surface of the shaft portion 2, and a curved groove 78 formed in the inner periphery of the flange portion 3 and connecting with the groove 77.

(Sixth Embodiment)

Figure 24:
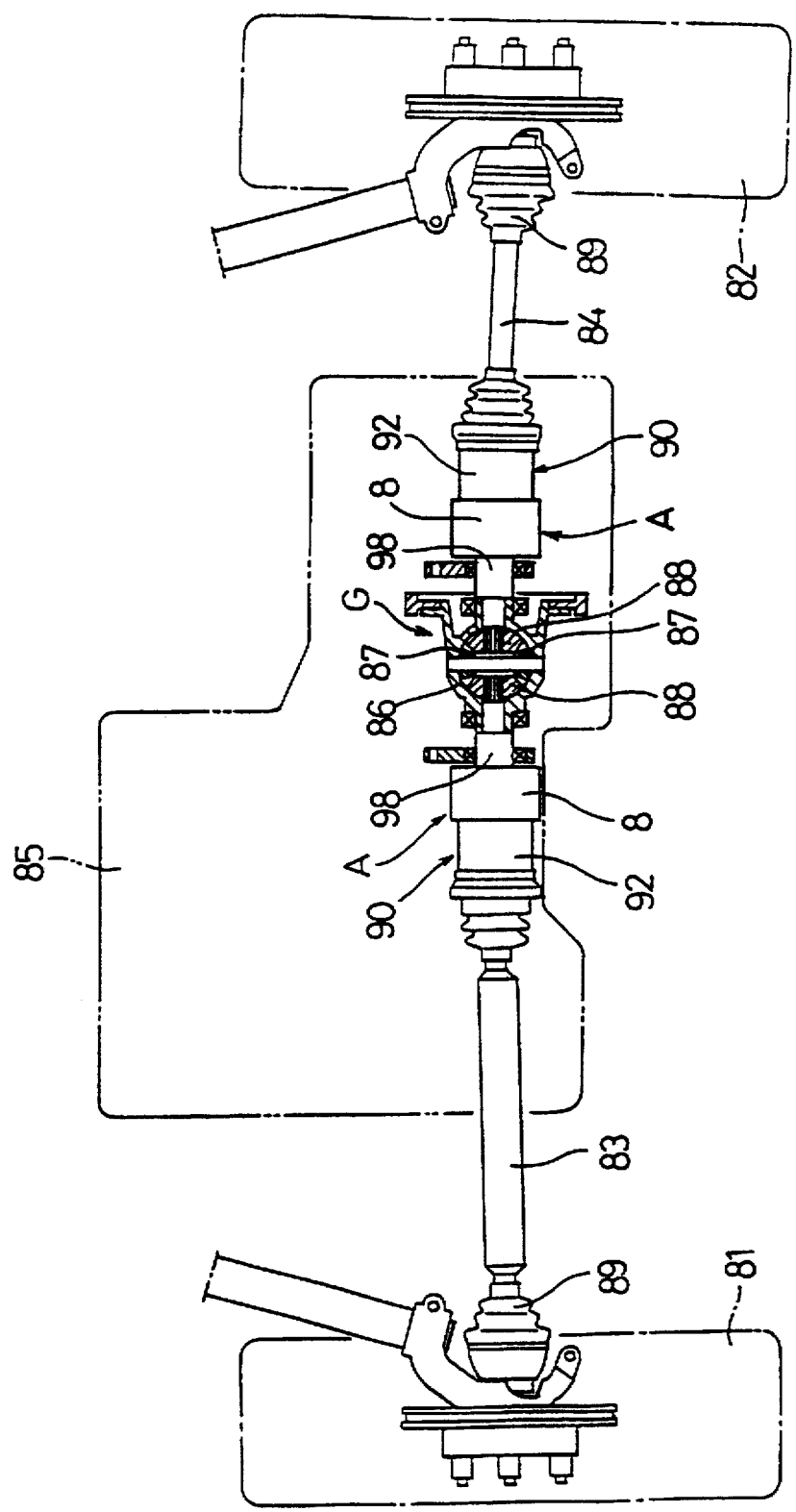
FIG. 24 is a partial vertical sectional view showing how the rotation transmission devices are mounted on a four-wheel drive vehicle.
Figure 25:
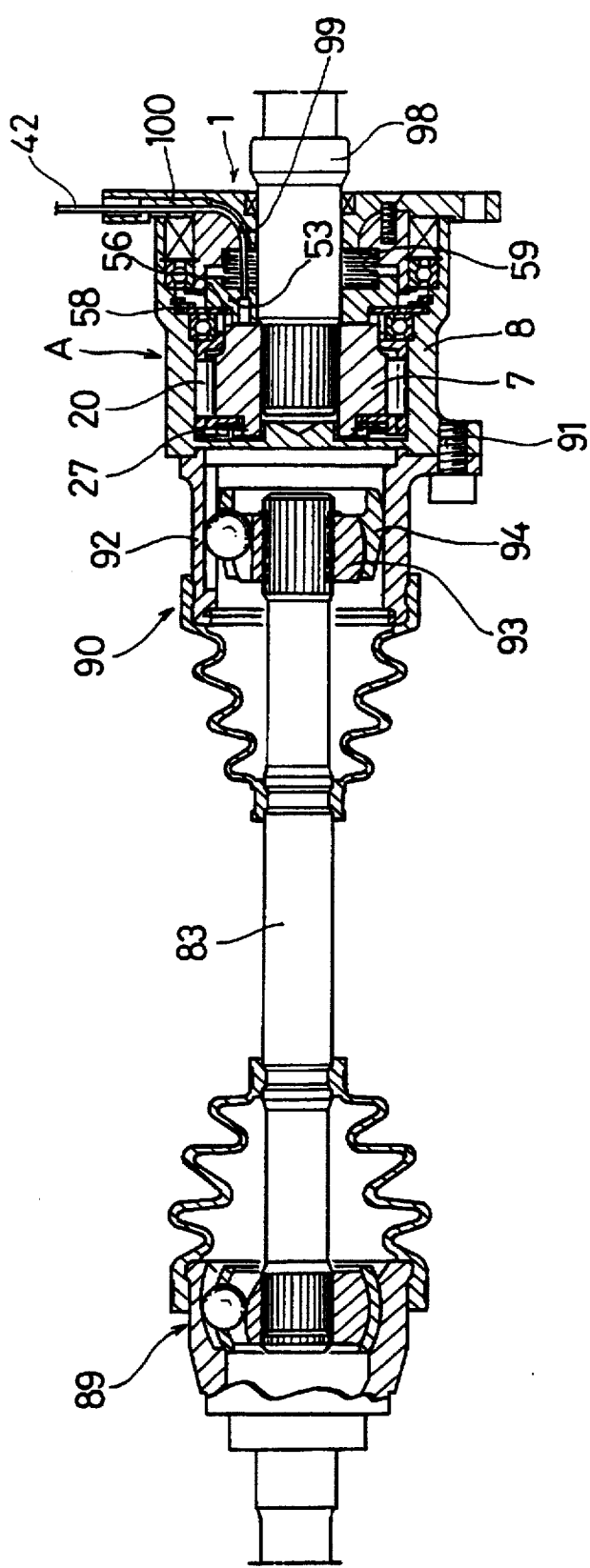
FIG. 25 is a vertical sectional view of a sixth embodiment.
Figure 26:
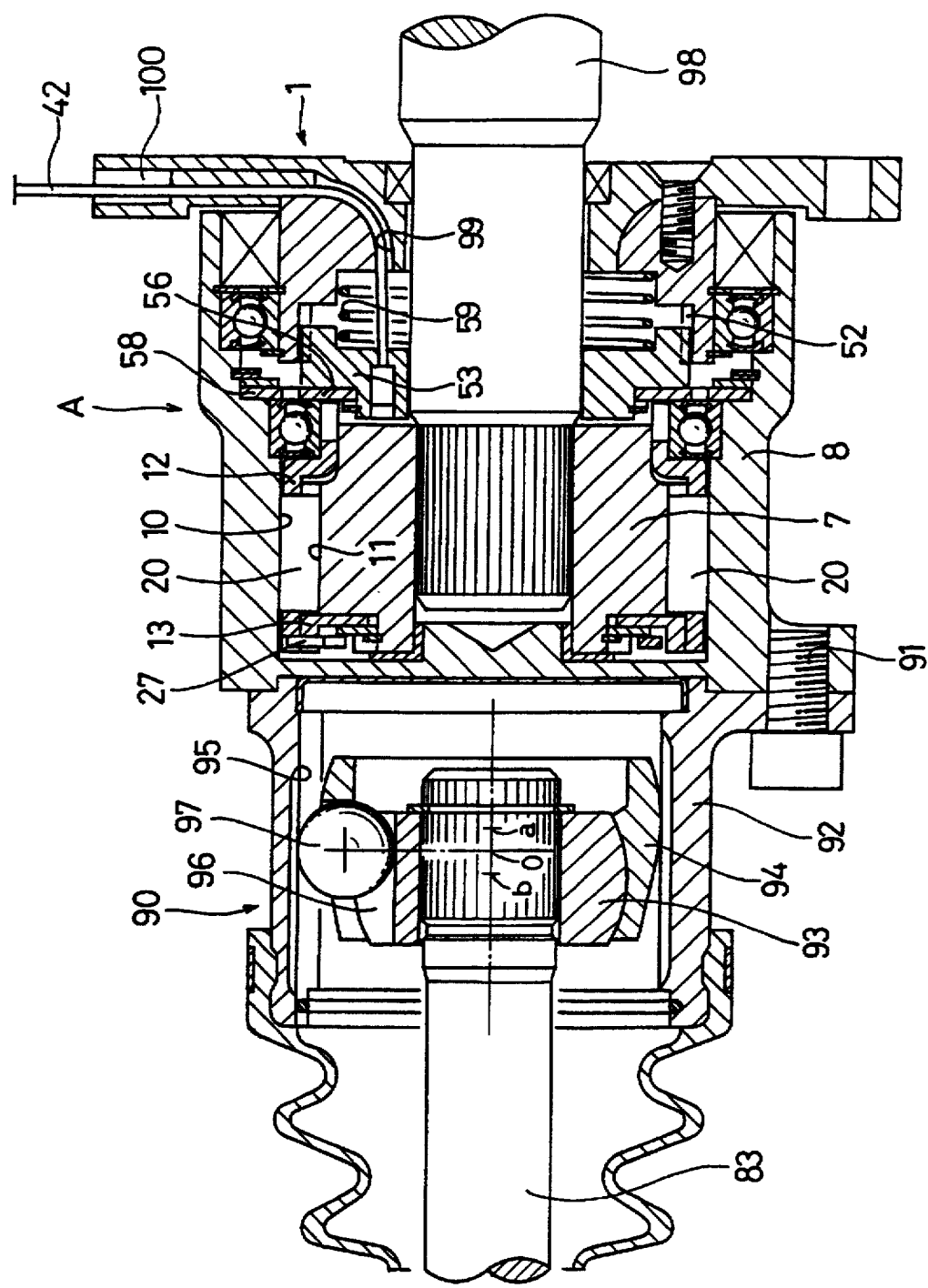
FIG. 26 is an enlarged vertical sectional view of a portion of the sixth embodiment.

FIGS. 24 to 26 show the sixth embodiment.

In this embodiment, rotation transmission devices A are mounted between the front wheel differential and the respective front wheel axles. By controlling the devices A, it is possible to change over the driving mode of the vehicle.

FIG. 24 shows the front wheel drive mechanism of a four-wheel drive vehicle. It has two front wheel axles 83, 84 connected to the right and left front wheels 81, 82, and a front wheel differential G and the wheel drive mechanism according to the embodiment which are mounted between the axles 83, 84.

The front wheel differential G comprises a rotatable differential case 86 coupled to the transmission (not shown) of the engine 85, pinion gears 87 adapted to rotate together with the differential case 86, and a pair of side gears 88 meshing with the pinion gears 87. The axles 83 and 84 are connected to the respective side gears 88 through double-offset type homokinetic joints 90 and to the respective front wheels 81, 82 through Rzeppa type homokinetic joints 89.

As shown in FIGS. 25 and 26, the wheel drive mechanism of this embodiment comprises two rotation transmission devices A provided on both sides of the differential G, and the double-offset homokinetic joints 90 connected to the respective axles 83, 84. Each rotation transmission device A has its outer ring securely coupled to the outer ring of the corresponding joint 90 by bolts 91.

Since the device A on each side of the differential and the corresponding joint are of exactly the same construction as those on the other side of the differential, we will hereinafter explain only the device A and the joint on the left side of FIG. 24. The homokinetic joint 90 has an outer ring 92 having a cylindrical bore, an inner ring 93 coupled to the end of the axle 83 and mounted in the outer ring 92, and a cage 94 also mounted in the outer ring 92. Axial straight ball track grooves 95 and 96 are formed in the inner periphery of the outer ring 92 and the outer periphery of the inner ring 93, respectively. Balls 97, held by the cage 94, engage in the grooves 95, 96.

The cage 94 has an outer spherical surface and an inner spherical surface. Their respective centers a and b are offset by the same distance to both sides from the point O about which the joint pivots. Also, the point O is on the intersection of the centerline of the ball pockets formed in the cage 94 and the axis of the outer ring or inner ring.

With this arrangement, the balls 97 are always held in the plane bisecting the angle between the axes of the inner and outer rings, irrespective of the joint angle. Thus, it is possible to rotate the outer ring 92 and the axis 83 at the same speed, irrespective of the joint angle. Also, with this arrangement, the inner and outer rings are capable of axial displacement relative to each other.

The rotation transmission device A has an outer ring 8 coupled to the homokinetic joint 90, and an inner ring 7 rotatably mounted in the outer ring 8. A spline shaft 98 extending from the front wheel differential G is inserted into the end of the inner ring 9.

This rotation transmission device A is of the same type as the second embodiment. Thus, we denote the same elements with the same numerals and omit their description.

In this embodiment, the spindle 1 is fitted on the spline shaft 98. It is formed, in its outer periphery, with a moderately curving groove 99 and a cable passage 100. The wire cable 42 coupled to the transfer of the vehicle is inserted into the groove 99 and the cable passage 100 and connected to the control member 53.

Now, the operation of this embodiment is described.

When the car is moved forward with the transfer switched to the two-wheel drive mode and the inner ring 7 and the cage 12 separated from each other, the large-diameter cage 12 is rotated relative to the small-diameter cage 13 by the switch spring 27, thereby inclining the sprags 20 in the direction opposite to the direction in which the inner ring 7 rotates. The sprags thus assume the forward-travel engageable position.

If the outer ring 8 is rotating at a speed equal to or greater than the inner ring 7 in this state, the sprags 20 are allowed to free-run, so that no torque is transmitted from the driven member. As a result, the driving train extending from the inner ring 7 through the differential to the transfer will stop rotating.

If the transfer is switched to the four-wheel drive mode, torque is transmitted from the inner ring 7 to the outer ring 8. But as far as the outer ring 8 is rotating at a speed equal to or greater than the inner ring, the outer ring 8 will free-run relative to the sprags 20.

If the outer ring 8 and the large-diameter cage 12 are coupled together by the locking means 28, when the outer ring 8 begins to rotate faster than the inner ring 7, which occurs when the engine brake is applied, the large-diameter cage 12 will be forced to rotate by the outer ring 8 in the direction opposite to the direction in which the cage 12 is biased by the switch spring 27. This causes the sprags 70 to be inclined in such a direction that torque is transmitted from the outer ring 8 to the inner ring 7 through the sprags 20. Since torque is transmitted from the driven member in this state, the engine brake can be applied to the wheels.

By providing the cable-controlled rotation transmission device A between the homokinetic joint and the differential, it is possible to eliminate the necessity to form the knuckle spindle by machining, which is necessary in the first to fifth embodiments. Thus, the device of this embodiment can be manufactured at low cost. Also, the spindle has higher strength.

Since the wire cable 42 is not passed through the tire house, it will never touch the tire even when the latter pivots due to the steering operation, so that the wire cable will rarely break.

When mounting the rotation transmission device in the wheel hub, it has to be mounted outside the tire. Thus, its size is rather limited. In contrast, by mounting the rotation transmission device between the differential and the axle, its size is practically unlimited, so that it is possible to use a device having a large load-bearing capacity.

(Seventh Embodiment)

FIGS. 27 to 36 show the rotation transmission device of the seventh embodiment, in which the driving member and the driven member are engaged and disengaged by means of a switch spring and a coil spring.

Figure 27:
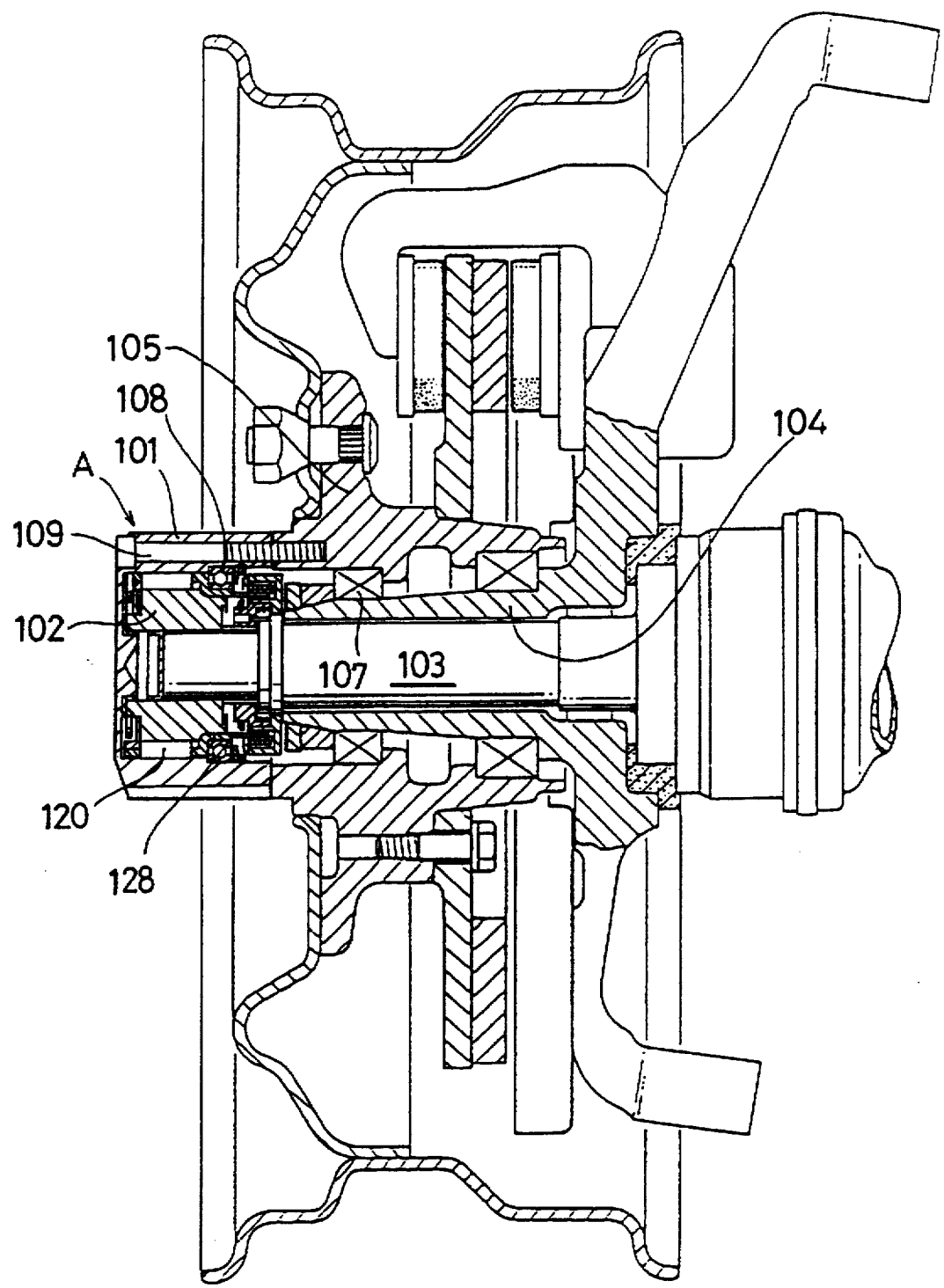
FIG. 27 is a partial vertical sectional view showing how a seventh embodiment is mounted on a four-wheel drive vehicle.

In FIG. 27, the rotation transmission device is mounted on each front wheel axle of a vehicle. The front wheel axle 103 is enclosed in a knuckle 104 fixed to the vehicle body except its front end. A wheel hub 105 is rotatably mounted on the knuckle 104 through bearings 107.

Figure 28:
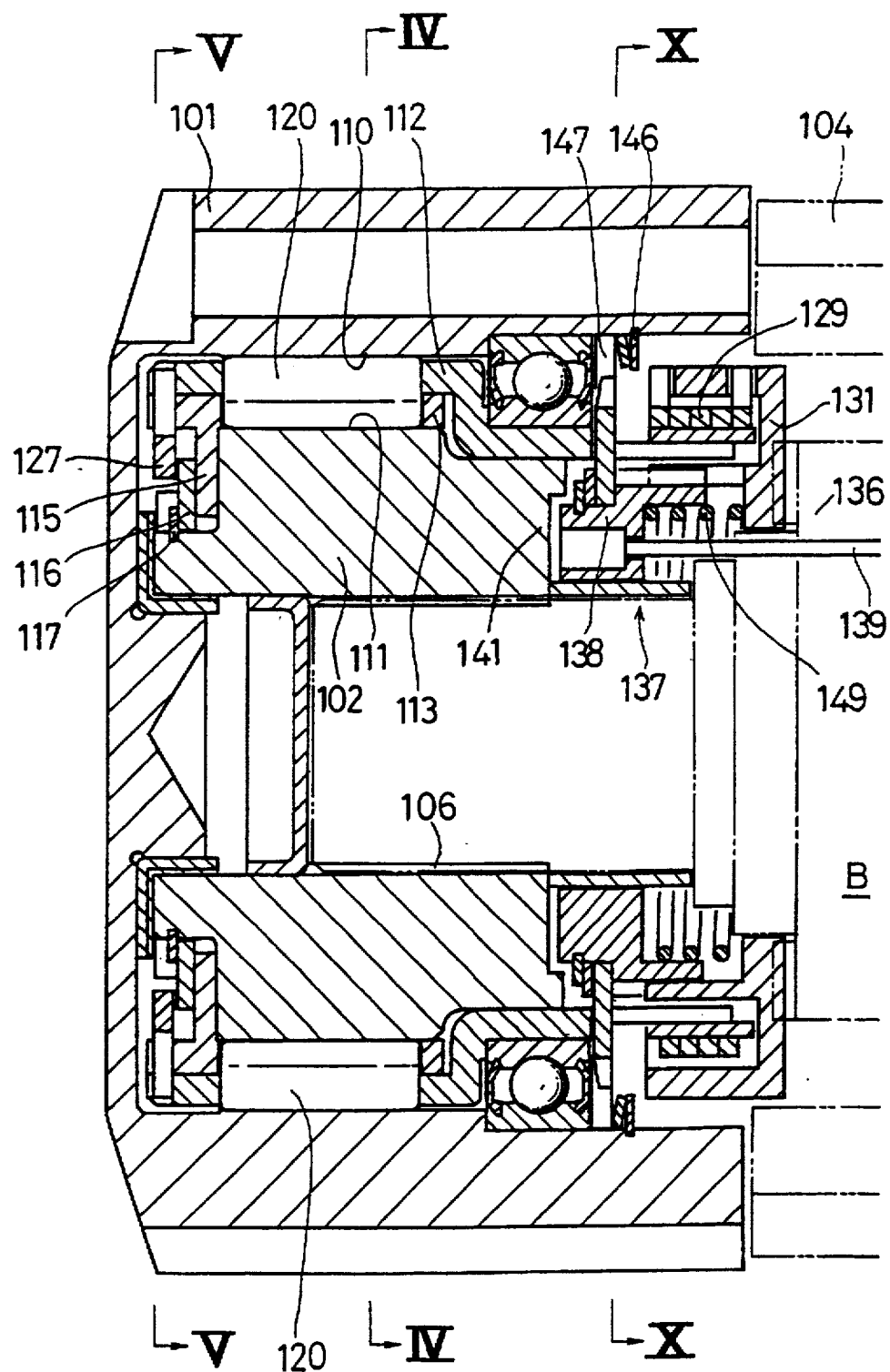
FIG. 28 is a vertical sectional view of the seventh embodiment.

As shown in FIG. 28, an inner ring 102 as the driving member of the rotation transmission device A is fixedly mounted on the free end of the front wheel axle 103 through serrations 106. An outer ring 101 as the driven member is rotatably mounted around the inner ring 102 through a bearing 108.

The outer ring 101 is fixed to the end face of the wheel hub 105 by bolts 109 (FIG. 27).

Figure 30:
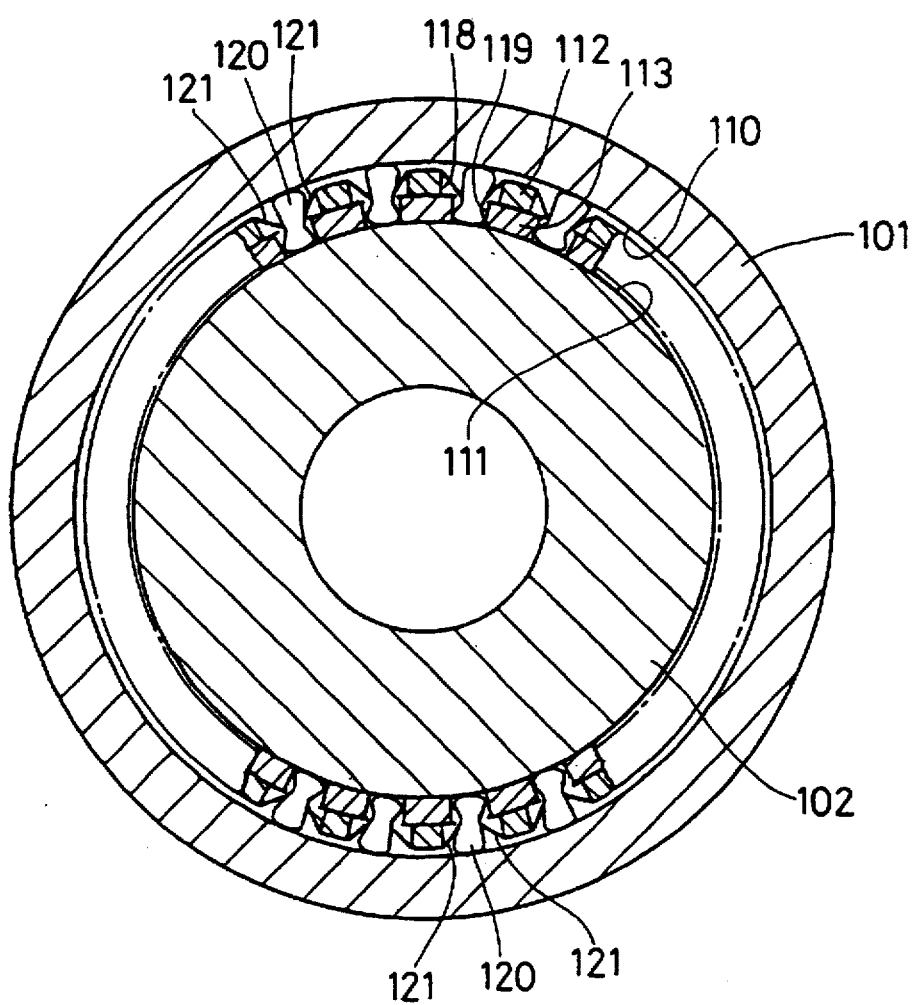
FIG. 30 is a sectional view taken along line IV—IV of FIG. 28.
Figure 33:
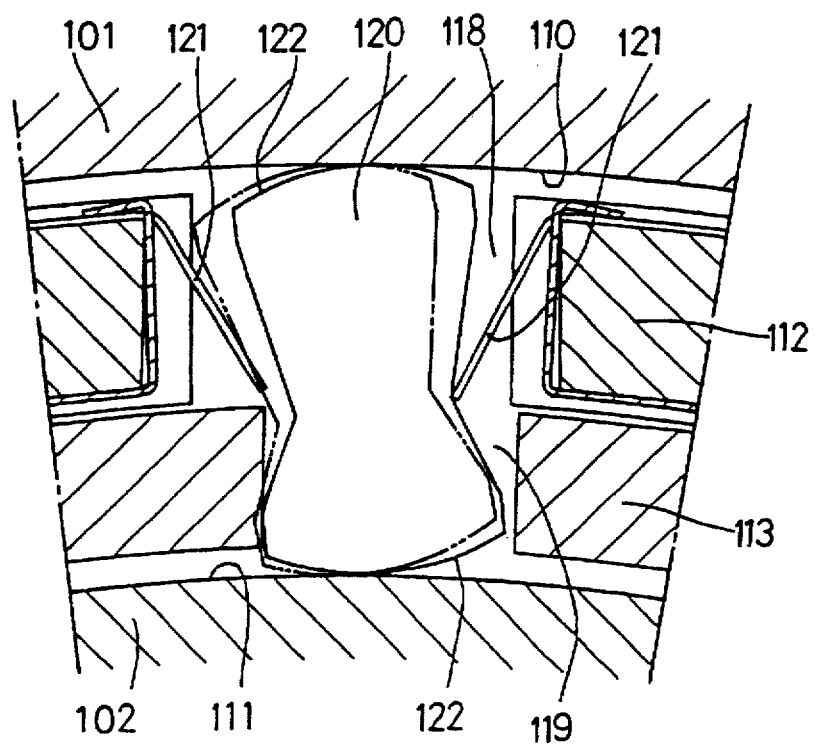
FIG. 33 is a sectional view of a sprag.

As shown in FIGS. 30 and 33, concentric cylindrical surfaces 110 and 111 are formed on the inner periphery of the outer ring 101 and the outer periphery of the inner ring 102, respectively. A large-diameter cage 112 and a small-diameter cage 113 are mounted between the cylindrical surfaces 110 and 111.

The large-diameter cage 112 has a cylindrical arm 114 (FIGS. 29A and 29B) integrally provided at its rear end and formed with a plurality of slits 144. The arm 114 is guided by the bearing 108 so as to be rotatable relative to the outer ring 101 and the inner ring 102.

The small-diameter cage 113 has a radially inwardly extending flange portion 115 at its front end. The flange portion 115 is slidably in contact with the front end face 102a of the inner ring 102. A compression spring 116 in the form of a disc spring is disposed between the flange portion 115 and a retaining ring 117, pressing the flange portion 115 against the end face 102a of the inner ring 102. The small-diameter cage 113 is thus bound to the inner ring 102 by the frictional force produced between the flange portion 115 and the inner ring 102.

As shown in FIGS. 30 and 33, a plurality of radially opposite pockets 118 and 119 are formed in the cylindrical portions of the large-diameter cage 112 and the small-diameter cage 113, respectively. Each pair of pockets 118, 119 accommodates a sprag 120 as an engaging element and springs 121 holding the sprag 120 in position.

Each sprag 120 has symmetrical outer and inner arcuate surfaces 122 and 122a. When the sprags are inclined in either direction by a predetermined angle, they will engage both cylindrical surfaces 110, 111, interlocking the outer ring 101 and the inner ring 102 together. Each of the springs 121 has one end thereof supported on the large-diameter cage 112 and the other end pressed against one of the the sprags 120 to keep sprags ready to engage the cylindrical surfaces 110 and 111 by urging them from both sides.

Figure 31:
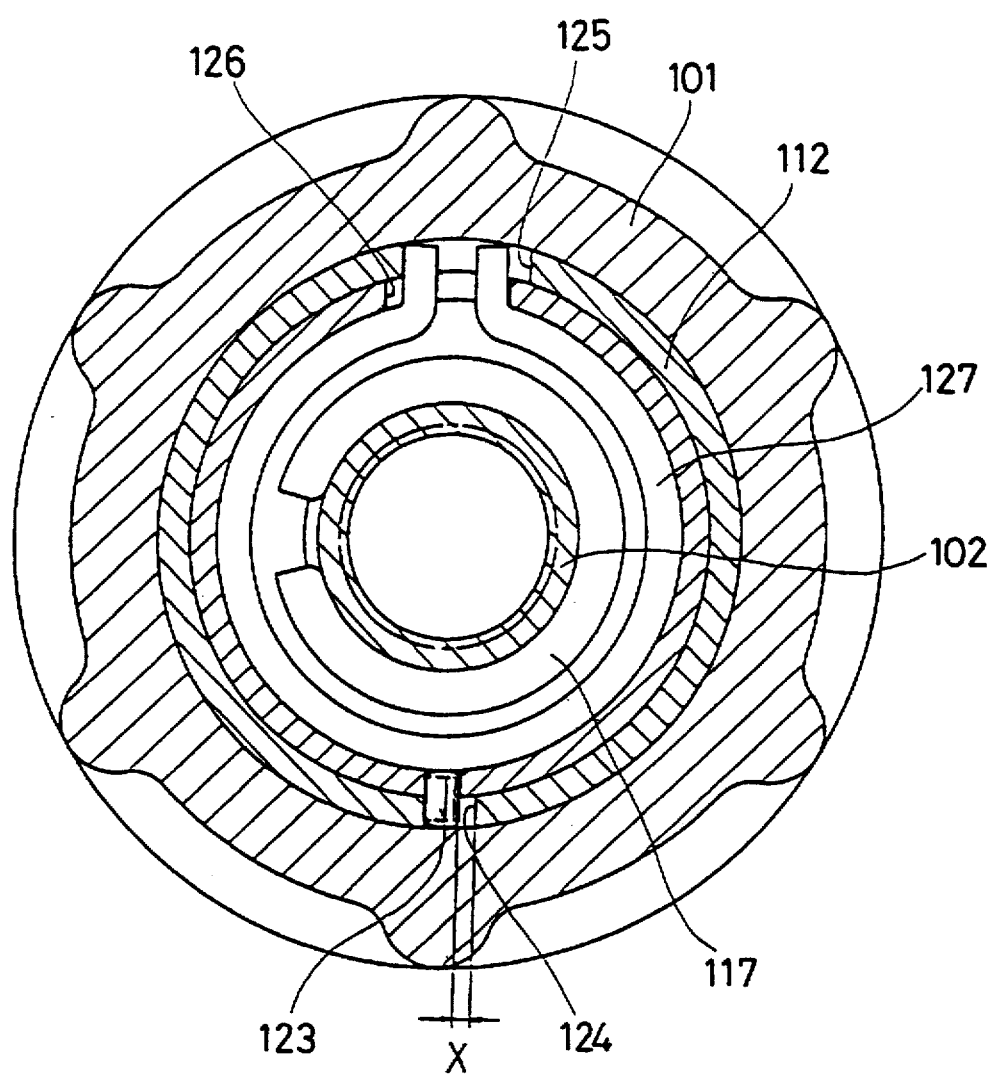
FIG. 31 is a sectional view taken along line V—V of FIG. 28.
Figure 32:
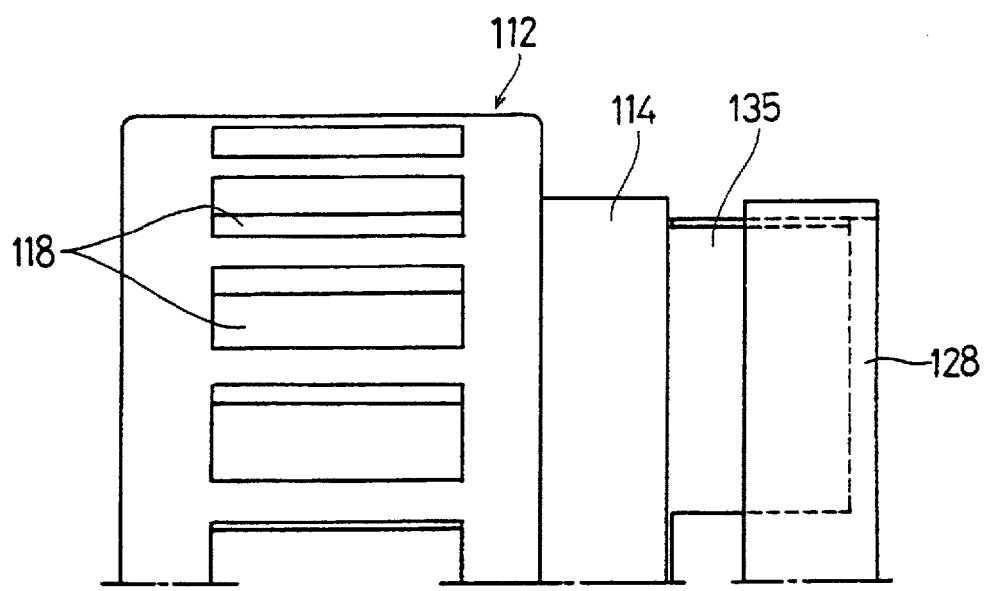
FIG. 32 is a front view of large-diameter cage.

As shown in FIG. 31, a stopper pin 123 fixed to the cylindrical portion of the small-diameter cage 113 is received in a square hole 124 formed in the large-diameter cage 112. A gap X is formed in the direction of rotation between the side wall of the square hole 124 and the pin 123.

Diametrically aligned slits 125 and 126 are formed in the large-diameter cage 112 and the small-diameter cage 113, respectively. A C-shaped switch spring 127 is mounted inside the cage 112, 113 in a compressed state with both ends thereof engaged in the slits 125, 126. The cages 112 and 113 are thus biased in the opposite circumferential directions by the respective ends of the spring 127, so that the large-diameter cage 112 turns until it engage the stopper pin 123 press-fitted in the small-diameter cage 113.

The size of the gap X provided between the stopper pin 123 and the square hole 124 in the rotational direction is such that the sprags 120 can incline in either direction until they nearly engage the cylindrical surfaces 110, 111 as shown in FIGS. 33 and 34. Namely, in the state of FIGS. 33 and 34, the cages 112, 113 and the sprags 120 are biased and kept in the stand-by position by the switch spring 27.

Coupled to the rear end of the arm 114 of the large-diameter cage 112 is a ring 128 around which is wound a coil spring 129 having the function as a one-way clutch and a means for producing resistance to rotation.

Figure 34A:
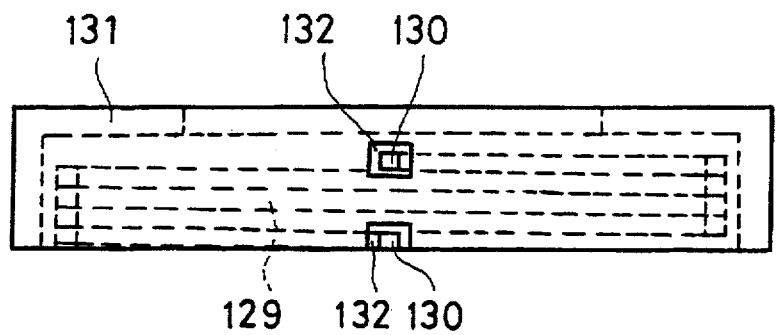
FIG. 34A is a front view of a coil spring.

The coil spring 129 is wound around the ring 128 with a predetermined interference, and has its protrusions 130 at both ends engaged in holes 132 formed in a fixed case 131 (FIG. 34A).

The fixed case 131 has its rear end secured to a stationary member 136 coupled to the knuckle 104 and is formed, at its front end, with an outer flange 133 in which the holes 132 are formed, and an inner flange 134 having slits 135 in which a slider 138 of a coupling means 137, which we will described later, engages so as to be non-rotatable relative to the flange 134.

As shown in FIG. 34, the coil spring 129 is wound counterclockwise around the ring 128. Thus, when the ring 128 (and thus the large-diameter cage 112) rotates in the direction of arrow A, the coil spring 129 will loosen due to the friction between the spring 129 and the ring 128. When the ring rotates in the direction of arrow B, the coil spring 129 will tighten up and be pressed against the ring 128. The direction represented by arrow B is opposite to the direction in which the switch spring 127 forces the large-diameter cage 112 to rotate relative to the small-diameter cage 113.

The protrusions 130 of the coil spring 129 are loosely fitted in the holes 132 in the fixed case 131 with a circumferential play Y.

When the large-diameter cage 112 rotates in the direction of arrow A, the coil spring 129 will loosen, so that the large-diameter cage 112 encounters no resistance to rotation. When it rotates in the direction of arrow B, the coil spring 129 tightens up.

Since both ends of the coil spring 129 are caught by the fixed case 131, when it rotates in the direction of arrow A, it tightens until the protrusions 130 move in the holes 130 by the distance equal to the play Y. Then, the spring will not tighten any more, producing a constant rotation resistance resulting from the friction between the ring 128 and the spring 129. Due to the dragging torque produced by the rotation resistance, the rotation of the large-diameter cage 112 is retarded. The rotation resistance produced by the coil spring 129 is opposite in direction to the torque applied to the large-diameter cage 112 by the switch spring 127, and is larger than the latter.

The coupling means (or coupling mechanism) 137 is mounted between the coil spring 129 and the bearing 108 supporting the large-diameter cage 112. It detachably couples the large-diameter cage 112 to the outer ring 101.

The slider 138 of the coupling means 137 is axially slidably mounted in the slits 135 formed in the inner flange 134 of the fixed case 131. The slider 138 is remote-controlled through a wire cable 139 having one end thereof attached to the slider and the other end to an external control means.

Figure 36:
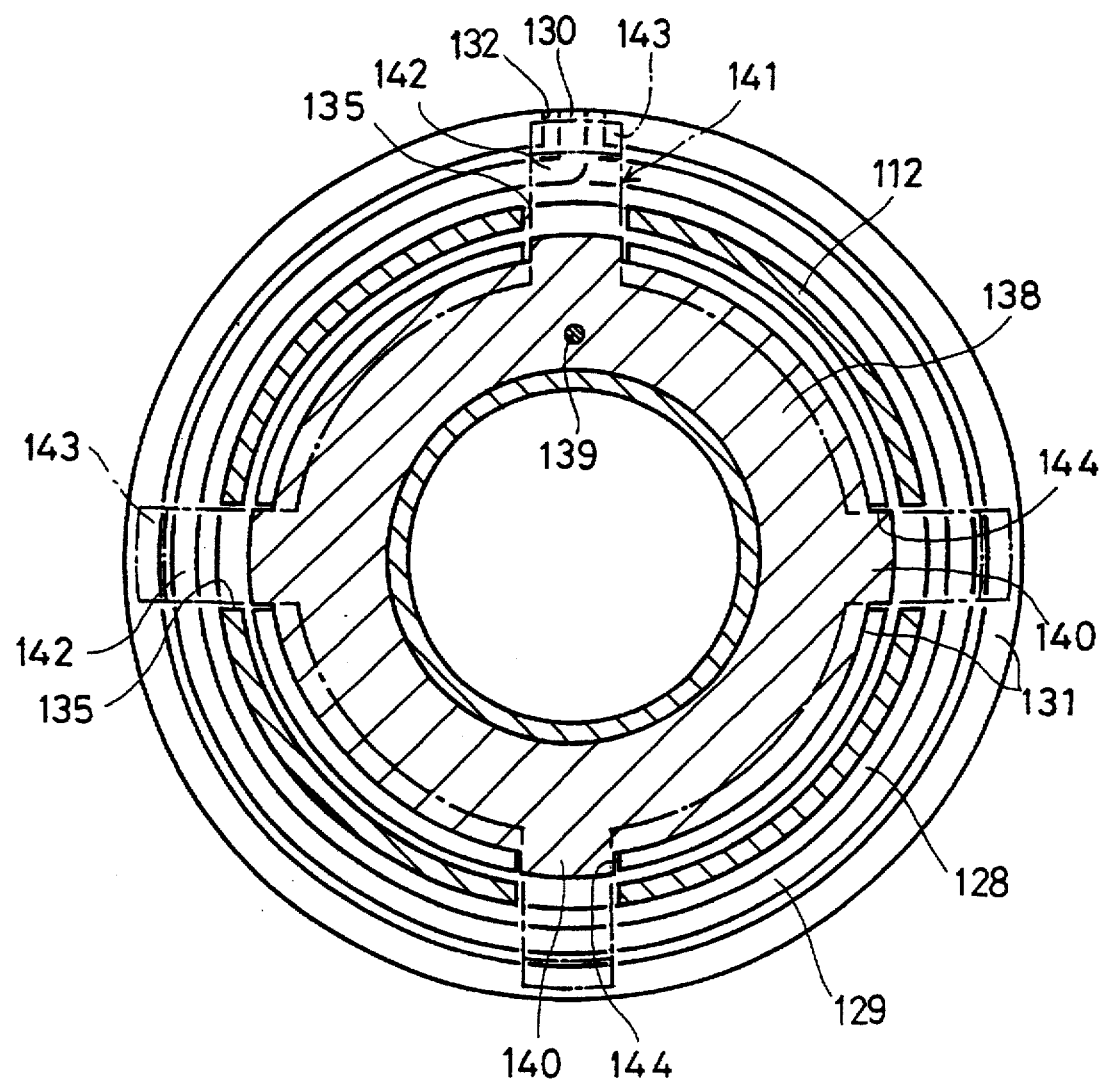
FIG. 36 is a sectional view taken along line X—X of FIG. 28.

The slider 138 has on its outer periphery a plurality of ribs 140 engaged in the slits 135, and has an inner gear 141 mounted to its end by means of a retaining ring (FIG. 36).

The inner gear 141 is supported at its radially inner side so as to be rotatable but not axially movable relative to the slider. It has on its outer periphery a plurality of protrusions 142 formed with gear teeth 143. The protrusions 142 engage in the slits 144 formed in the arm 114 of the large-diameter cage 112, so that the inner gear 141 is axially slidable but not rotatable relative to the large-diameter cage 112.

An outer gear 147 (FIG. 29A) is pressed against the inner periphery of the outer ring 101 at a position opposite to the inner gear 141 by means of a disc spring 145 and a retaining ring 146. Formed on the inner periphery of the outer gear 147 are gear teeth 148 adapted to mesh with the gear teeth 143 of the inner gear 141.

Mounted between the slider 138 and the fixed case 131 is a return spring 149 in the form of a compression spring. It biases the slider 138 such that the inner gear 141 moves toward the gear teeth 148 of the outer gear 147.

Figure 29A:
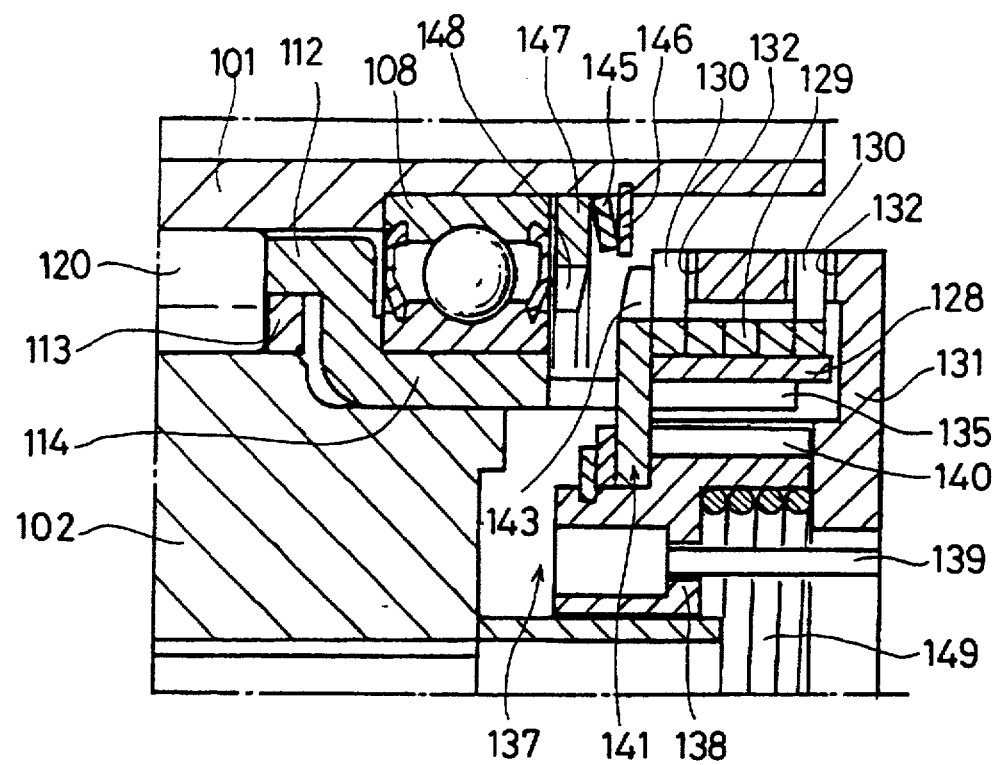
FIG. 29A is an enlarged sectional view of a portion of the seventh embodiment.

In this arrangement, by pulling the wire cable 139, the slider 138 moves toward the fixed case 131, so that the inner gear 141 separates from the outer gear 148. Thus, the large-diameter cage 112 is decoupled from the outer ring 101 (FIG. 29A).

Figure 29B:
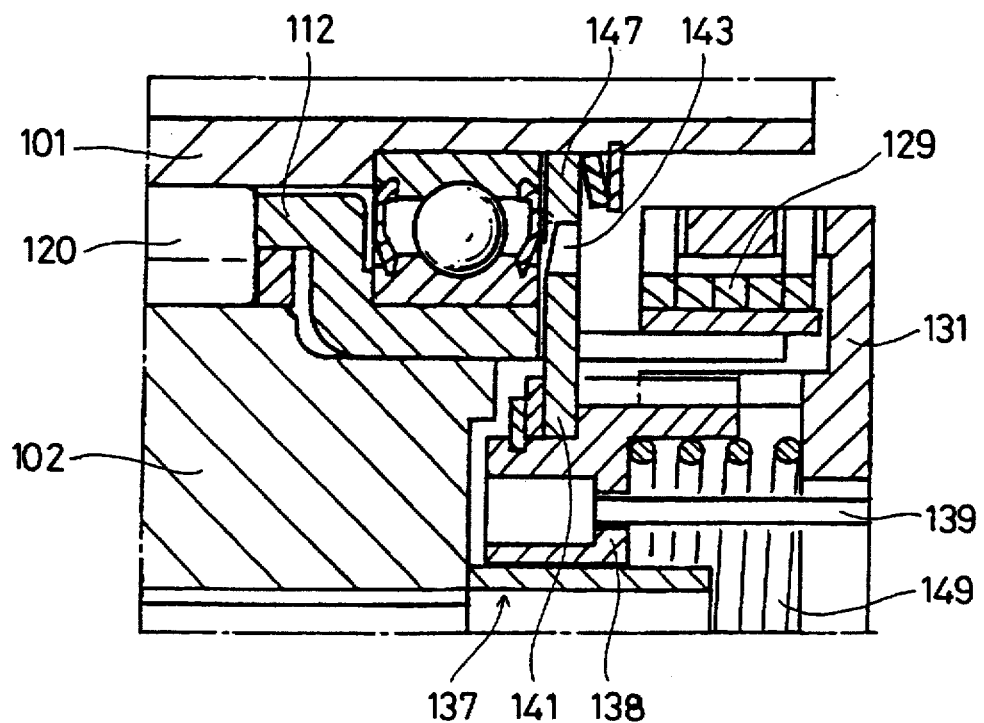
FIG. 29B is a side view of the seventh embodiment.

By loosening the wire cable 139, the inner gear 141 is moved toward the outer gear 148 by the return spring 149 until their teeth mesh with each other. The large-diameter cage 112 is now coupled to the outer ring 101 (FIG. 29B).

The rotation transmission device of this embodiment is mounted on each front wheel hub of a four-wheel drive vehicle, with its inner ring 102 coupled to the front wheel axle 103 and its outer ring 101 to the wheel hub 105, as shown in FIG. 27.

Figure 34B:
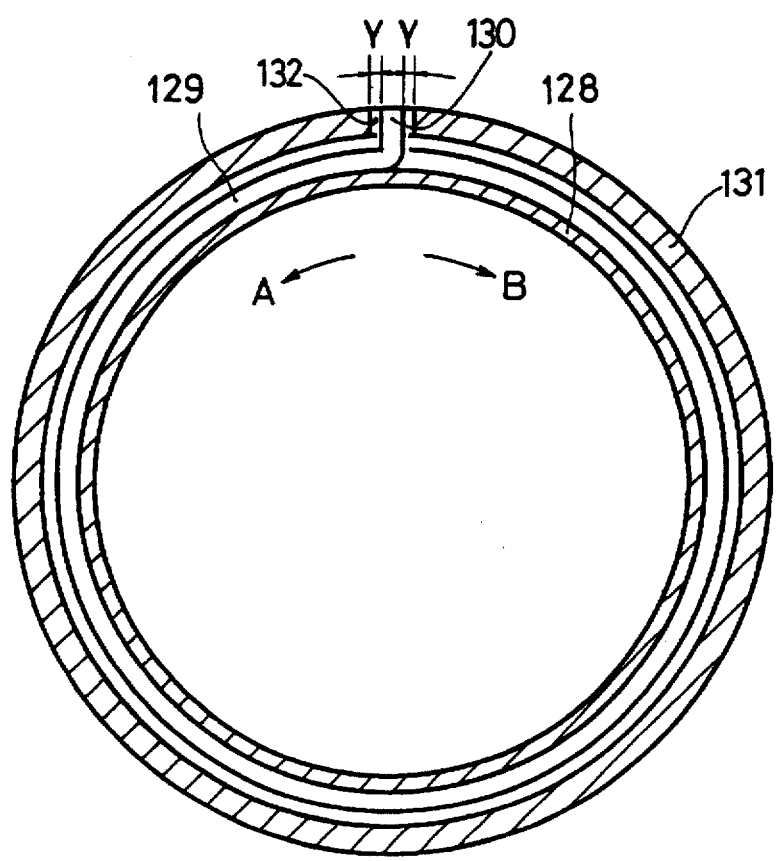
FIG. 34B is a side view of the coil spring of FIG. 34A.
Figure 35:
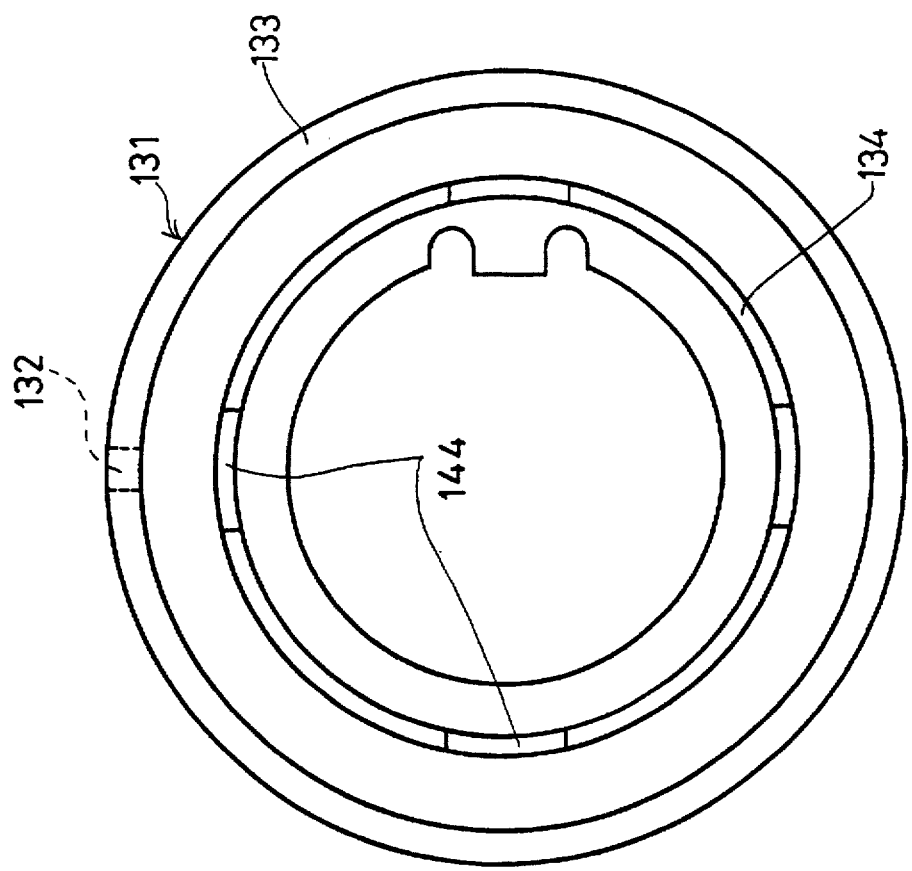
FIG. 35A is a vertical sectional view of the fixed case.
FIG. 35B is a side view of the fixed case of FIG. 35A.
Figure 35:
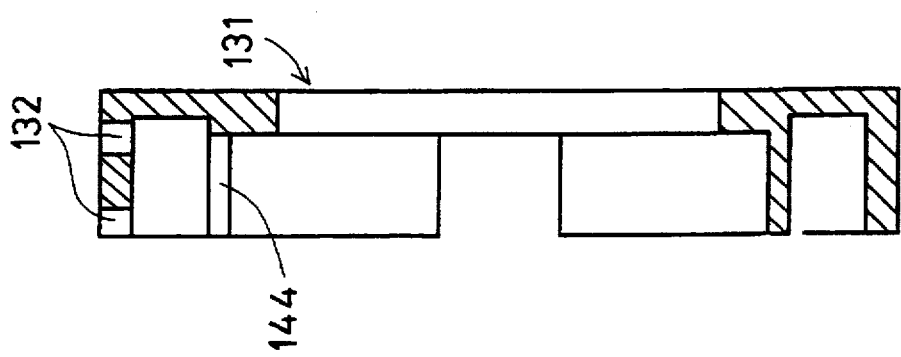

When mounting the hub, setting is such that while the vehicle is moving ahead, the inner ring 102 rotates in the direction of arrow A in FIG. 34B, i.e. so that the coil spring 129 loosens, and while the vehicle is moving backward, the inner ring 102 rotates in the direction of arrow B so that the coil spring 129 tightens.

Now we describe the operation of the rotation transmission device A mounted on a four-wheel drive vehicle under various travel conditions.

1) While the vehicle is traveling in the two-wheel drive mode:

During the two-wheel drive mode, the outer ring 101 is decoupled from the large-diameter cage 112 by separating the inner gear 141 of the coupling means 137 from the outer gear 147.

When the vehicle begins to move forward in this state, the large-diameter cage 112 will be turned by the switch spring 127 relative to the inner ring 102, so that the sprags 120 move to their forward-travel engageable positions (FIG. 33).

As long as the outer ring 101 is rotating faster than the axle in this state, the sprags 120 remain disengaged allowing the outer ring 101 to free-run. During the two-wheel drive mode, the front wheel axles are disconnected from the transfer. Thus, neither the driving force from the engine nor the driving force from the front wheels is transmitted to the drive train from the transfer to the front wheel axles, so that this part of the drive train stops with only the rear wheels driven.

When the vehicle begins to move backward, the switch spring 127 urges the large-diameter cage 112 to rotate with the small-diameter cage 113. As soon as the cage 112 begins to rotate in the direction of arrow A, the coil spring 29 tightens up, so that the large-diameter cage 112 and the coil spring 129 rotate together. Since the rotation resistance provided by the coil spring 129 is set to be larger than the torque applied to the cage 112 by the switch spring 127, the rotation of the large-diameter cage 112 is retarded by the coil spring 129, so that the sprags 120 are inclined in the opposite direction to their backward-travel engageable position. Thereafter, the large-diameter cage 112 keeps rotating while subjected to the rotation resistance from the coil spring 129, thus keeping the sprags 120 in their engageable stand-by position.

While the vehicle is traveling forward, only the biasing force of the switch spring 127 acts on the large-diameter cage 112. When the vehicle begins to move backward, the sliding resistance produced by the coil spring 129 overcomes the biasing force of the switch spring 127, so that the sprags 120 incline in the opposite direction. Thus, with this arrangement, the sprags 20 are kept disengaged during the two-wheel mode irrespective of the direction in which the vehicle is moving.

2) When the vehicle is traveling on a low-friction road surface in the four-wheel drive mode:

In this situation, the inner gear 141 is moved into mesh with the outer gear 147 by loosening the wire cable 139 of the coupling means 137.

In this state, the outer ring 101 and the large-diameter cage 112 rotate together. Thus, even if the sprags 120 are initially in the free-running state as shown in FIG. 33, they are inclined by the large-diameter cage 112 until they engage the cylindrical surfaces 110 and 111 of the inner and outer rings 101, 102. The outer ring 101 and the front wheel axle 103 are thus locked together, and hence the front and rear wheels together. The vehicle is now driven by all four wheels.

In this arrangement, the four-wheel drive mode is maintained even while the vehicle is backing. Thus, it is possible to get the car out of a slippery spot on the road by backing it up while maintaining the four-wheel drive mode.

Also, with the car stopping on a long slope with a low-friction surface in the two-wheel drive mode, it is possible to instantly change the drive mode to four-wheel drive without the need to move the car forward. Once switched to the four-wheel drive mode, this car can be started smoothly.

The wire cable 139 of the coupling means 137 is preferably linked to a changeover switch for the transfer so that the driver can change over the driving mode by pressing the single switch, just like a conventional part-time four-wheel drive vehicle.

3) When the vehicle is traveling on a paved road in the four-wheel drive mode:

In this case, the outer ring 101 is decoupled from the large-diameter cage 112 is pulling the wire cable 139 of the coupling means 137.

Since the driving member is connected to the rear wheels in this state, the drive mode selectively changes over between four-wheel drive and two-wheel drive according to the rotating speed difference between the front and rear wheels.

While the vehicle is turning a corner, the outer ring 101, coupled to the front wheel, rotates faster than the inner ring 102, so that the outer ring 101 free-runs relative to the sprags 120. Namely, the front wheels are separated from the rear wheels, so that no braking phenomena will occur at a tight corner.

If the rear wheels should slip with the front wheels separated from the rear wheels while the vehicle is moving ahead with the two-wheel drive, the front wheel axles, coupled to the rear wheels, will begin to rotate faster than the front wheels, because when the rear wheels slip, the front wheel speed, as well as the vehicle speed, drops. As a result, the sprags lock the inner ring 101 and the outer ring 102 together, so that the driving force is transmitted to the front wheels. Namely, the driving mode automatically changes to four-wheel drive.

Thus, in this mode, the vehicle having the rotation transmission device of this embodiment mounted on each front wheel can travel as stably as conventional full-time four-wheel drive vehicles.

Figure 37A:
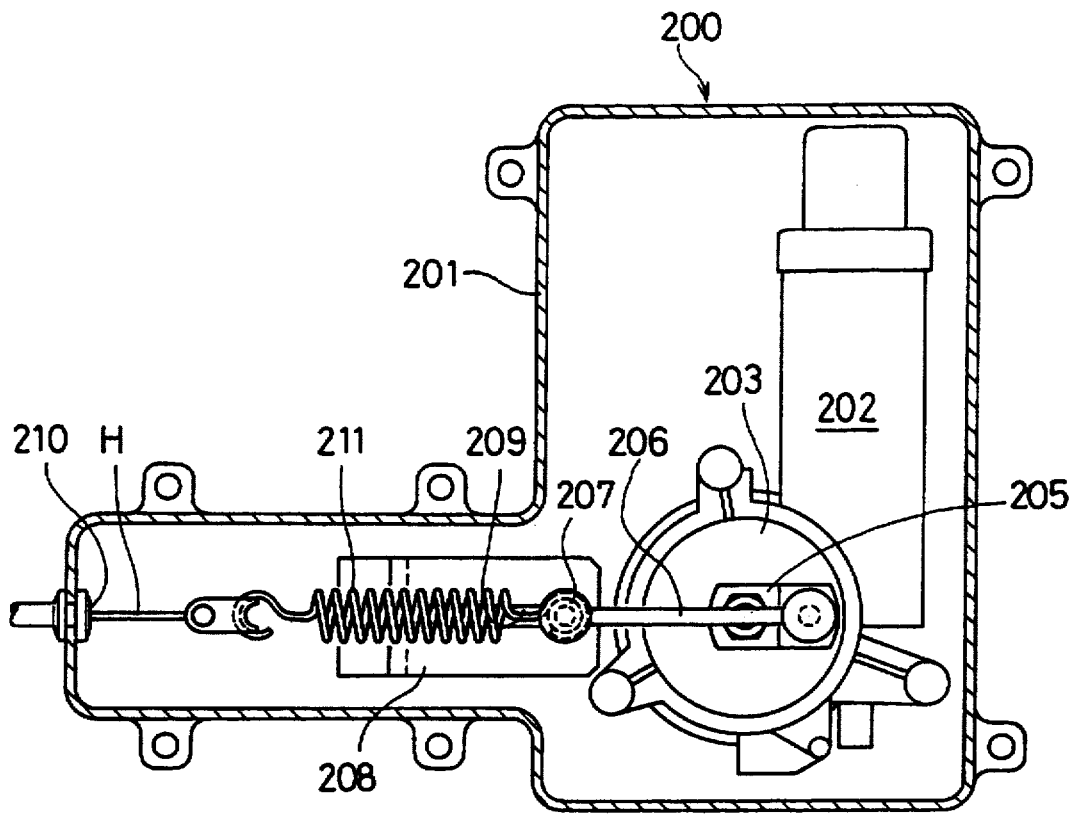
FIG. 37A is a cross-sectional plan view of a driving unit of one embodiment.
Figure 37B:
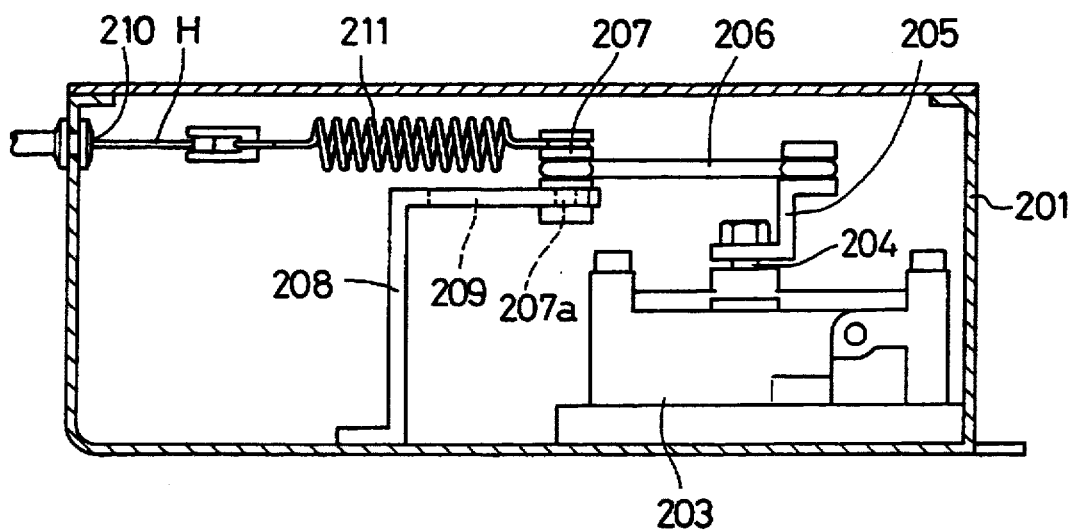
FIG. 37B is a vertical sectional front view of FIG. 37A.
Figure 38A:
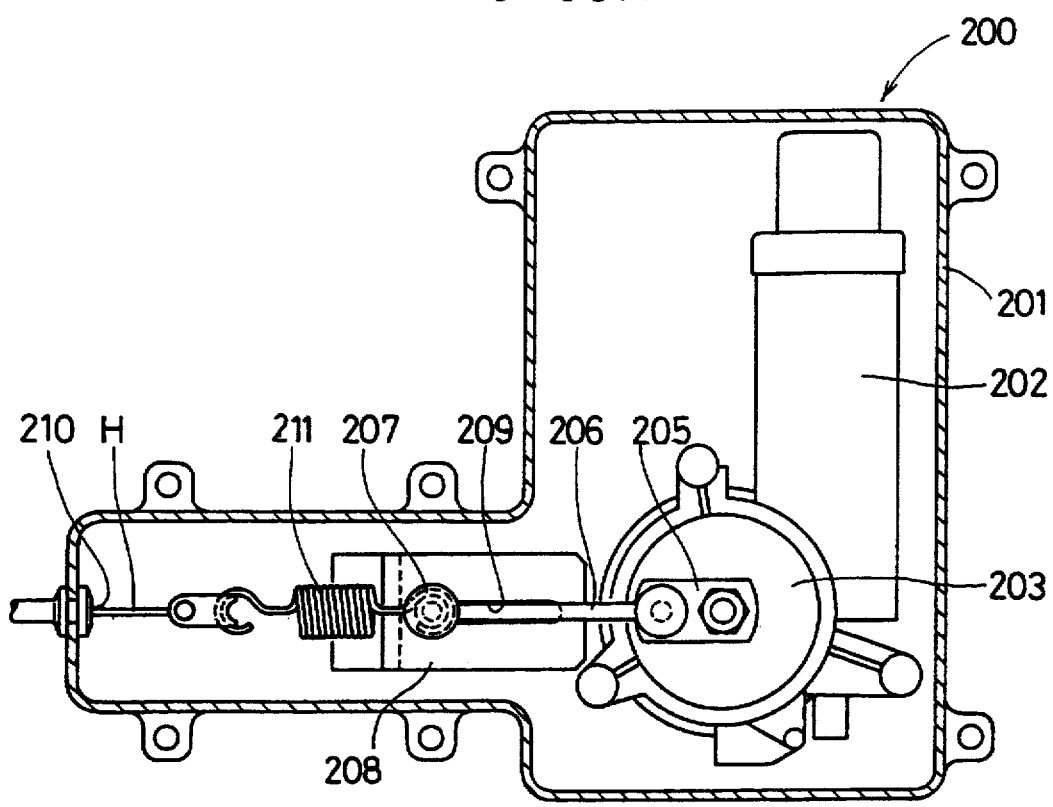
FIG. 38A is a cross-sectional plan view of the driving unit showing how it operates.
Figure 38B:
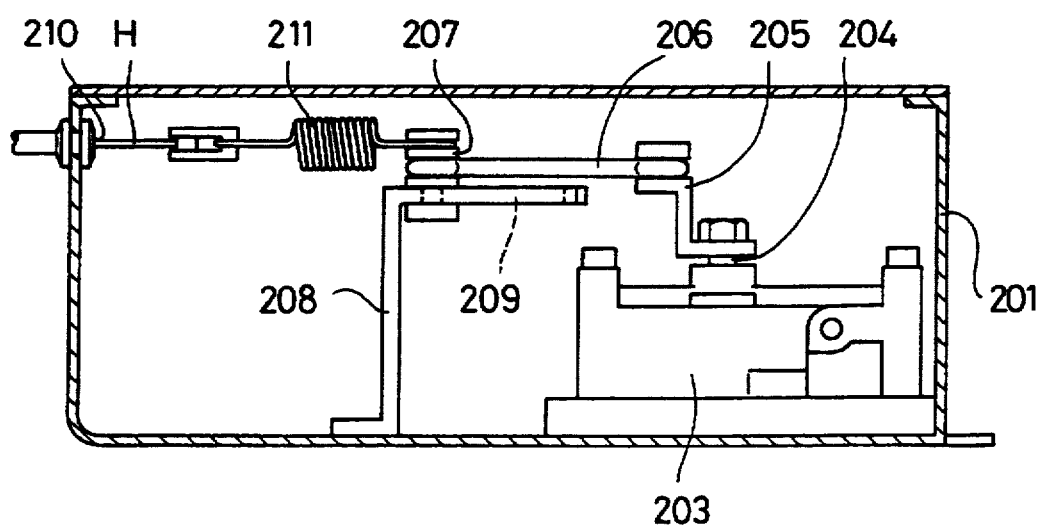
FIG. 38B is a vertical sectional front view of the driving unit of FIG. 38A.

FIGS. 37 through 39 show a driving unit for controlling the wire cables of the above-described embodiments.

This drive unit 200 has a case 201, a motor 202 with a reduction gear 203 mounted on the bottom of the case 201, and an arm 205 fixed to an output shaft 204 of the reduction gear 203.

The motor 202 of the embodiment carries a worm gear on its shaft coupled to its rotor. The worm gear is in mesh with a drive gear coupled to the output shaft 204 of the reduction gear 203. By stopping the drive gear with a cam mechanism or the like, it is possible to stop the motor at any desired angular position.

A rod 206 is coupled at one end thereof to the free end of the arm 205. A slider 207 is rotatably coupled to the other end of the rod 206.

A guide plate 208 having a straight guide groove 209 is mounted on the bottom of the case 201. The slider 207 has at one end thereof a guide portion 207a slidably received in the guide groove 209.

The guide groove 209 extends along the straight line connecting a cable insert hole 210 formed in the case 201 and the output shaft 204 of the reduction gear 203. When the arm 205 is pivoted by the motor 202 with the reduction gear 203, the slider 207 reciprocates along the guide groove 209 toward and away from the cable insert hole 210.

A tension spring 211 in the form of a coil spring has one end thereof coupled to the tip of the slider 207. A wire cable H inserted into the case 201 through the cable insert hole 210 is coupled to the other end of the tension spring 211.

The tension spring 211 is directly connected to both the wire cable H and the slider 207, pulling them toward each other.

The unillustrated other end of the wire cable H is connected to a clutch. If the wire cable H is provided with a return spring for pulling the cable toward the clutch, such a return spring should have a spring force smaller than the tension spring 211.

The motor 202 of the driving unit 200 of this embodiment is controlled so that the output shaft 204 of the reduction gear 203 stops when the arm 205 and the rod coupled to the reduction gear 203 aligns with the tension spring 211 and the wire cable H at diametrically opposite positions as shown in FIGS. 37 and 38. The slider 207 is adapted to reciprocate between both ends of the guide groove 209, thereby pulling and loosening the wire cable H.

Namely, every time the arm 205 of the reduction gear 203 is turned 180° by the motor 202, the wire cable H reciprocates longitudinally at a stroke twice as long as the turning radius of the arm 205, thereby selectively engaging and disengaging the clutch.

The tension spring 211, provided between the wire cable H and the arm, serves to absorb any excessive force, thus protecting the cable. This makes it possible to use a thinner and thus lighter and less costly wire cable H.

Even if the wire cable H should suffer a certain degree of permanent elongation after a long period of use, the tension spring 211 can absorb such elongation, so that the effective length by which the cable is moved to engage and disengage the clutch will remain unchanged.

Figure 40:
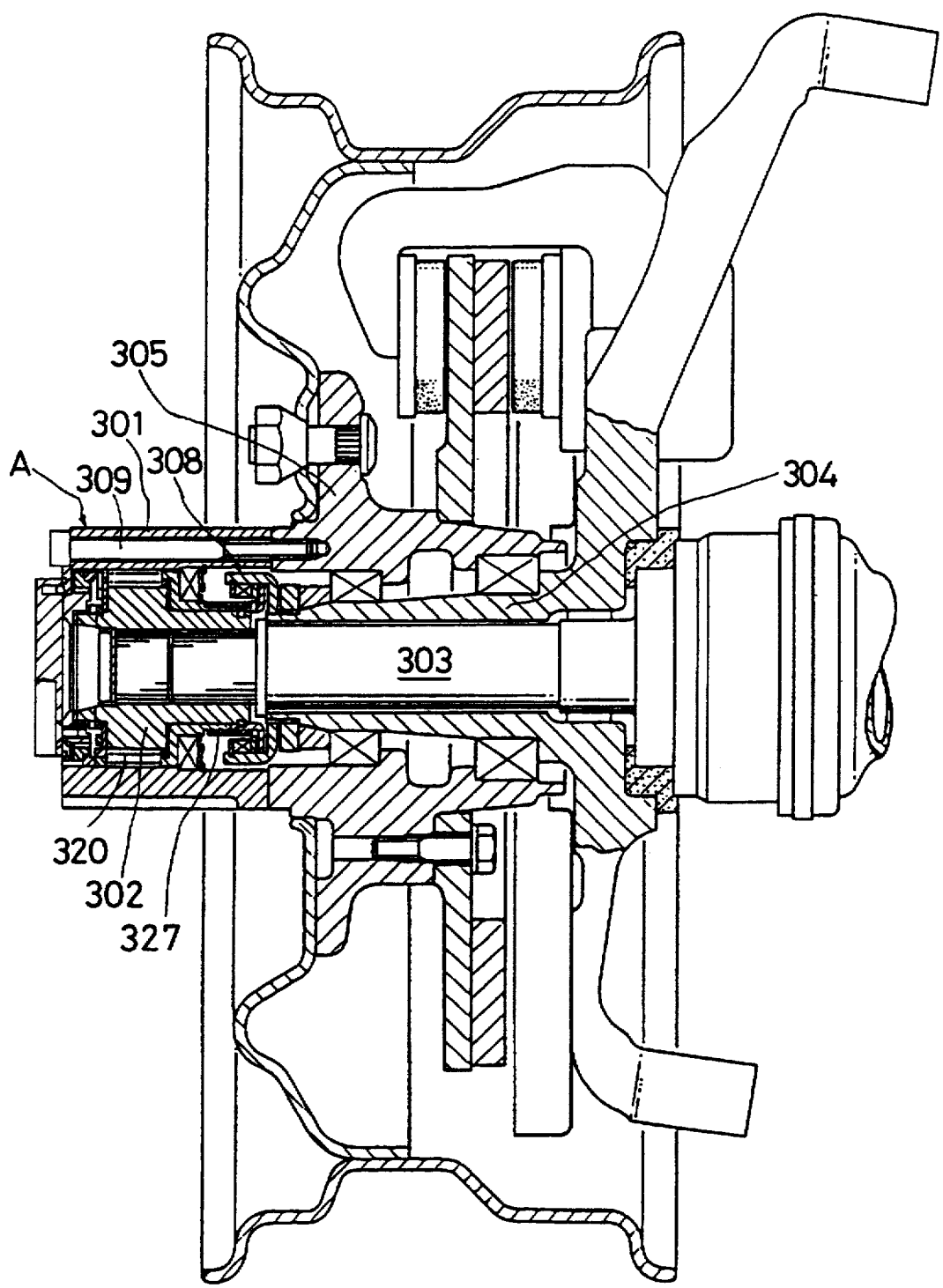
FIG. 40 is a partial vertical sectional view of the rotation transmission device as mounted on a four-wheel drive vehicle.

FIGS. 39 and 40 show an embodiment in which the abovementioned wire cable driving unit 200 is used to remote-control the rotation transmission devices provided between axles and a differential of a four-wheel drive vehicle. In this embodiment, the driving unit is mounted in a transfer in the engine room and controlled by a lever provided at the driver's seat. By pulling and loosening the wire cable H with the motor 202, the rotation transmission devices can be changed over between the two-wheel mode and four-wheel drive mode.

(Eighth Embodiment)

FIGS. 40 through 54 show a rotation transmission device of the type in which the mode changeover between two-wheel drive and four-wheel drive is carried out by changing over a lever provided at the end face of the corresponding wheel hub.

FIG. 40 shows this rotation transmission device as mounted on a front wheel axle. Mounted around the front wheel axle 203 is a knuckle 304 fixed to the vehicle body. The knuckle 304 rotatably supports the wheel hub 305.

Figure 41:
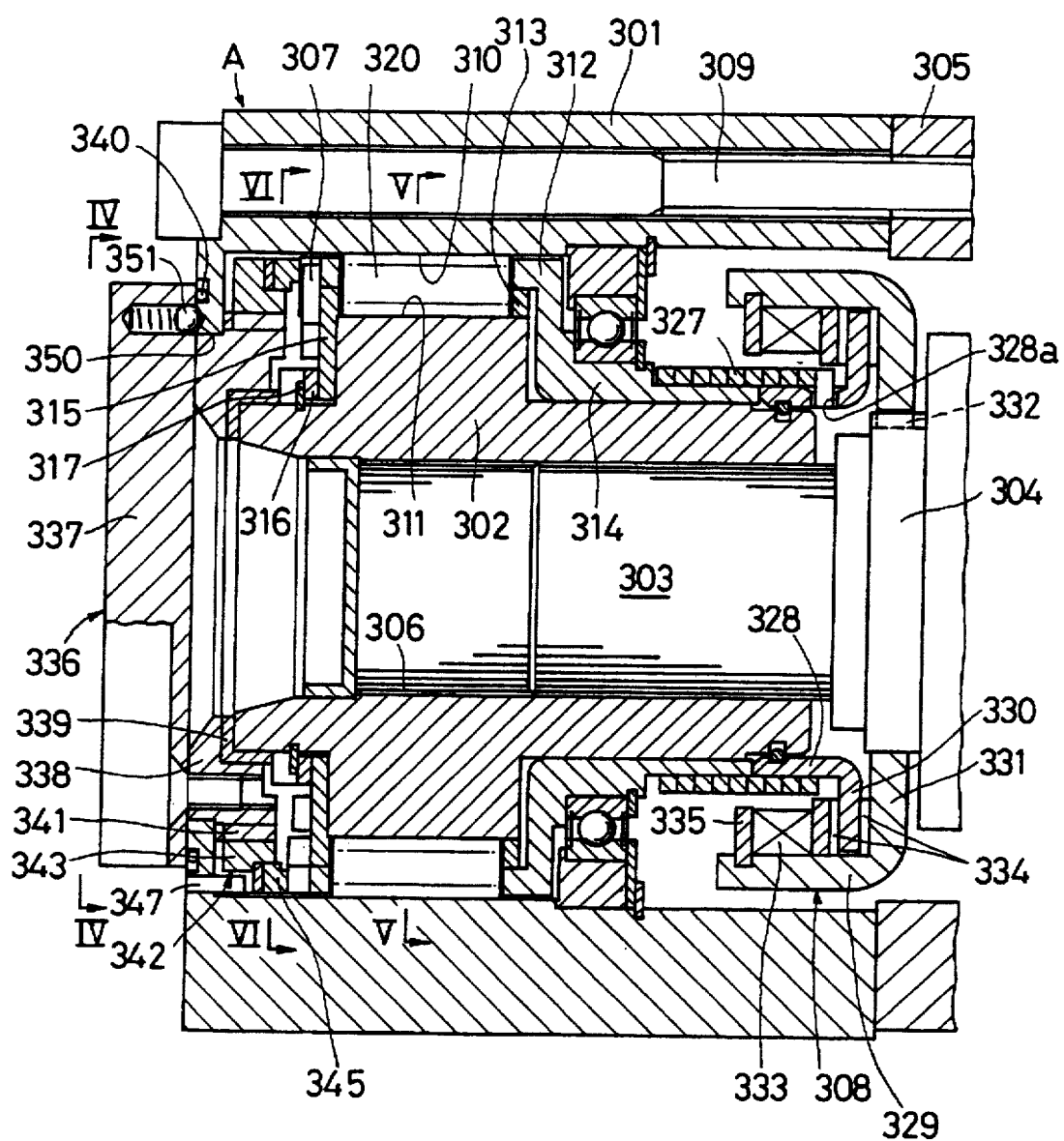
FIG. 41 is a vertical sectional view of the rotation transmission device of an eighth embodiment.

As shown in FIG. 41, the rotation transmission device A has its inner ring 302, as a driving member, mounted on the outer end of the front wheel axle 303 through serrations 306. Its outer ring 301 is rotatably mounted around the inner ring 302.

The outer ring 301 is fixed to the end face of the wheel hub 305 by means of a plurality of bolts 309.

Figure 44:
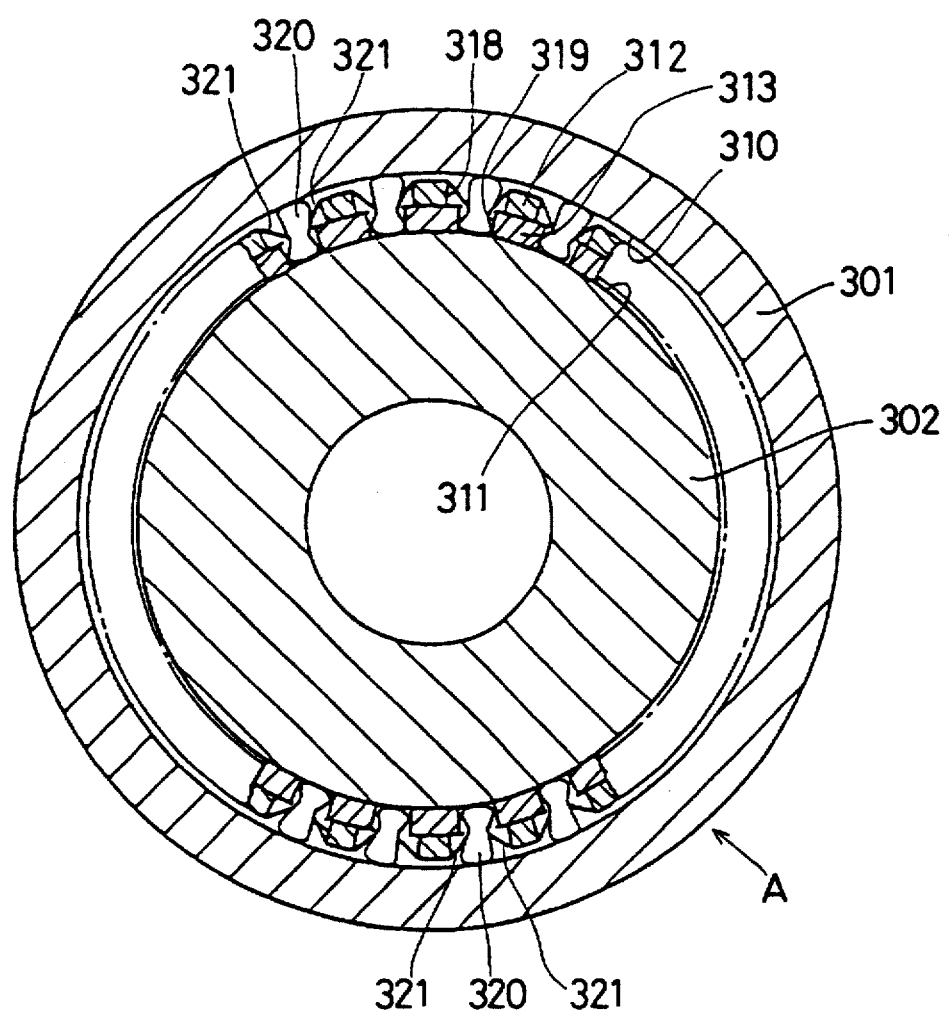
FIG. 44 is a sectional view taken along line V—V of FIG. 41.
Figure 47:
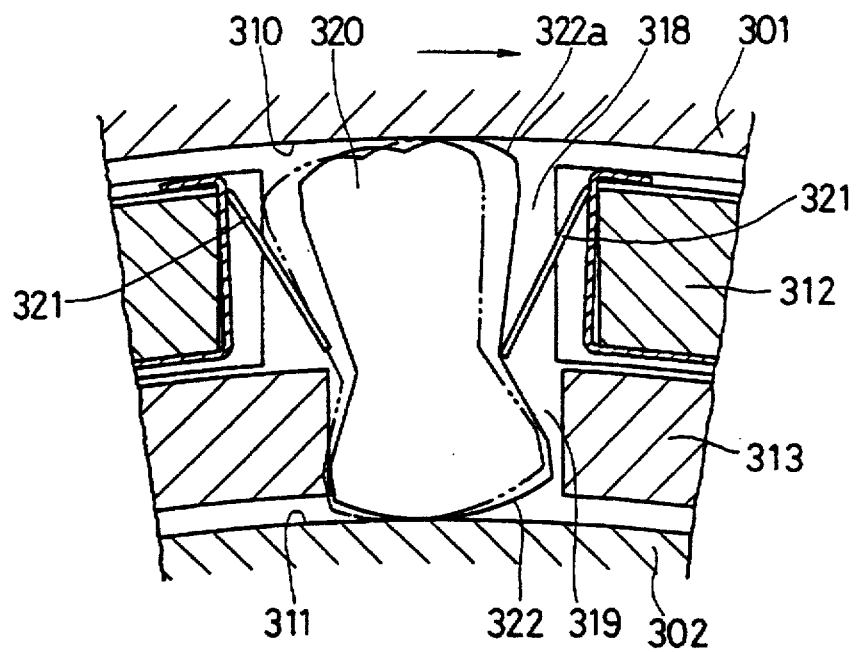
FIG. 47 is a sectional view of a sprag showing its forward-travel engageable position and free-running position.

As shown in FIGS. 44 and 47, the outer ring 301 and the inner ring 302 are formed, on their inner and outer peripheral surfaces, with cylindrical surfaces 310 and 311, between which are provided a large-diameter cage 312 and a small-diameter cage 313.

The large-diameter cage 312 has an integral rear arm 314 which is rotatably supported by the outer ring 301 and the inner ring 302 while being guided by a bearing.

On the other hand, the small-diameter cage 313 has a bent portion 315 extending radially inward from its front end and kept in sliding contact with the end face of the inner ring 302. A spring member 316 is disposed between the bent portion 315 and a retaining ring 317 in a compressed state. It presses the bent portion 315 against the end face of the inner ring 302, so that the small-diameter cage 313 is kept in frictional contact with the inner ring 302.

The large-diameter cage 312 and the small-diameter cage 313 have, in their circumferential portions, a plurality of pockets 318 and 319, respectively, that are radially aligned with each other. Disposed in each pair of pockets 318, 319 are an engaging element or a sprag 320 and springs 321 for retaining the sprag 320.

the sprags 320 have symmetrical arcuate surfaces 322 and 322a having centers of curvature along the axis of each sprag so that they interlock the outer ring 301 and inner ring 302 by engaging both cylindrical surfaces 310 and 311 when they incline a predetermined angle in either direction. The springs 321, having one end thereof secured to the large-diameter cage 312, urge each sprag 320 from both sides, keeping it in engagement with the cylindrical surfaces 310 and 311.

Figure 45:
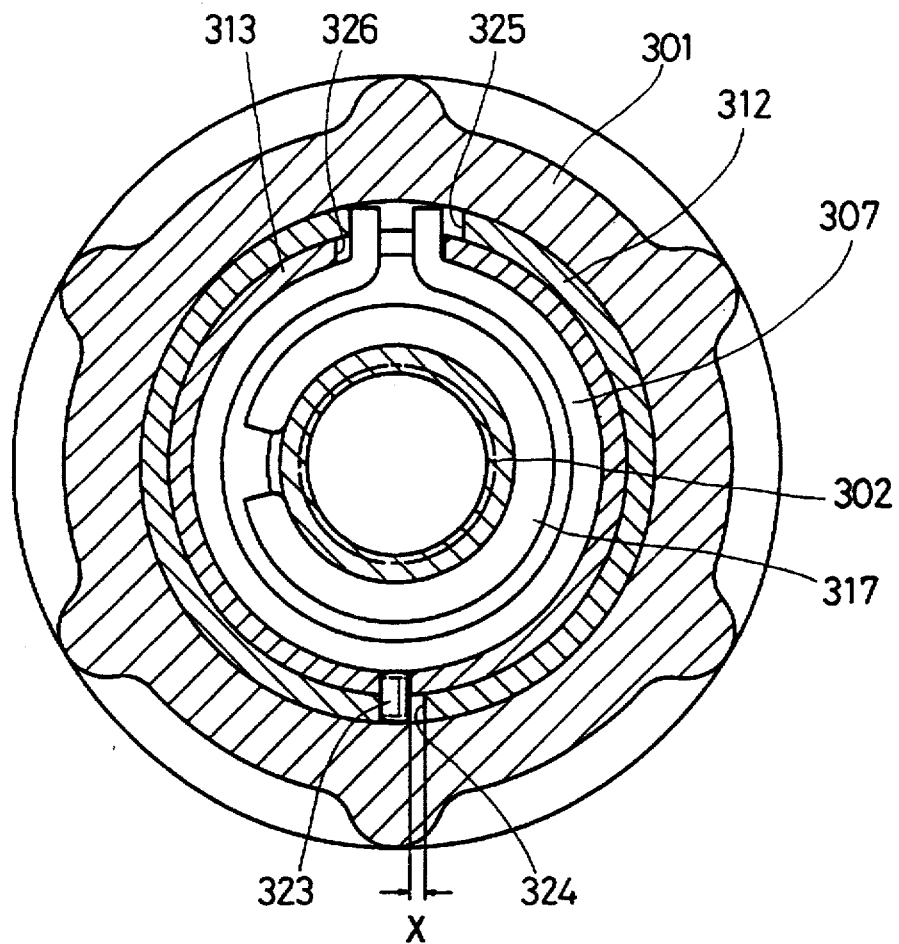
FIG. 45 is a sectional view taken along line VI—VI of FIG. 41.

As shown in FIG. 45, a stopper pin 323 protruding from the circumferential portion of the small-diameter cage 313 engages in a square hole 324 formed in the large-diameter cage 312 with a gap X left in the direction of rotation between the peripheral wall of the hole 324 and the pin 323.

Diametrical slits 325 and 326 are formed through the cylindrical portions of the large-diameter cage 312 and the small-diameter cage 313. A C-shaped switch spring 327 is mounted inside the cages 312, 313 in a compressed state with both ends thereof engaged in the slits 325, 326. The cages 312 and 313 are thus biased in the opposite circumferential directions by being pressed by the respective ends of the spring 327, so that the large-diameter cage 312 turns until it engages the stopper pin 323 press-fitted in the small-diameter cage 313.

Figure 48:
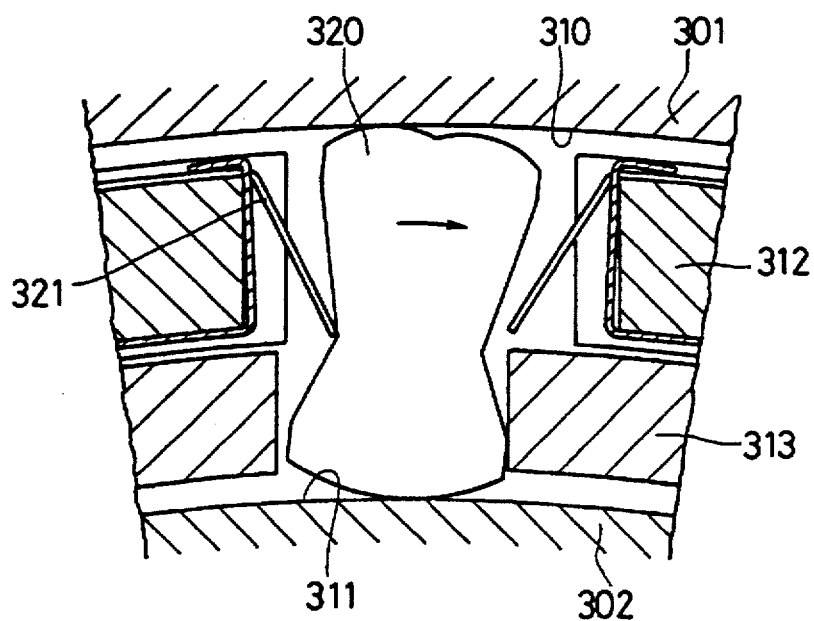
FIG. 48 is a sectional view of a sprag showing its backward-travel engageable position and non-free-running position.
Figure 49:
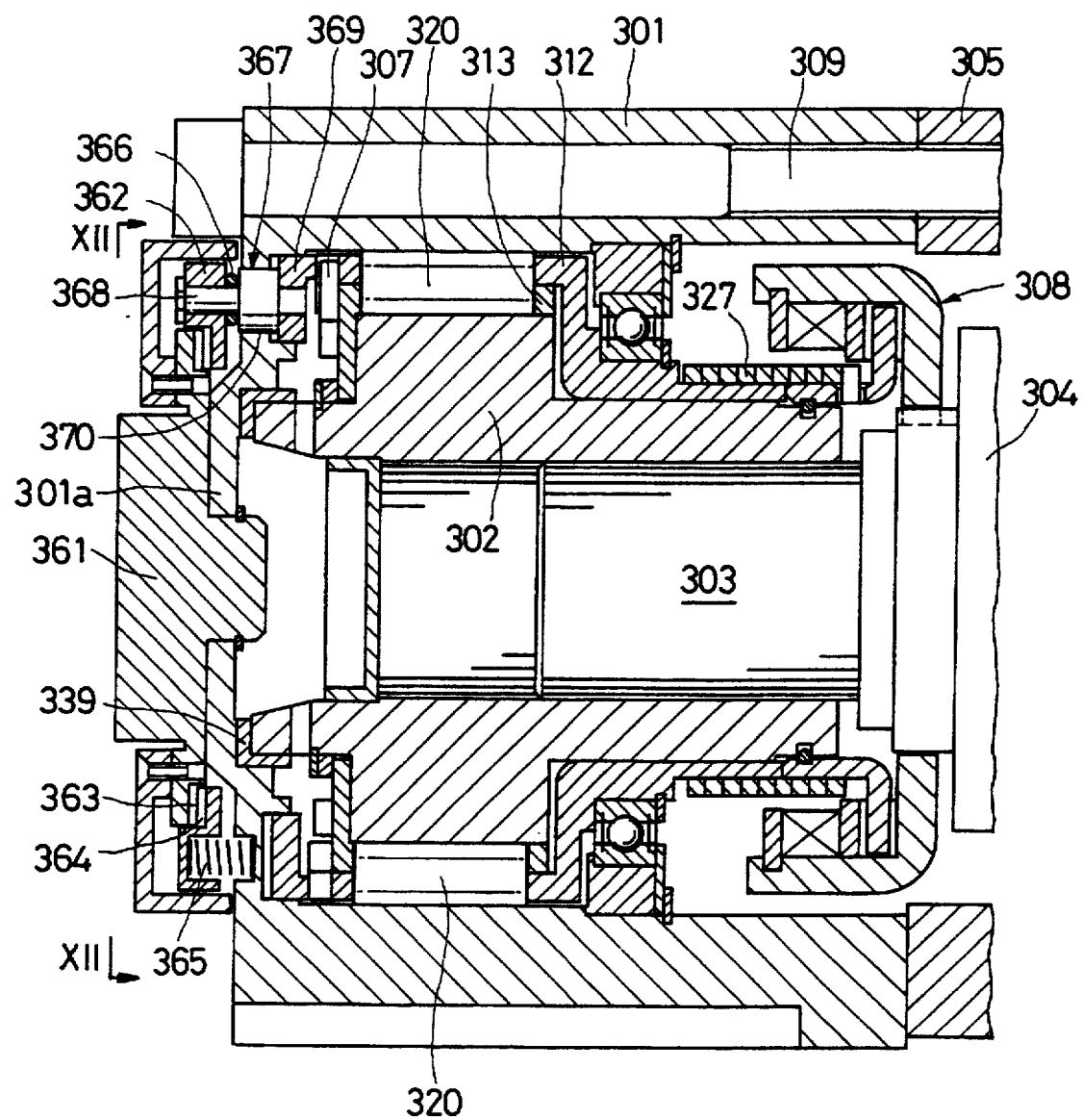
FIG. 49 is a vertical sectional view of a ninth embodiment.
Figure 50:
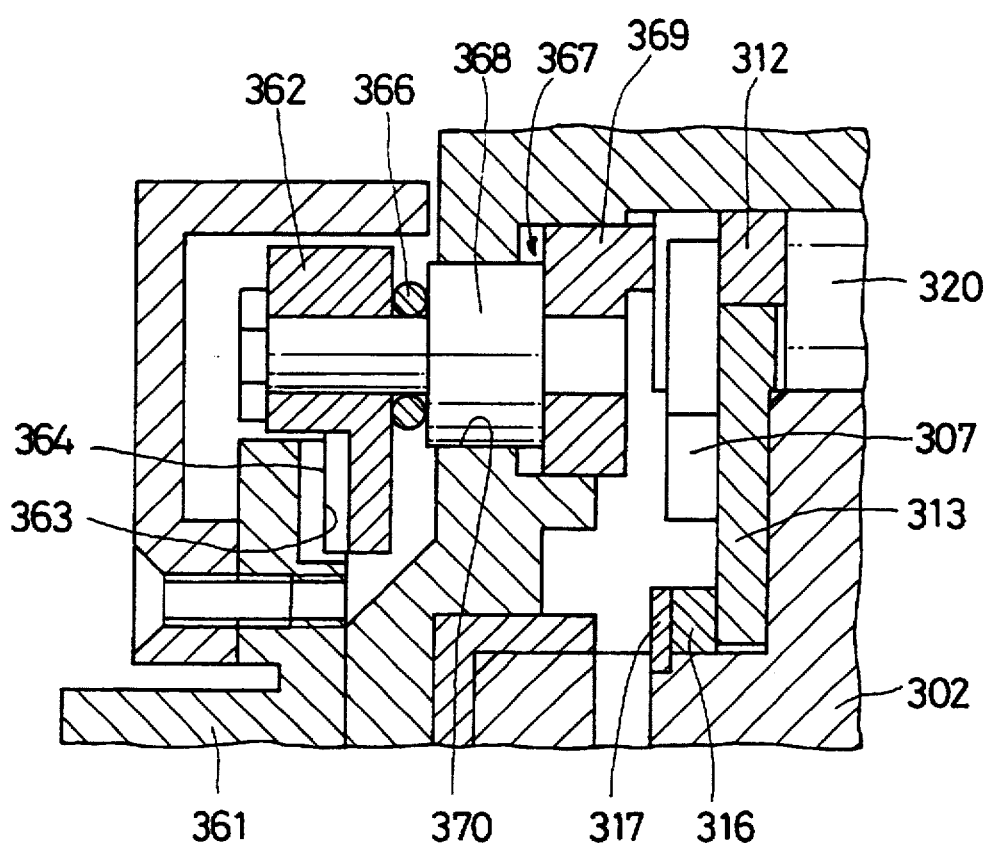
FIG. 50 is an enlarged view of a portion of the ninth embodiment.
Figure 51:
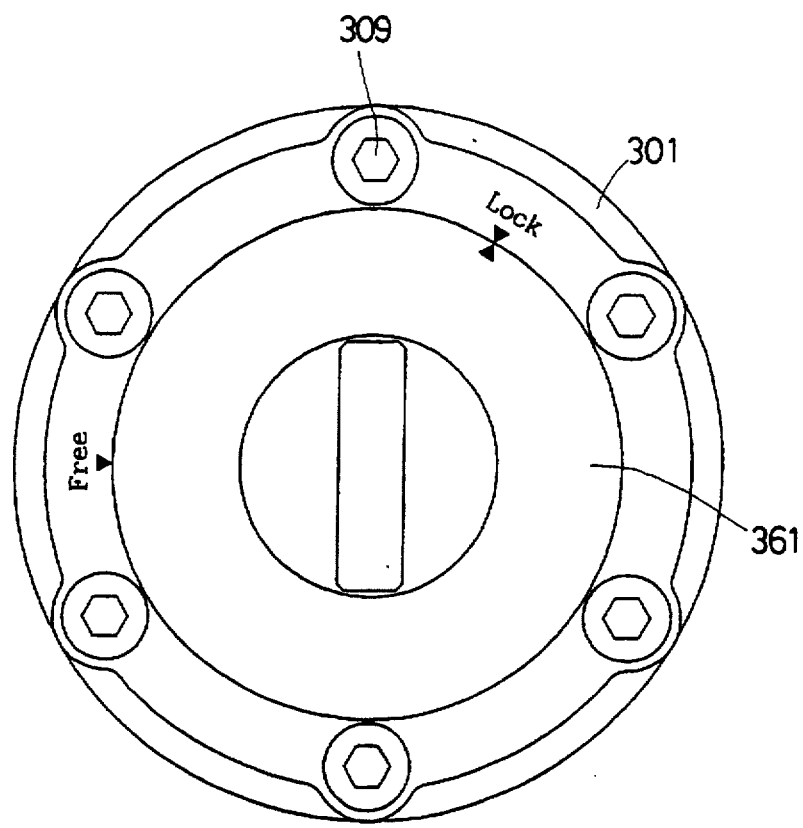
FIG. 51 is a side view taken along line XII—XII of FIG. 49.
Figure 52:
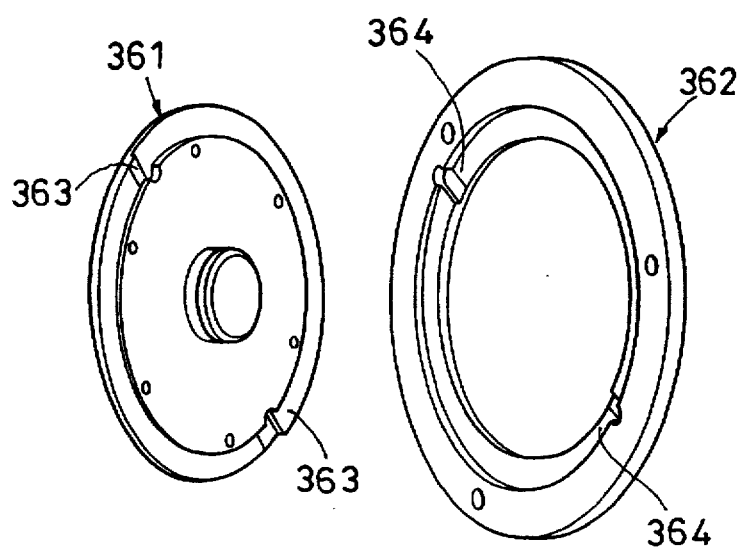
FIG. 52 is a perspective view of a changeover lever and the cam plate of FIG. 51.

The size of the gap X provided between the stopper pin 323 and the square hole 324 in the rotational direction is such that the sprags 320 can incline in either direction until they nearly engage the cylindrical surfaces 310, 311 as shown in FIGS. 47 and 48. Namely, in this state, the cages 312, 313 and the sprags 320 are biased and kept in the stand-by position by the switch spring 327. Namely, in this embodiment, the large-diameter cage 312 is biased in one direction by the switch spring 327.

A turning force imparting means (or mechanism) 308 is coupled to the rear end of the large-diameter cage 312 through a clutch spring 327. As shown in FIG. 41, it comprises an input ring 328 fitted on the inner ring 302 so as not to come off the inner ring 302, and a case 329 for rotation resisting members mounted around the input ring 328. The input ring 328 and the case 329 are formed with axially opposed flanges 330 and 331, respectively.

The case 329 is axially slidably but not non-unrotatably mounted on the end of the knuckle 304 through a key 332.

Rotation resisting members 334 are provided on both sides of the flange 330 of the input ring 328. The flange 330 is urged axially toward the flange 331 of the case 329 by a resilient member 333, such as a disc spring, mounted between the flange 330 and a retaining ring 335.

The spring force of the resilient member 333 is determined so that a predetermined frictional force is produced at the slide contact portion between the input ring 328 and the flange 330. This frictional force acts to retard the rotation of the input ring 328, which otherwise rotates with the large-diameter cage 312. The force applied to the input ring 328 and tending to retard its rotation has to be larger than the turning force applied to the large-diameter cage 312.

Figure 46A:
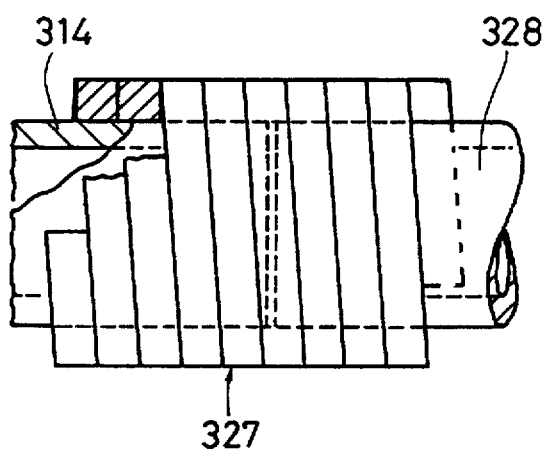
FIG. 46A is a front view of a clutch spring.
Figure 46B:
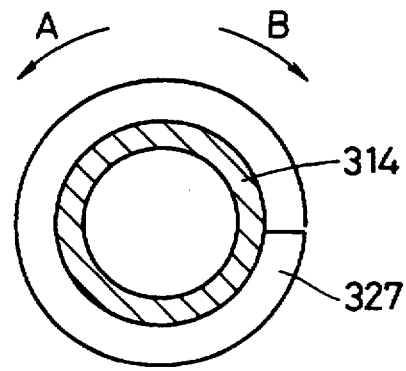
FIG. 46B is a vertical sectional view of FIG. 46A.

As shown in FIGS. 41 and 46, the clutch spring 327 provided between the turning force imparting means 308 and the large-diameter cage 312 is a coil spring wound around both the input ring 328 and the arm 314 of the large-diameter cage 312. Its one end engages in a hole 328a formed in the input ring 328. At the other end, the coil spring is loosely fitted around the arm 314 of the large-diameter cage 312. When the large-diameter cage 312 rotates in such a direction that the coil spring tightens, it tightens up and is pressed against the outer periphery of the large-diameter cage 312.

The clutch spring 327 is wound in such a direction that when the large-diameter cage 312 rotates, together with the inner ring 302, in the direction of arrow A in FIG. 46, the clutch spring 327 tightens up, thereby locking the large-diameter cage 312 and the input ring 328 together, and when the large-diameter cage 312 rotates in the direction of arrow B, the clutch spring 327 loosens, thus separating the large-diameter cage 312 and the input ring 328 from each other.

Figure 43:
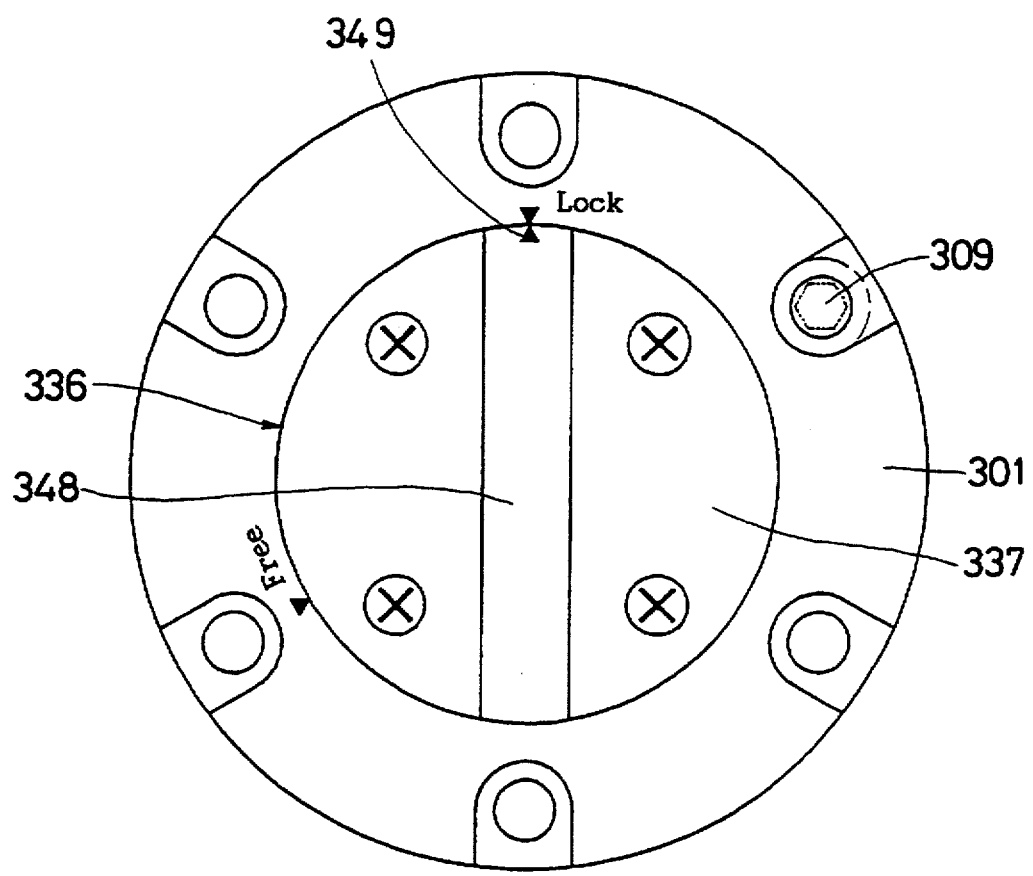
FIG. 43 is a sectional view taken along line IV—IV of FIG. 41.

As shown in FIGS. 41 and 43, a rotatable changeover lever 336 is mounted on the outer ring 301 and the inner ring 302 at their front ends. It comprises a disk portion 337 and a threaded annular portion 338 screwed to the disk portion 337. The threaded annular portion 338 is inserted into the outer ring 301 and supported on the front end of the inner ring 302 through a metal bearing 339.

The disk portion 337 is large enough to cover the joint portion between the outer ring 301 and the threaded annular portion 338. A seal ring 340 is provided between the back of the disk portion 337 and the end face of the outer ring 301 to extend along the outer periphery of the joint portion. Thus, the disk portion 337 has both the function as a protective cap for protecting the front end of the rotation transmission device A from external forces, and the function as a sealing member for preventing muddy water and dust from coming into the device.

The annular portion 338 has on its outer periphery a threaded portion 341 on which is mounted a friction member 342. It comprises a slider 343 kept in threaded engagement with the threaded portion 341, and a contact member 345 coupled to the slider 343 through a resilient member 344. The contact member 345 faces the front end face of the large-diameter cage 312.

The slider 343 is formed, in its outer peripheral surface, with an axial guide groove 346 in which is received a pin 347 press-fitted in the front end of the outer ring 301.

When the changeover lever 336 rotates, the slider 343 is axially slid by the threaded portion 341 while being guided by the pin 347 engaged in the guide groove 346, so that the contact member 345 moves toward and away from the large-diameter cage 312. Namely, the threaded portion 341, guide groove 346 and pin 347 constitute a motion converter means for converting the rotary motion of the changeover lever 336 into the reciprocating motion of the friction member 342.

Figure 42A:
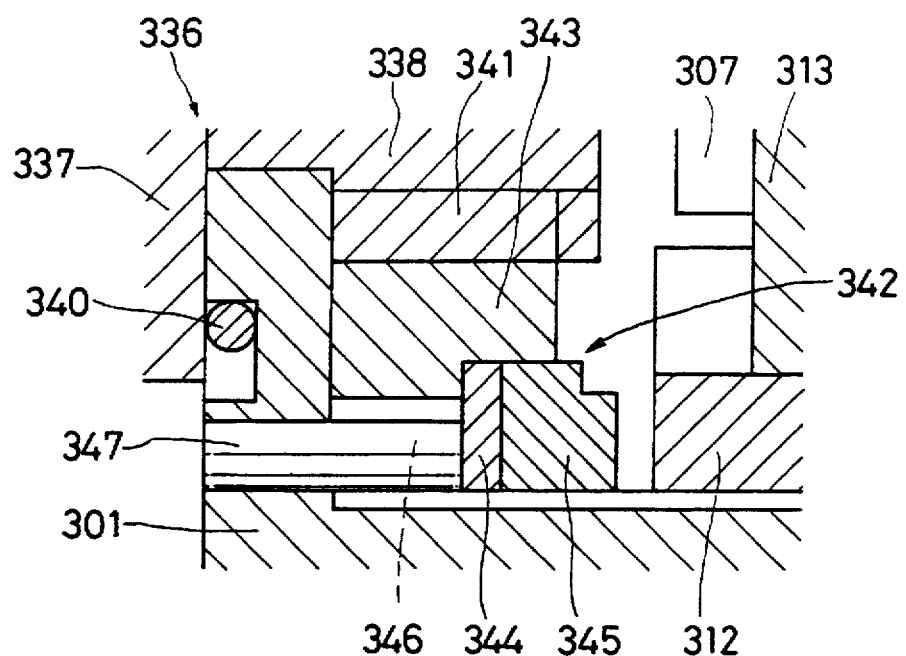
FIG. 42A is a sectional view of the friction member and the large-diameter cage showing a state where they are spaced apart from each other.
Figure 42B:
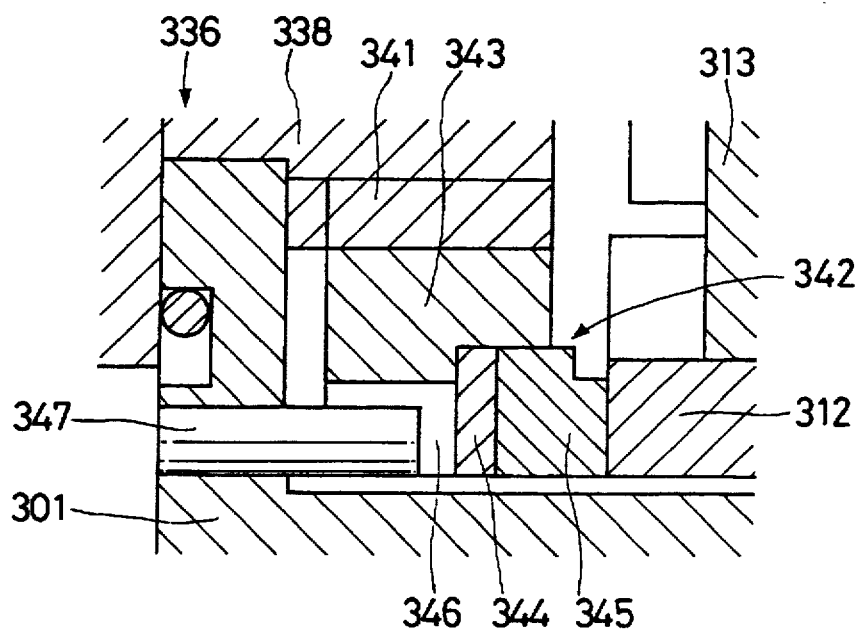
FIG. 42B is a sectional view of FIG. 42A when the case and friction member are pressed against each other.

As shown in FIG. 42B, once the contact member 345 comes into contact with the large-diameter cage 312, it is pressed hard against the large-diameter cage 312 by the biasing force of the resilient member 344. In this state, the entire friction member 342 is retained in engagement with the outer ring 301 by the pin 347. Namely, the large-diameter cage 312 and the outer ring 301 are locked together through the friction member 342, so that they rotate together.

As shown in FIG. 43, a control rib 348 and an angular position indicator 349 are formed on the outer end face of the disk portion 337 of the changeover lever 336. On the outer end of the outer ring 301 are two position indicators each representing a "locked" position in which the large-diameter cage 312 and the outer ring 301 are locked together through the friction member 342, and a "free" position in which they are freed from each other. Corresponding to the "locked" position indicator and the "free" position indicator, a plurality of recesses 350 are formed in the end face of the outer ring 301 as shown in FIG. 41. When the lever 336 is turned to the locked position or free position, balls 351 mounted in the changeover lever 336 are adapted to engage in the recesses 350, holding the lever in the locked or free position.

As shown in FIG. 40, the rotation transmission device of this embodiment is mounted on a four-wheel drive with its inner ring 309 coupled to each front wheel axle 303 and its outer ring 301 to the wheel hub 305. It has to be mounted so that while the vehicle is traveling forward, the inner ring 309 rotates in such a direction that the clutch spring 327 disengages (direction of arrow B in FIG. 46), and while the vehicle is moving backward, the inner ring rotates in such a direction that the clutch spring 327 tightens and engages (direction of arrow A).

In a normal travel condition in which no particularly big engine braking force is required, the changeover lever 336 is set in the "free" position (see FIG. 43). In this position, the friction member 342 is separated from the large-diameter cage 312 as shown in FIG. 42A, so that the outer ring 301 and the large-diameter cage 312 are disconnected from each other.

When the vehicle begins to move in this state, and the inner ring 302 is rotated by the front wheel axle 303, the small-diameter cage 313 will begin to rotate simultaneously. The large-diameter cage 312 also rotates together with the inner ring, biased by the switch spring 307. But since it rotates in the direction of arrow B in this state, the clutch spring 327 disengages, so that the turning force imparting means 308, as well as the case 329, remain stationary.

When the vehicle begins to move backward, and thus the inner ring 302 and the small-diameter cage 313 begin to rotate in the corresponding direction, the large-diameter cage 312, biased by the switch spring 307, will also begin to rotate in the direction of arrow A together with the small-diameter cage 313. Thus, the clutch spring 327 tightens and is pressed against the large-diameter cage 312 and the input ring 328, thus locking them together. Since the rotation retarding force applied to the input ring 328 is set to be large than the turning force produced by the switch spring 307, the rotation of the large-diameter cage 312 is retarded, causing the sprags 320 to be inclined in the opposite direction until they nearly engage. Once the sprags are brought to this position, the large-diameter cage 312 keeps rotating while being subjected to a constant rotation resistance from the turning force imparting means 308, thereby retaining the sprags in their stand-by position.

In the state in which the sprags are in the stand-by position shown in FIG. 47, as long as the vehicle is moving forward or backward with none of its wheels slipping, the outer ring 301 and the inner ring 302 will rotate at the same speed, so that the sprags 320 are kept in the stand-by position. Thus, no driving force is transmitted from the inner ring 302 to the outer ring 301. Namely, the vehicle is driven only the rear two wheels.

When the vehicle is turning a corner, the outer ring 301, connected to the front wheel, rotates faster than the inner ring 302, so that the outer ring 301 is allowed to free-run relative to the sprags 320. The front wheels are thus disconnected from the rear wheels, so that no braking phenomena will occur while the vehicle is turning a corner.

In a situation where a fairly large engine braking force is required, such as when the vehicle is going down a long slope or traveling a snow-covered road, the changeover lever 336 is set in the "locked" position as shown in FIG. 43. In this position, the friction member 342 is pressed against the large-diameter cage 312, so that the outer ring 301 and the large-diameter cage 312 are locked together.

Even if the sprags 320 have been in the free-running state as shown in FIG. 47, they are instantly inclined in the opposite direction and engage the cylindrical surfaces 310 and 311 of the inner and outer rings 301 and 302 by setting the lever in the locked position. Now that the inner and outer rings are locked together through the sprags, torque can be transmitted from the outer ring 301 to the front wheel axle 303. Thus, it is possible to transmit the engine braking force to both the front and rear wheels.

(Ninth Embodiment)

FIGS. 49 to 52 show another embodiment.

In this embodiment, the outer ring 301 has a front end portion 301a supported on the end of the inner ring 302 through a metal bearing 339. A changeover lever 361 is rotatably mounted on the center of the front end portion 301a.

A cam plate 362 is provided between the changeover lever 361 and the front end 301a of the outer ring 301. The cam plate 362 and the changeover lever 361 are formed with axially protruding cam surfaces 363 and 364 are always pressed against each other by a spring 365 mounted in the cam plate 362.

A presser pin 368 is mounted on the cam plate 362 through a resilient member 366. It slidably fits in a throughhole 370 formed in the front end portion 301a of the outer ring 301. Inside the outer ring 301 is a contact member 369 slidable between the presser pin 368 and the large-diameter cage 312.

The presser pin 368 and the contact member 369 function as a friction member 367. By turning the changeover lever 361 to engage the cam surfaces 363 and 364 together, the cam plate 362 is pushed axially, so that the presser pin 368 protrudes into the outer ring, thereby pressing the contact member 369 against the large-diameter cage 312. Thus, in this state, the large outer ring 301 and the large-diameter cage 312 rotate together because the presser pin 368 rotates together with the outer ring 301. In this embodiment, the cam surfaces 363, 364 and the cam plate 362 function, in cooperation with each other, as a motion converter means for converting the rotation motion of the changeover lever 361 into the axial reciprocating motion of the friction member 367.

(Tenth Embodiment)

Figure 53:
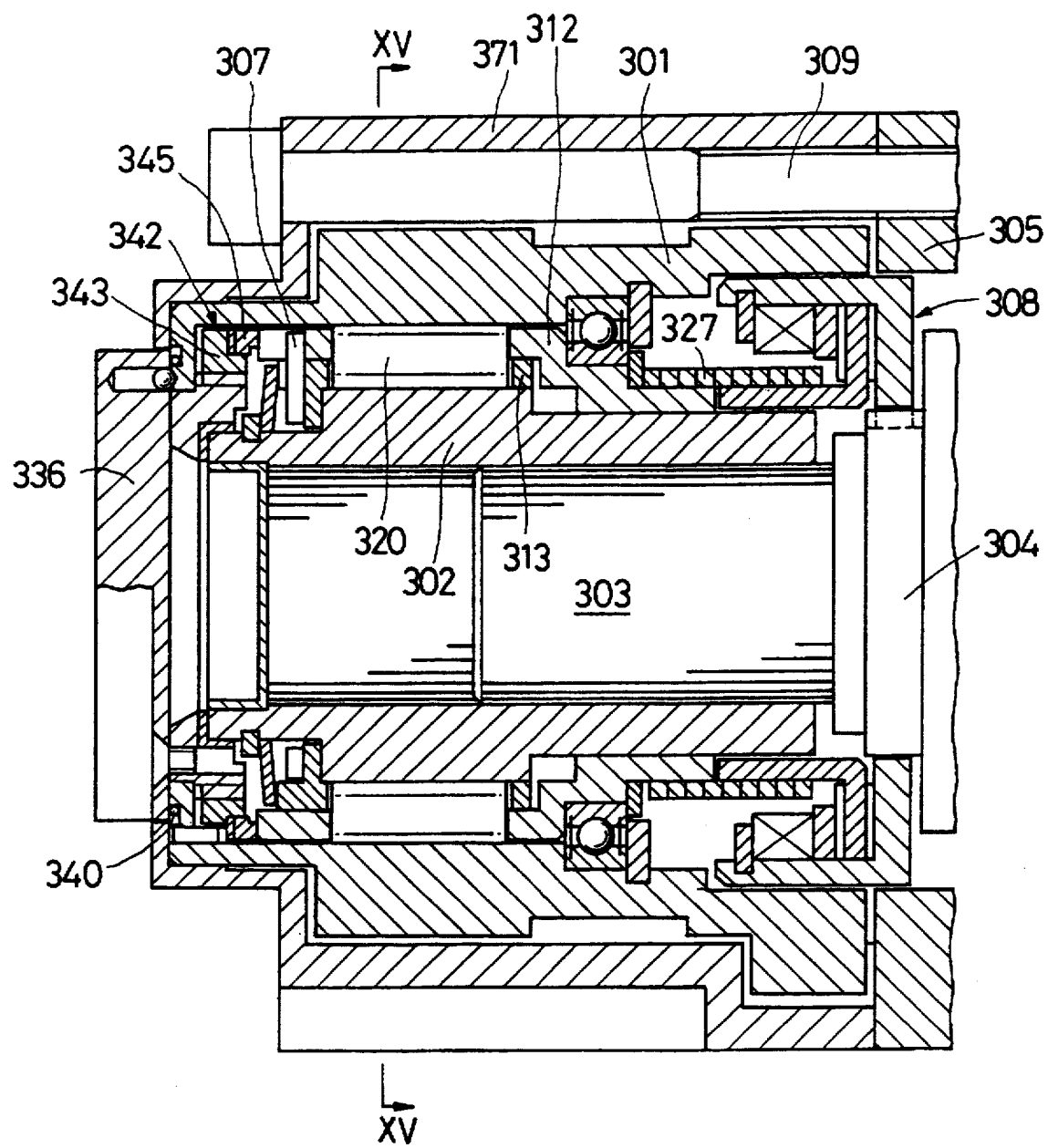
FIG. 53 is a vertical sectional view of a tenth embodiment.
Figure 54:
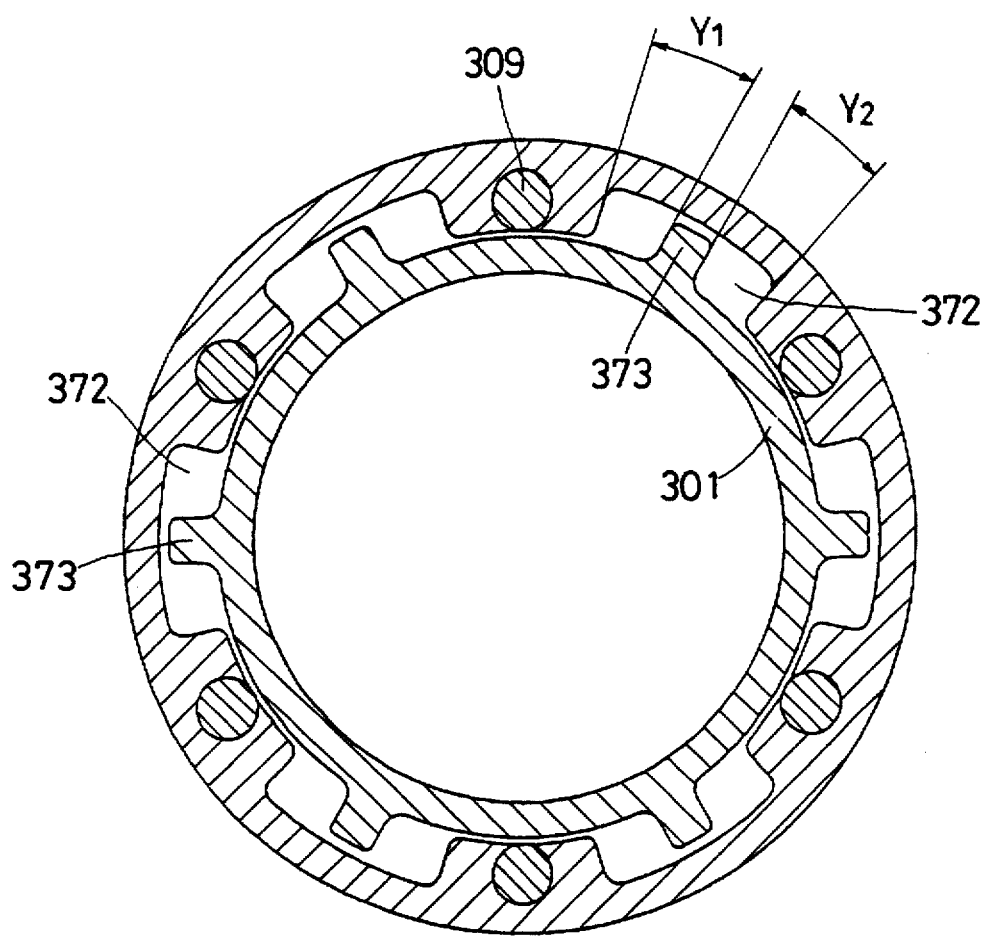
FIG. 54 is a sectional view taken along line XV—XV of FIG. 53.

FIGS. 53 and 54 show still another embodiment.

This embodiment is basically the same in structure as the embodiment shown in FIGS. 40–48. It differs only in that an outer casing 371 fixed to the wheel hub 305 is mounted around the outer ring 301.

A plurality of circumferential grooves 372 are formed in the inner periphery of the outer casing 371. The outer ring 301 has on its outer periphery a plurality of protrusions 373 received in the grooves 372 with a circumferential (rotational) play Y (Y=Y1+Y2). The play Y is larger than the gap X formed between the stopper pin 323 and the square hole 324 (see FIG. 45) in the direction of rotation (X<Y), and also larger than the distance by which each sprag 20 moves from one of the engageable positions to the other.

Namely, in this embodiment, torque is transmitted between the outer ring 301 and the wheel hub 305 with the play Y formed therebetween, instead of fixing the outer ring 301 directly to the wheel hub 305. In effect, such a play serves as a play formed between the front wheel axle 303 and the wheel hub 305 in the direction of rotation. Now we will explain the advantage of providing such play.

When the vehicle is stopped while traveling forward in an upward slope, the sprags 320 stop at their forward-travel stand-by position. If, in this state, the vehicle moves backward spontaneously by the action of gravity, only the wheel hub 305 rotates backward with the front wheel axle 303 kept stationary and with the sprags 320 maintained in their forward-travel stand-by position. Thus, when the steering wheel is turned after restarting the vehicle in this state, so-called braking phenomena will occur.

In contrast, by providing play Y in the rotational direction between the outer ring 301 and the wheel hub 205 (i.e. between the front wheel axle 303 and the wheel hub 305), even if the wheel hub 305 should rotate in the backward direction in the abovementioned state, the front wheel axle 303 is rotated by the front propeller shaft by the time the wheel hub 305 rotates the distance equal to the width of the play Y. Thus, the sprags 320 are inclined from the forward-travel stand-by position to the backward-travel stand-by position, allowing the outer ring 301 to overrun relative to the sprags 320. Thus, the outer ring and inner ring are kept from engaging each other, so that no braking phenomena will occur even when the vehicle turns a corner thereafter.

The sprags used in the embodiments of the present invention are all engageable when inclined in either direction. But instead, it is possible to use sprags engageable only when inclined in one direction. In this case, adjacent sprags have to be mounted in opposite ways to each other so that half the sprags will engage when they are inclined in one direction and the remaining half will engage when inclined in the other direction.

The rotation transmission device according to the present invention is characterized in that the cage for the engaging elements can be selectively coupled to and decoupled from the driven member. Thus, it is possible to freely activate and deactivate the free-running function of the clutch. Namely, it is possible to selectively connect the driving member directly or indirectly to the driven member. By mounting this device on the drive train of a four-wheel drive vehicle, it is possible to change over the driving mode between the two wheel drive mode and the four-wheel drive mode. During the four-wheel drive mode, the front wheels can be directly coupled to the rear wheels. During the two-wheel mode, the front wheel drive unit remains stationary because it is separated both from the engine and the front wheels. Thus, such a vehicle is high in fuel efficiency and low in noise level.

It is possible to deactivate the free-running function of the clutch by coupling the driven member to the cage. In this state, torque is transmitted from the driven member to the driving member. Thus, if the rotation transmission device of this invention is mounted between each front wheel hub and the drive train of a four-wheel drive vehicle, it is possible to drive the vehicle just like a conventional full-time, direct-coupled four-wheel drive car. If a large braking force is required, it is possible to transmit the engine braking force to both the front and rear wheels.

What is claimed is:

1. A rotation transmission device comprising a driving member and a driven member rotatably mounted one inside the other, a plurality of engaging elements mounted between said driving member and said driven member so as to engage with said driving member and said driven member when said driving member and said driven member rotate relative to each other in either direction, a cage mounted between said driving member and said driven member for keeping said engaging elements apart from one another by a predetermined distance, a turning force imparting mechanism coupled to said cage for moving said engaging elements to an engageable position by turning said cage in one direction relative to said driving member, and a locking mechanism provided between said cage and said driven member for detachably coupling said cage to said driven member and remote-controlled through a cable connected to said locking mechanism and extending out of said rotation transmission device; wherein said locking mechanism includes a coupling member non-rotatably coupled to one of said cage and said driven member and movable into and out of engagement with an engaging portion provided on the other of said cage and said driven member by operating said cable, said one of said cage and said driven member having a guide surface along which said coupling member is movably guided, said guide surface having a length greater than one of a radial distance from a center of said coupling member to a location at which said cable is connected to said locking mechanism, and a radial distance from said location to said guide surface.

2. A rotation transmission device as claimed in claim 1 further comprising a spindle coupled to a fixed member and mounted on a shaft coupled to said driving member, said spindle being formed with a moderately curving passage through which said cable extends out of the device.

3. A rotation transmission device as claimed in claim 2 wherein said spindle comprises a plurality of separable members, said passage being formed at an interface between said separable members.

4. A driving force transmission device comprising a wheel axle, a wheel hub, and the rotation transmission device claimed in claim 1 mounted between said axle and said wheel hub with said driving member connected to said wheel axle and said driven member to said wheel hub.

5. A driving force transmission device comprising a vehicle wheel differential, a homokinetic joint connected to a wheel axle, and the rotation transmission device claimed in claim 1 mounted between said differential and said homokinetic joint with said driving member connected to said differential and said driven member to said homokinetic joint.

6. A rotation transmission device as claimed in claim 1 wherein said cable is coupled to a transfer of a four-wheel drive vehicle so that said locking mechanism can be remote-controlled through said transfer.

7. A rotation transmission device as claimed in claim 6 further comprising a spindle coupled to a fixed member and mounted on a shaft coupled to said driving member, said spindle being formed with a moderately curving passage through which said cable extends out of the device.

8. A rotation transmission device as claimed in claim 7 wherein said spindle comprises a plurality of separable members, said passage being formed at an interface between said separable members.

9. A rotation transmission device comprising a driving member and a driven member rotatably mounted one inside the other, a plurality of engaging elements mounted between said driving member and said driven member so as to engage with said driving member and said driven member when said driving member and driven member rotate relative to each other in either direction, a cage mounted between said driving member and said driven member for moving said engaging elements to an engageable position by turning relative to said driving member, a switch spring coupled to one end of said cage for biasing said cage to rotate said cage in one direction relative to said driving member, a coil spring having both ends thereof fixed to a stationary member and would around the other end of said cage so as to bias said cage in the direction opposite to said one direction, and a remote-controlled coupling mechanism provided between said cage and said driven member for detachably coupling said cage to said driven member.

10. A rotation transmission device comprising a driving member and a driven member rotatably mounted one inside the other, a plurality of engaging elements mounted between said driving member and said driven member so as to engage with said driving member and said driven member when said driving member and said driven member rotate relative to each other in either direction, a cage mounted between said driving member and said driven member for keeping said engaging elements apart from one another by a predetermined distance, a turning force imparting mechanism coupled to said cage for moving said engaging elements to an engageable position by turning said cage in one direction relative to said driving member, and a locking mechanism provided between said cage and said driven member for detachably coupling said cage to said driven member and remote-controlled through a cable connected to said locking mechanism and extending out of said rotation transmission device; wherein said cable is coupled to a transfer of a four-wheel drive vehicle so that said locking mechanism can be remote-controlled through said transfer; and wherein a spindle is coupled to a fixed member and mounted on a shaft coupled to said driving member, said spindle being formed with a moderately curving passage through which said cable extends out of the device.

11. A rotation transmission device as claimed in claim 10 wherein said spindle comprises a plurality of separable members, said passage being formed at an interface between said separable members.

12. A rotation transmission device comprising a driving member and a driven member rotatably mounted one inside the other, a plurality of engaging elements mounted between said driving member and said driven member so as to engage with said driving member and said driven member when said driving member and said driven member rotate relative to each other in either direction, a cage mounted between said driving member and said driven member for keeping said engaging elements apart from one another by a predetermined distance, a locking mechanism provided between said cage and said driven member for detachably coupling said cage to said driven member at a first predetermined position relative to said driving member, and remote-controlled through a cable connected to said locking mechanism and extending out of said rotation transmission device, and a turning force imparting mechanism coupled to said cage for turning said cage by a predetermined distance in one direction relative to said driving member from said first predetermined position when said cage and said driven member are not coupled together by said locking mechanism, thereby moving said engaging elements to an engageable position, wherein said locking mechanism includes a coupling member non-rotatably coupled to one of said cage and said driven member and movable into and out of engagement with an engaging portion provided on the other of said cage and said driven member by operating said cable, said one of said cage and said driven member having a guide surface along which said coupling member is movably guided, said guide surface having a length greater than one of a radial distance from a center of said coupling member to a location at which said cable is connected to said locking mechanism, and a radial distance from said location to said guide surface.

13. A rotation transmission device as claimed in claim 12 wherein said cable is coupled to a transfer of a four-wheel drive vehicle so that said locking mechanism can be remote-controlled through said transfer.

14. A rotation transmission device as claimed in claim 13 further comprising a spindle coupled to a fixed member and mounted on a shaft coupled to said driving member, said spindle being formed with a moderately curving passage through which said cable extends out of the device.

15. A rotation transmission device as claimed in claim 14 wherein said spindle comprises a plurality of separable members, said passage being formed at an interface between said separable members.

16. A rotation transmission device comprising a driving member and a driven member rotatably mounted one inside the other, a plurality of engaging elements mounted between said driving member and said driven member so as to engage with said driving member and said driven member when said driving member and said driven member rotate relative to each other in either direction, a cage mounted between said driving member and said driven member for keeping said engaging elements apart from one another by a predetermined distance, a locking mechanism provided between said cage and said driven member for detachably coupling said cage to said driven member at a first predetermined position relative to said driving member, and remote-controlled through a cable connected to said locking mechanism and extending out of said rotation transmission device, and a turning force imparting mechanism coupled to said cage for turning said cage by a predetermined distance in one direction relative to said driving member from said first predetermined position when said cage and said driven member are not coupled together by said locking mechanism, thereby moving said engaging elements to an engageable position, a spindle coupled to a fixed member and mounted on a shaft coupled to said driving member, said spindle being formed with a moderately curving passage through which said cable extends out of the device, wherein said cable is coupled to a transfer of a four-wheel drive vehicle so that said locking mechanism can be remote-controlled through said transfer.

17. A rotation transmission device as claimed in claim 16 wherein said spindle comprises a plurality of separable members, said passage being formed at an interface between said separable members.

* * * * *